United States Patent
Lee et al.

(10) Patent No.: US 10,144,289 B2
(45) Date of Patent: Dec. 4, 2018

(54) DISPLAY APPARATUS AND METHOD FOR CONTROLLING THE SAME

(71) Applicant: LG ELECTRONICS INC., Seoul (KR)

(72) Inventors: Byungju Lee, Seoul (KR); Daihyung Ryu, Seoul (KR); Junghoon Son, Seoul (KR)

(73) Assignee: LG Electronics Inc., Seoul (KR)

(*) Notice: Subject to any disclaimer, the term of this patent is extended or adjusted under 35 U.S.C. 154(b) by 35 days.

(21) Appl. No.: 15/097,364

(22) Filed: Apr. 13, 2016

(65) Prior Publication Data
US 2016/0311323 A1 Oct. 27, 2016

(30) Foreign Application Priority Data
Apr. 27, 2015 (KR) .................. 10-2015-0058967

(51) Int. Cl.
*B60K 37/06* (2006.01)
*G06F 3/00* (2006.01)
(Continued)

(52) U.S. Cl.
CPC .............. *B60K 37/06* (2013.01); *B60K 35/00* (2013.01); *G06F 3/005* (2013.01); *G06F 3/013* (2013.01);
(Continued)

(58) Field of Classification Search
CPC ...... B60K 2350/106; B60K 2350/1096; B60K 2350/906; B60K 2350/962; B60K 35/00;
(Continued)

(56) References Cited

U.S. PATENT DOCUMENTS 5,548,516 A * 8/1996 Gudat .................... G01S 19/11
701/23
8,346,426 B1 1/2013 Szybalski et al.
(Continued)

FOREIGN PATENT DOCUMENTS

DE 10-2013-110852 4/2015
EP 1190886 3/2002
(Continued)

OTHER PUBLICATIONS

Extended European Search Report in European Application No. 16166202.8, dated Mar. 15, 2017, 10 pages (with English translation).
(Continued)

*Primary Examiner* — Sing-Wai Wu
(74) *Attorney, Agent, or Firm* — Fish & Richardson P.C.

(57) ABSTRACT

A vehicle display apparatus and a method for controlling the same are disclosed. The display apparatus includes a display and a controller configured to monitor a manipulation variable of a driving manipulation device provided to a vehicle, to select any one driving mode corresponding to the manipulation variable of the driving manipulation device from among a plurality of predetermined driving modes, and to control the display to display different information according to the plurality of driving modes. When a driving mode corresponding to a relatively small manipulation variable is selected, the controller decreases driving information displayed on the display and increases convenience information displayed on the display, as compared to when a driving mode corresponding to a relatively large manipulation variable is selected.

15 Claims, 55 Drawing Sheets

(51) Int. Cl.
G06F 3/01 (2006.01)
G06K 9/00 (2006.01)
B60K 35/00 (2006.01)

(52) U.S. Cl.
CPC ..... G06K 9/00335 (2013.01); G06K 9/00845 (2013.01); *B60K 2350/106* (2013.01); *B60K 2350/1096* (2013.01); *B60K 2350/906* (2013.01); *B60K 2350/962* (2013.01)

(58) Field of Classification Search
CPC ......... B60K 37/06; G06F 3/005; G06F 3/013; G06K 9/00335; G06K 9/00845
See application file for complete search history.

(56) References Cited

U.S. PATENT DOCUMENTS

| | | |
|---|---|---|
| 2010/0253541 A1 | 10/2010 | Seder et al. |
| 2012/0173069 A1 | 7/2012 | Tsimhoni et al. |
| 2013/0211656 A1 | 8/2013 | An et al. |
| 2015/0015596 A1 | 1/2015 | Nagatomi et al. |

FOREIGN PATENT DOCUMENTS

| | | |
|---|---|---|
| JP | H06-040886 | 10/1994 |
| JP | 2718033 | 2/1998 |
| JP | H11-165562 | 6/1999 |
| JP | 2002-211270 | 7/2002 |
| JP | 3946329 | 7/2007 |
| JP | 4590132 | 12/2010 |
| JP | 2015-018438 | 1/2015 |
| JP | 2015-024762 | 2/2015 |
| JP | 2015-071340 | 4/2015 |
| KR | 10-2013-0091907 | 8/2013 |
| KR | 10-2014-0106939 | 9/2014 |
| KR | 10-2014-0128812 | 11/2014 |

OTHER PUBLICATIONS

Chinese Office Action in Chinese Application No. 201610269543.2, dated Jan. 4, 2018, 14 pages (with English translation).

* cited by examiner (a)

(b)

| DRIVING ASSISTANCE FUNCTION / SPEED(Km/h) | FCW | AEB | LDW |
|---|---|---|---|
| 0 ~ 30 | X | X | X |
| 30 ~ 60 | X | X | O |
| 60 ~ 100 | X | O | O |
| 100 ~ | O | O | O |

DISPLAY APPARATUS AND METHOD FOR CONTROLLING THE SAME

CROSS-REFERENCE TO RELATED APPLICATION

This application claims the priority benefit of Korean Patent Application No. 10-2015-0058967, filed on Apr. 27, 2015 in the Korean Intellectual Property Office, the disclosure of which is incorporated herein by reference.

BACKGROUND OF THE INVENTION

1. Field of the Invention

The present invention relates to a display apparatus, and, more particularly, to a display apparatus and a method for controlling the same.

2. Description of the Related Art

A vehicle refers to an apparatus driven on a road or railroad by rolling wheels for the purpose of transporting persons or goods. For example, two-wheeled vehicles such as motorcycles, four-wheeled vehicles such as cars, and trains are vehicles.

Recently, with rapid development of display technology, various types of displays have been mounted in vehicles. Currently, thin film transistor-liquid crystal displays (TFT-LCDs) are mainly used as vehicle displays. As delivery of information related to driver safety and driving convenience has become important, a new type of display such as a head-up display (HUD) has also been commercialized.

However, a display apparatus such as a conventional head-up display (HUD) mounted in a vehicle has a small screen and thus can display only general information such as speed or gas mileage. Therefore, it is impossible to efficiently convey more information related to driver safety and a vehicle state.

Recently, technological development of a vehicle having an autonomous driving function for autonomously driving the vehicle from one position to another position has been accelerated.

However, even when the type of information necessary for the driver is changed depending on whether the autonomous driving function of the vehicle is executed or not, a current display apparatus does not provide a function for changing displayed information depending on whether the autonomous driving function is executed or not.

SUMMARY OF THE INVENTION

Therefore, the present invention has been made in view of the above problems, and it is an object of the present invention to provide a display apparatus for changing a driving mode depending on whether an autonomous driving function is executed or not and displaying different information according to the driving mode, and a method for controlling the same.

Another object of the present invention is to provide a display apparatus for determining whether an autonomous driving function is executed based on a manipulation variable of a driving manipulation device provided to a vehicle, changing the type or amount of information displayed on a display to rapidly change the driving mode of the vehicle according to driver intention and providing information suitable for a current driving mode to the driver, and a method for controlling the same.

Another object of the present invention is to provide a display apparatus for determining whether an autonomous driving function is executed based on a grade allocated to an area, in which a vehicle is located, to automatically execute or stop the autonomous driving function on a route to a destination and displaying information related thereto, and a method for controlling the same.

In accordance with an aspect of the present invention, the above and other objects can be accomplished by the provision of a display apparatus including a display, and a controller configured to monitor a manipulation variable of a driving manipulation device provided to a vehicle, to select any one driving mode corresponding to the manipulation variable of the driving manipulation device from among a plurality of predetermined driving modes, and to control the display to display different information according to the plurality of driving modes, wherein, when a driving mode corresponding to a relatively small manipulation variable is selected, the controller decreases driving information displayed on the display and increases convenience information displayed on the display, as compared to when a driving mode corresponding to a relatively large manipulation variable is selected.

According to another aspect of the present invention, there is provided a display apparatus including a display, and a controller configured to divide a full route from a position of a vehicle to a destination into one or more sections according to grade, to select any one driving mode corresponding to a grade allocated to a section where the vehicle is located from among a plurality of predetermined driving modes, and to control the display to display different information according to the plurality of driving modes, wherein, when a driving mode corresponding to a relatively high grade is selected, the controller decreases driving information displayed on the display and increases convenience information displayed on the display, as compared to when a driving mode corresponding to a relatively low grade is selected.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described below in detail with reference to the accompanying drawings in which the same reference numbers are used throughout this specification to refer to the same or like parts and a repeated description thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to aid in understanding the technical scope of the present invention and it should be understood that the scope of the present invention is not limited by the accompanying drawings. The idea of the present invention should be construed to extend to any alterations, equivalents and substitutions in addition to the accompanying drawings.

It will be understood that, although the terms first, second, etc. may be used herein to describe various elements of the present invention, these terms are only used to distinguish one element from another element and essential, order, or sequence of corresponding elements are not limited by these terms.

It will be understood that when one element is referred to as being "connected to" or "coupled to" another element, one element may be "connected to" or "coupled to", another element via a further element although one element may be directly connected to or directly accessed to another element.

A singular representation may include a plural representation unless context clearly indicates otherwise.

It will be understood that the terms "comprise", "include", etc., when used in this specification, specify the presence of several components or several steps and part of the components or steps may not be included or additional components or steps may further be included.

Hereinafter, a vehicle including a display apparatus according to an embodiment of the present invention will first be described and then the display apparatus according to each embodiment of the present invention will be described.

Figure 1A:
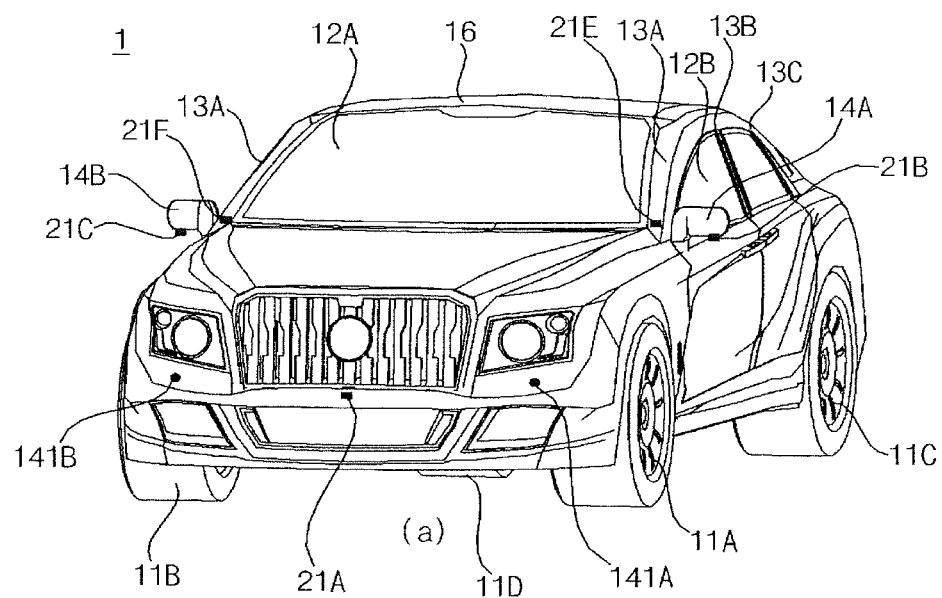
FIGS. 1A and 1B are schematic diagrams showing a vehicle including a display apparatus according to embodiments of the present invention.
Figure 1A:
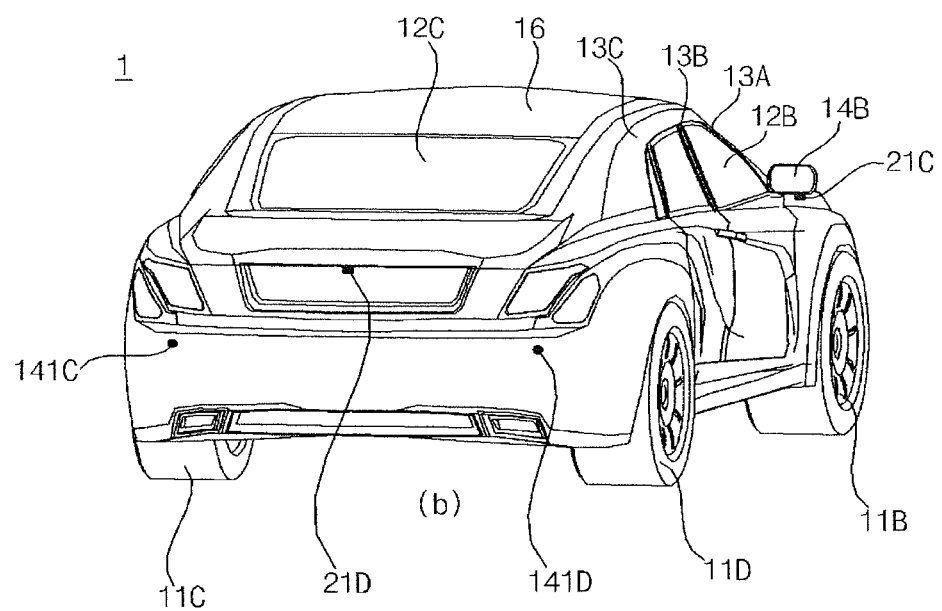
Figure 1B:
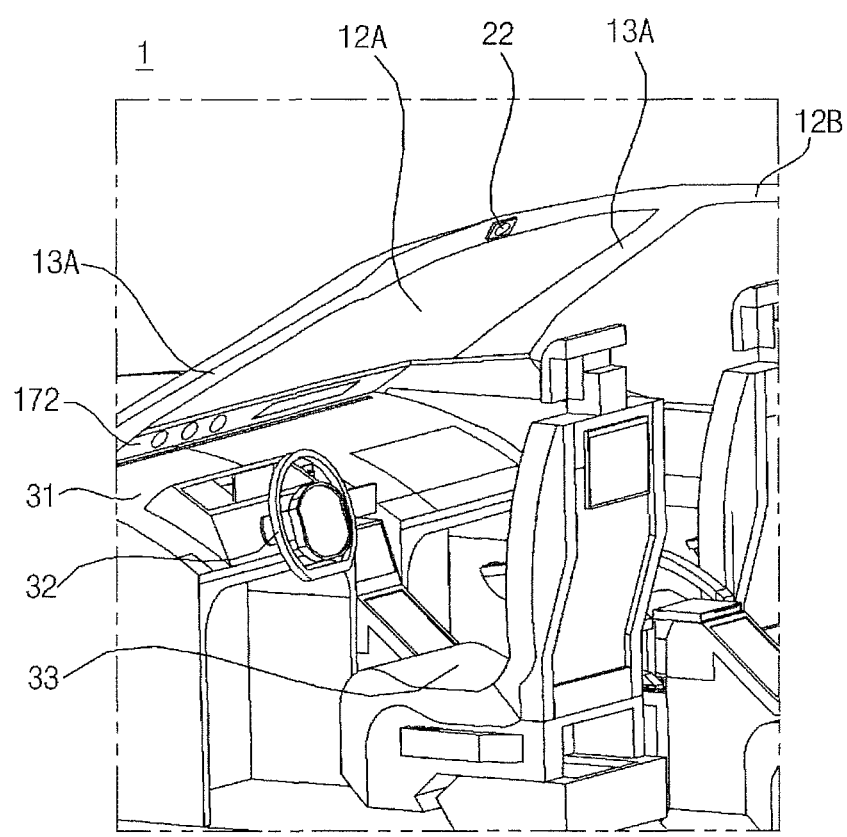

FIGS. 1A and 1B are schematic diagrams showing a vehicle 1 including a display apparatus 100 according to embodiments of the present invention. FIG. 1A shows the exterior of the vehicle 1 and FIG. 1B shows the interior of the vehicle 1. For convenience of description, a four-wheeled vehicle 1 will be focused upon.

Referring to FIG. 1A, the vehicle 1 may include a wheel 11, a window 12, a pillar 13, a side-view mirror 14, a roof 16, etc.

The wheel 11 includes front wheels 11A and 11B arranged on the right and left sides of the front side of the vehicle 1 and rear wheels 11C and 11D arranged on the right and left sides of the rear side of the vehicle 1 to support the load of the vehicle 1.

The window 12 may include a front window 12A, a side window 12B and a rear window 12C.

The pillar 13 connects a car body and a roof and increases the strength of the vehicle 1. More specifically, a front pillar 13A provided between the front window 12A and the side window 12B, a center pillar 13B provided between a front door and a rear door and a rear pillar 13C provided between the side window 12B and the rear window 12C may be included. A pair of front pillars 13A, a pair of center pillars 13B and a pair of rear pillars 13C may be provided.

The side-view mirror 14 enables a driver to see areas behind and to the sides of the vehicle 1. As shown, the side-view mirror 14 may include a first side-view mirror 14A mounted on the exterior of a driver seat of the vehicle 1 and a second side-view mirror 14B mounted on the exterior of a passenger seat of the vehicle 1.

In addition, the vehicle 1 may include at least one camera 20. More specifically, the vehicle 1 may include at least one camera 21 (hereinafter, referred to as an exterior camera) for capturing the periphery of the vehicle 1. The exterior camera 21 may generate front, rear, left and right images of the vehicle 1. For example, a first exterior camera 21A may generate a front image, a second exterior camera 21B may generate a left image, a third exterior camera 21C may generate a right image and a fourth exterior camera 21D may generate a rear image.

In addition, at least one of the exterior cameras 21 may generate a blind spot image. For example, a fifth exterior camera 21E may generate an image of a left blind spot obscured by the left front pillar 13A and a sixth exterior camera 21F may generate an image of a right blind spot obscured by the right front pillar 13A.

In addition, the vehicle 1 may include at least one obstacle sensor 141. Although four obstacle sensors 141A to 141D are shown as being mounted on the exterior of the vehicle, the present invention is not limited thereto. That is, more or fewer obstacle sensors 141 may be provided at other positions of the vehicle 1.

Referring to FIG. 1B, a dashboard 31, a steering wheel 32, a seat 33, etc. are provided in the interior of the vehicle 1. In addition, various display apparatuses including an assistant display 172 may be provided in the interior of the vehicle 1.

In addition, at least one camera 22 (hereinafter, referred to as an interior camera) for capturing the interior of the vehicle 1 to generate an interior image may be mounted in the interior of the vehicle 1. Such an interior camera 22 may be provided on one side of the interior of the vehicle 1 to capture an area in which a driver is located.

As described above, the vehicle 1 including the display apparatus 100 according to the embodiments of the present invention is not limited to the four-wheeled vehicle shown in FIG. 1.

Figure 2:
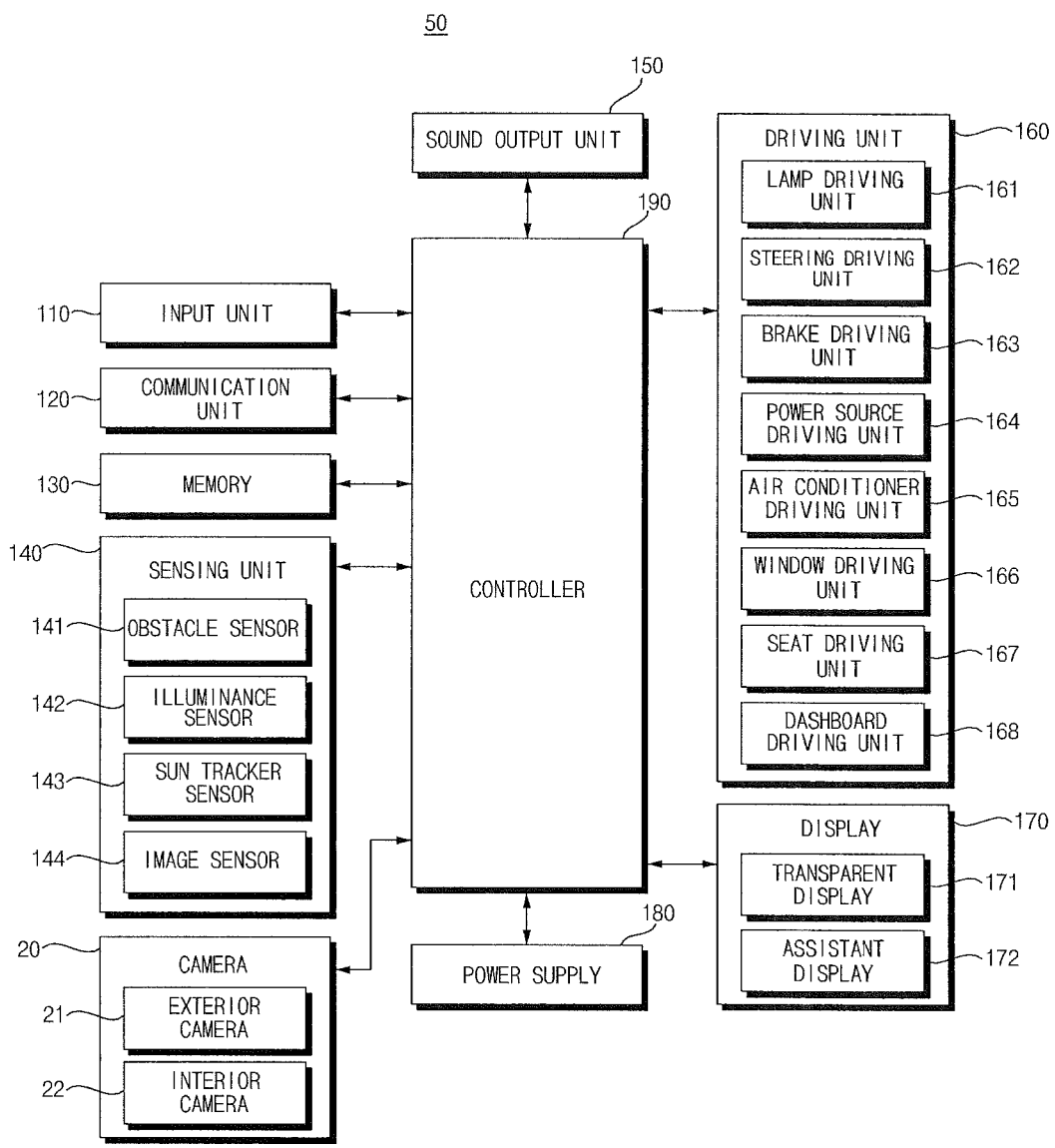
FIG. 2 is a diagram showing the function of the vehicle shown in FIGS. 1A and 1B.

FIG. 2 is a diagram showing the function of a control device 50 provided in the vehicle 1 shown in FIG. 1.

Referring to FIG. 2, the control device 50 of the vehicle 1 may include a camera 20, an input unit 110, a communication unit 120, a memory 130, a sensing unit 140, an audio output unit 150, a driving unit 160, a display 170, a power supply 180 and a controller 190.

The camera 20 may include an exterior camera 21 and an interior camera 22.

The input unit 110 receives a variety of input from a driver. The input unit 110 may include at least one of a physical button, a joystick, a microphone, a touch panel, etc. For example, the driver may turn the vehicle 1 on/off, adjust volume, indoor temperature, radio channel, etc. or input a destination, a driving mode, etc. via the input unit 110.

The communication unit 120 may exchange a variety of data with an external apparatus by wire or wirelessly. For example, the communication unit 120 may establish a wireless communication link with a mobile terminal of the driver or a server to exchange a variety of data. A wireless data communication method may include, but is not limited thereto, various data communication methods such as Bluetooth, Wi-Fi Direct, Wi-Fi, APiX, etc.

In addition, the communication unit 120 may receive a variety of information such as weather information, position information, traffic information, route information, broadcast information, etc. from an external apparatus. For example, the communication unit 120 may receive transport protocol experts group (TPEG) information.

The communication unit 120 may perform pairing with the mobile terminal of the driver automatically or according to the request of the mobile terminal.

The memory 130 may store various application programs for data processing or control of the controller 190 and a variety of data for operation of an electronic control device, such as settings information set by the driver. The memory 130 may pre-store information to be displayed on the display 170 according to internal environment information or external environment information of the vehicle 1.

The sensing unit 140 senses a variety of information or signals related to an internal or external environment. The sensing unit 140 may include an image sensor for analyzing an image generated by the exterior camera 21 or the interior camera 22, a touch sensor for sensing touch of the driver and an obstacle sensor (141, see FIG. 1A) for sensing an obstacle located near the vehicle 1.

The sensing unit 140 may include a heading sensor, a yaw sensor, a gyroscope sensor, a position sensor, a speed sensor, a body tilting sensor, a battery sensor, a fuel sensor, a tire pressure sensor, a temperature sensor, a humidity sensor, etc. The sensing unit 140 may acquire the travel direction, speed, acceleration, body tilting, residual battery, fuel information, tire pressure, engine temperature, indoor temperature, indoor humidity, etc. of the vehicle 1.

The audio output unit 150 may convert a control signal received from the controller 190 into an audio signal and output the audio signal. The audio output unit 150 may include at least one speaker. For example, if a safety belt is not fastened in a state of starting a vehicle, the audio output unit 150 may output predetermined beat sound.

The driving unit 160 may include a lamp driving unit 161, a steering driving unit 162, a brake driving unit 163, a power source driving unit 164, an air conditioner driving unit 165, a window driving unit 166, a seat driving unit 167, a dashboard driving unit 168, etc.

The lamp driving unit 161 may turn various lamps provided in the vehicle 1 on/off. In addition, the lamp driving unit 161 may control the amount of light emitted from the lamp, an on/off period, the direction of light, etc.

The steering driving unit 162 may perform electronic control with respect to a steering device (e.g., a steering wheel 32) of the vehicle 1. Thus, it is possible to change the travel direction of the vehicle 1. Alternatively, the steering driving unit 162 may change the position or posture of the steering device (e.g., the steering wheel 32) of the vehicle 1. For example, the driver may adjust the height of the steering wheel 32 according to the body size thereof.

The brake driving unit 163 may perform electronic control with respect to the brake device of the vehicle 1. For example, operation of the brake provided in the wheel may be controlled to reduce the speed of the vehicle 1.

The power source driving unit 164 may perform electronic control with respect to the power source of the vehicle 1. For example, when the vehicle 1 uses an engine as a power source, the power source driving unit 164 may control torque of the engine, etc. As another example, when the vehicle 1 uses an electric motor as a power source, the power source driving unit 164 may control the rotation speed, torque, etc. of the motor.

The air conditioner driving unit 165 may perform electronic control with respect to the air conditioner of the vehicle 1. For example, when the indoor temperature of the vehicle 1 is high, the air conditioner driving unit 165 may operate the air conditioner to pass cold air into the interior of the vehicle.

The window driving unit 166 may individually open or close the windows of the vehicle 1.

The seat driving unit 167 adjusts the position or posture of the seat 33 provided in the vehicle 1 electrically, not manually. More specifically, the seat driving unit 167 may move the seat 33 in all directions using an electrical pump or an electrical motor or adjust the angle of the back of the seat. The seat 33 which is electrically adjusted by the seat driving unit 167 may be referred to as a power seat.

The dashboard driving unit 168 adjusts the position or height of the dashboard 31 provided in the interior of the vehicle 1. The dashboard driving unit 168 may change the position or height of the dashboard 31 using the electrical pump or the electrical motor, similarly to the seat driving unit 167.

The display 170 displays a variety of information related to the vehicle 1. The display 170 includes a transparent display 171. In addition, the display 170 may further include an assistant display 172. Here, the transparent display 171 may mean a display having a predetermined transmittance or more to enable the driver to perceive an object located behind the transparent display 171. In addition, the assistant display 172 may mean a display having less than a predetermined transmittance, unlike the transparent display 171.

At least one assistant display 172 or transparent display 171 may be provided. Several assistant displays 172 or transparent displays 171 may be provided at various positions of the vehicle 1. For example, the transparent display 171 may be mounted on at least one of the windows 12 shown in FIG. 1A. In addition, the assistant display 172 may be mounted between the front window 12A and the dashboard 31 shown in FIG. 1B.

The display 170 may display a variety of information or change a display state while operating under control of the controller 190. For example, the display 170 may change the type, form, amount, color, position, size, etc. of the information displayed on the display 170 or change the brightness, transmittance, color, etc. of the display 170 according to different control signals provided by the controller 190.

The power supply 180 may supply power necessary for operation of the components under control of the controller 190.

The controller 190 may control the overall operation of each unit included in the control device. For example, the controller 190 may change the attributes of the information displayed on the display 170 based on a signal received from the input unit 110 or the sensing unit 140.

The vehicle 1 may have a manual driving function for enabling the driver to directly drive the vehicle and an autonomous driving function. Here, the autonomous driving function means a function for detecting external information upon driving, recognizing a peripheral environment using a function for processing the detected external information, autonomously determining a driving route and independently driving the vehicle. That is, the controller 190 may automatically drive the vehicle 1 along a specific route using the autonomous driving function without operation of the driver. The autonomous driving function may be different from a driving assistance function in that the vehicle is driven without operation of the driver. That is, the driving assistance function can partially control the speed or motion of the vehicle but is different from the autonomous driving function in that operation of the driver is required to drive the vehicle along a predetermined route.

Some components of the control device 50 described with reference to FIG. 2 may be used in the display apparatus 100 according to the embodiments of the present invention. That is, the display apparatus 100 may include only some components of the control device 50 of the vehicle 1.

The display apparatus 100 according to the embodiments of the present invention can increase safety during driving and driver convenience by controlling the display 170 according to the internal environment information, external environment information or driving mode of the vehicle 1, which will be described in greater detail below.

Figure 3:
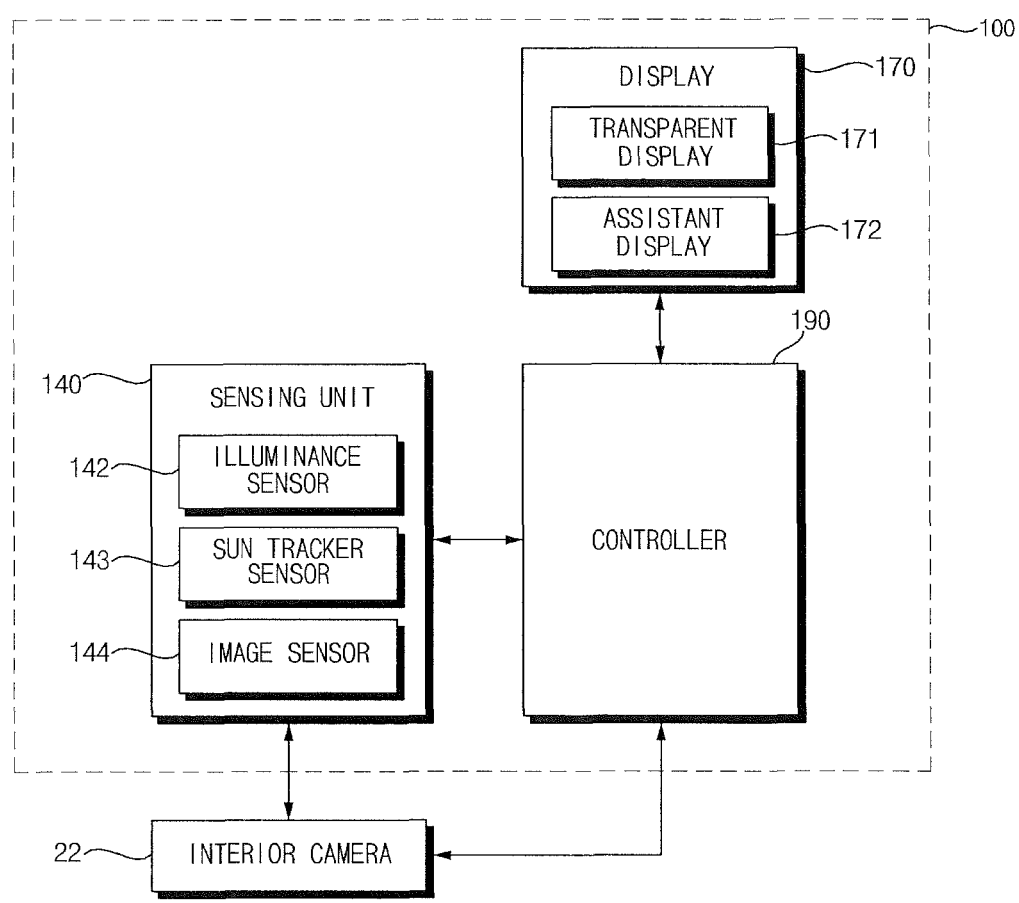
FIG. 3 is a diagram showing the function of a display apparatus according to a first embodiment of the present invention.

FIG. 3 is a diagram showing the function of a display apparatus 100 according to a first embodiment of the present invention.

Referring to FIG. 3, the display apparatus 100 according to the first embodiment of the present invention includes a display 170, a sensing unit 140 and a controller 190. At this time, the display 170 includes at least one transparent display 171. In addition, the display 170 may include at least one assistant display 172.

First, the transparent display 171 has a predetermined transmittance or more and may change a display state or display a variety of information based on data (e.g., a control signal) received from the controller 190.

The sensing unit 140 acquires internal environment information of the vehicle. The sensing unit 140 may include at least one sensor for sensing the internal environment of the vehicle 1.

The controller 190 controls operation of the transparent display 171 and the sensing unit 140. For example, the controller 190 activates at least some of the sensors included in the sensing unit 140 to receive information sensed by the activated sensors. In addition, the controller 190 may generate information corresponding to the internal environment information received from the sensing unit 140 and control display of the generated information on the transparent display 171.

More specifically, the transparent display 171 is applicable to the various windows 12 shown in FIG. 1A. For example, the transparent display 171 may overlap the front window 12A. Alternatively, instead of the front window 12A, the transparent display 171 may be mounted in the vehicle 1. Alternatively, the transparent display 171 may be mounted in the vehicle 1 to overlap the side window 12B or the rear window 12C or instead of the side window 12B or the rear window 12C.

Here, the display state of the transparent display 171 means brightness, transmittance, color, etc. The information displayed on the transparent display 171 may be represented in various forms such as a moving image, a still image, characters, numerals, symbols, etc. For example, on the transparent display 171, numerical information indicating the speed of the vehicle 1 and symbol information indicating a route to be traveled may be displayed. However, the present invention is not limited to information related to driving of the vehicle 1 and a variety of content such as movies, the Internet, a music playback screen, pictures, etc. may be displayed on the transparent display 171.

The transparent display 171 may be mounted in or attached to the window 12 of the vehicle 1 shown in FIG. 1A or may be mounted in the vehicle 1 instead of the window of the vehicle 1. In particular, the front window 12A of the vehicle 1 may be replaced with the transparent display 171.

In addition, a touch sensor (not shown) may be provided to at least one of both sides of the transparent display 171. The transparent display 171 may detect direct or approaching touch of the driver and provide information of the position, area, strength, direction, speed, etc. of the detected touch to the controller 190. The controller 190 may change the display state of the transparent display 171, information displayed on the transparent display 171 or a control signal related to control of the vehicle 1 based on information related to touch received from the touch sensor. For example, the controller 190 may recognize a gesture intended by the driver based on the trajectory of the touch detected by the transparent display 171 and control (e.g., increase brightness of) the display 170 according to the recognized gesture.

In addition, the transparent display 171 may be implemented via various technologies. Technology for displaying a variety of information on the transparent display 171 may be largely divided into projection type technology and direct view technology.

For example, when the transparent display 171 is implemented by projection type technology, a projection device (not shown) provided in the interior of the vehicle 1 generates a virtual image such that the driver views the virtual image projected onto the transparent display 171.

As another example, when the transparent display 171 is implemented by direct view technology, the transparent display 171 directly displays predetermined information without a projection device. Such direct view technology may be implemented via an electroluminescent display (ELD), an electrochromic display, an electrowetting display, a liquid crystal display, an organic light emitting diode (OLED), etc., for example. Hereinafter, for convenience of description, assume that the transparent display 171 is implemented by direct view technology.

As described above, the sensing unit 140 may sense the interior state of the vehicle 1, analyze data related to the interior state and acquire internal environment information.

Alternatively, the sensing unit 140 may sense the interior state of the vehicle 1 and provide data related to the interior state to the controller 190. The controller 190 may analyze the data received from the sensing unit 140 and acquire internal environment information.

The internal environment information of the vehicle 1 means information about the interior state of the vehicle 1. The controller 190 may acquire the internal environment information not only via the data received from the sensing unit 140 but also via the other various methods.

More specifically, the internal environment information may include driver information and information about the vehicle 1.

The driver information may include the gaze, facial expression, face direction, gesture, etc. of the driver located in the vehicle 1. For example, the sensing unit 140 may include an image sensor 144 and the image sensor 144 may analyze an interior image received from the interior camera 22 and detect the face, eyes, gestures, etc. of the driver appearing on the interior image. In addition, the sensing unit 140 may track change in face direction, facial expression, gaze or gesture of the driver.

For example, the image sensor 144 may extract the color value of each pixel included in the interior image, compare a set of the extracted color values with an eye image pre-stored in the memory 130, and detect a part having an index of similarity of a predetermined value or more as the eyes of the driver. If each pixel is expressed by 8 bits, each pixel may have any one of 256 color values.

In addition, the controller 190 may change the position or size of at least one piece of information displayed on the transparent display 171 according to the point of gaze of the driver detected by the sensing unit 140.

For example, when the point of gaze of the driver is changed from the front side to the right side, the controller 190 may move some of the information displayed on the left side of the transparent display 171 to the right side and gradually enlarge the information. In contrast, when the point of gaze of the driver is changed from the right side to the front side, the controller 190 may move some of the information displayed on the right side of the transparent display 171 to the left side and gradually reduce the information. The changed size of the displayed information may correspond to a movement distance of the point of gaze of the driver on the transparent display 171.

As another example, the controller 190 may compare the gesture detected by the sensing unit 140 with gesture information pre-stored or defined in the memory 130 and display information corresponding to a first gesture on the transparent display 171 when the detected gesture corresponds to the first gesture in the result of comparison. When the detected gesture corresponds to a second gesture in the result of comparison, the controller 190 may change the brightness of the entire area or some area of the transparent display 171 to a predetermined value or less. Alternatively, when the detected gesture corresponds to a third gesture, at least some information displayed on the transparent display 171 may disappear.

The information about the vehicle 1 may include information about interior illuminance of the vehicle 1 or the angle of sunlight introduced into the interior of the vehicle 1. More specifically, the sensing unit 140 may sense the interior illuminance of the vehicle 1 using the illuminance sensor 142. In addition, the sensing unit 140 may sense the position of the sun using a sun tracker sensor 143. The sensing unit 140 may sense the direction of sunlight introduced into the interior of the vehicle 1 using the position of the sun.

The controller 190 compares the interior illuminance of the vehicle 1 sensed by the sensing unit 140 with a pre-stored reference illuminance value. When the interior illuminance of the vehicle 1 is greater than or equal to the pre-stored reference illuminance value as the result of comparison, a graphic object having a predetermined transmittance value or less may be displayed on the transparent display 171. Here, the reference illuminance value is an illuminance value when the driver is blinded by sunlight and may be decided by experimentation. The reference illuminance value may not be fixed and may be changed according to driver input.

A graphic object having a predetermined transmittance value or less may block light (e.g., direct sunlight) directed from the exterior of the vehicle 1 to the interior of the vehicle 1 and may function as a sun visor. Since an element such as a conventional sun visor may be replaced by the transparent display 171, it is possible to increase an interior space of the vehicle 1.

The controller 190 may adjust the position of the graphic object having the predetermined transmittance value or less, which is displayed on the transparent display 171, based on the direction of the sunlight sensed by the sensing unit 140. More specifically, for example, when the sunlight sensed by the sensing unit 140 is directed to the driver eyes appearing on the interior image, the controller 190 may control display of the graphic object having the predetermined transmittance value or less in an area, in which an extension connecting the position of the sun and the point of gaze of the driver intersect, in the entire area of the transparent display 171. Therefore, the display position of the graphic object having the predetermined transmittance value or less may be automatically changed on the transparent display 171 according to the direction of the sunlight, thereby increasing driver convenience and concentration.

Hereinafter, the first embodiment of controlling the display 170 according to the internal environment information will be described in greater detail with reference to FIGS. 4 to 7.

Figure 4:
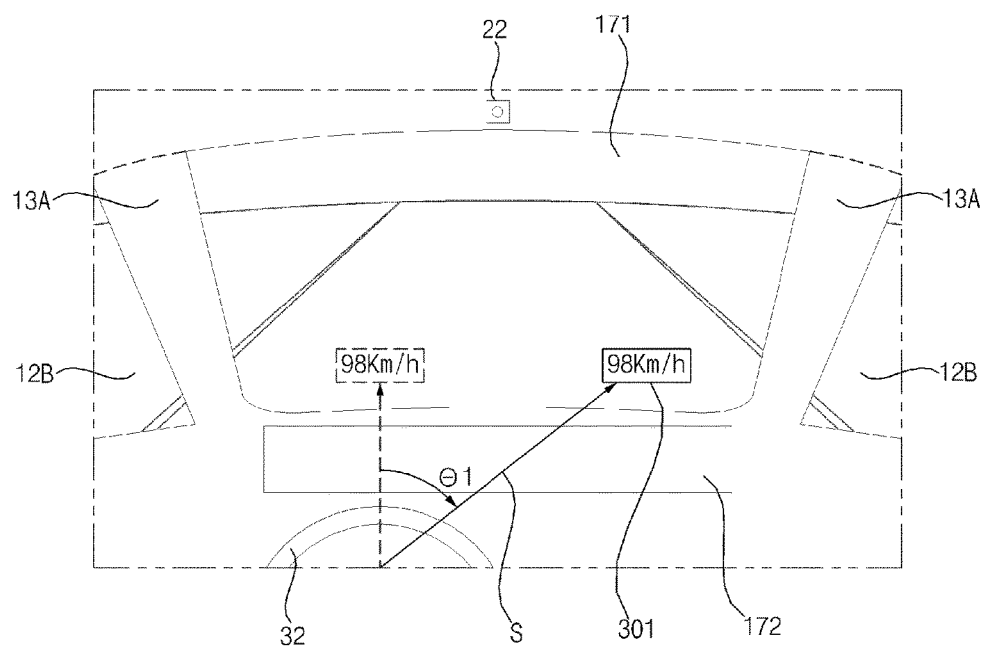
FIG. 4 is a diagram showing an example in which the display apparatus according to the first embodiment of the present invention controls a display.

FIG. 4 is a diagram showing an example in which the display apparatus 100 according to the first embodiment of the present invention controls the display 170. For convenience of description, FIG. 4 shows the case in which the front window 12A is implemented as the transparent display 171.

Referring to FIG. 4, the controller 190 may control operation of the transparent display 171 based on the gaze information of the driver among a variety of internal environment information. The controller 190 may change the position of information 301 displayed in a predetermined area including an intersection between the gaze S of the driver and the transparent display 171.

The interior camera 22 may generate the interior image including the driver and the sensing unit 140 may detect the driver eyes from the interior image and acquire gaze information. In order to generate the interior image including the driver eyes, the interior camera 22 may be provided on the front side of the driver to face the driver as shown.

The controller 180 changes the position of the information 301 indicating the speed of the vehicle 1 based on the gaze information of the driver.

When the gaze S of the driver is directed forward, the controller 190 may display the information 301 indicating the speed of the vehicle 1 in the front area of the driver seat of the entire area of the transparent display 171.

When the gaze S of the driver moves from the front side to the right side by a first angle θ1, the controller 190 may move the information 301 indicating the speed of the vehicle 1 to an area, to which the gaze S of the driver is directed, of the entire area of the transparent display 171. That is, the information 301 may be moved from the left lower end to the right lower end along with the gaze S of the driver.

Although the information 301 indicating the speed of the vehicle 1 is focused upon in FIG. 4, the present invention is not limited thereto. That is, the display position of not only the speed of the vehicle 1 but also a variety of information related to the vehicle 1 on the transparent display 171 may be changed according to the point of gaze of the driver.

The controller may display may display information other than the information displayed on the transparent display 171 on the assistant display 172. For example, information about an electronic map, a music file list, etc. may be displayed on the assistant display 172. The controller 190 may display selected information on any one of the transparent display 171 and the assistant display 172 according to driver input.

Figure 5:
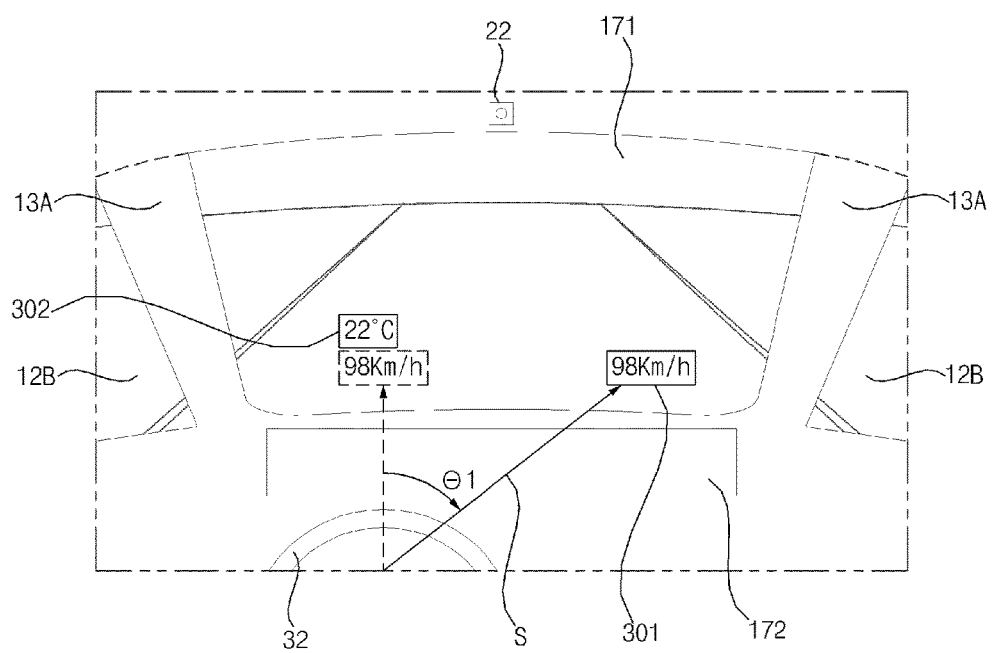
FIG. 5 is a diagram showing another example in which the display apparatus according to the first embodiment of the present invention controls a display.

FIG. 5 is a diagram showing another example in which the display apparatus 100 according to the first embodiment of the present invention controls the display 170. For convenience of description, FIG. 5 shows the case in which the front window 12A is implemented as the transparent display 171.

The controller 190 may not change the display position of specific information even when the point of gaze of the driver is changed. More specifically, a variety of information may be classified into a first group in which the display position of information is changed according to the point of gaze of the driver and a second group in which the display position of information is not related to the point of gaze of the driver.

The information belonging to the first group may be directly related to driving of the vehicle 1. For example, information indicating the speed, route, speed limit, etc. of the vehicle 1 may belong to the first group.

The information belonging to the second group may not be related to driving of the vehicle 1. For example, information indicating played music, broadcast channel, radio volume, indoor temperature, etc. may belong to the second group.

Referring to FIG. 5, one piece of information 302 belonging to the first group and one piece of information 303 belonging to the second group are displayed on the transparent display 171. At this time, assume that the information 301 belonging to the first group indicates the speed of the vehicle 1 and the information 302 belonging to the second group indicates the indoor temperature.

As the point of gaze of the driver moves from the front side to the right side by a first angle θ1, the controller 190 may move the information 301 belonging to the first group to the right side of the transparent display 171 according to the change in gaze of the driver. In contrast, the controller 190 may control the display position of the information 302 belonging to the second group to be unchanged according to change in gaze of the driver. That is, the display position of the information 302 belonging to the second group may not be related to the point of gaze of the driver.

The type or amount of the information belonging to the first group or the second group may be changed according to driver input.

Referring to FIG. 5, information unrelated to driving of the vehicle 1 (that is, information which does not influence the possibility for accidents) may be controlled to be unchanged according to change in gaze of the driver, thereby reducing driver confusion.

Figure 6A:
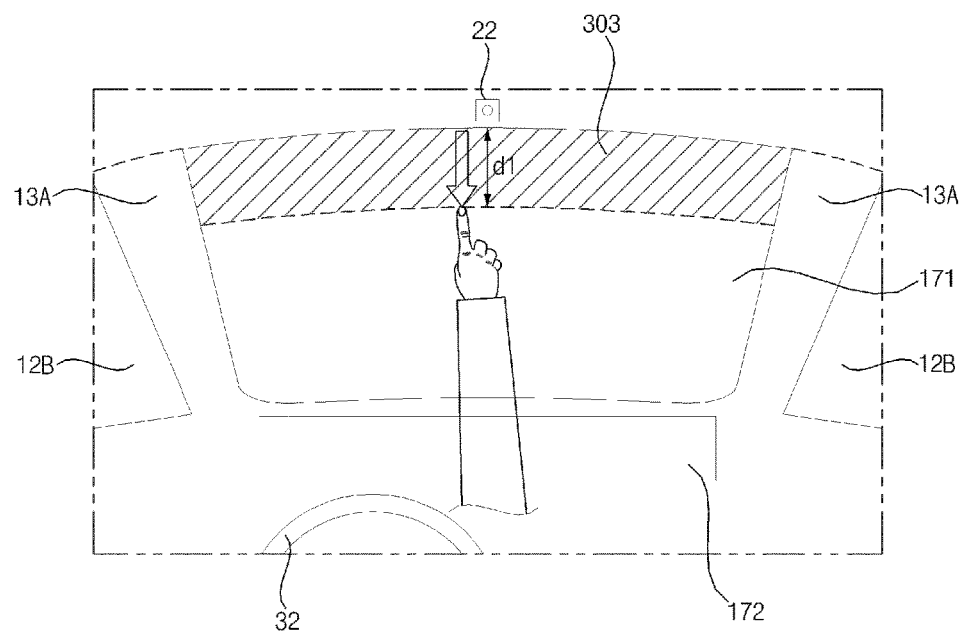
FIGS. 6A to 6C are diagrams showing another example in which the display apparatus according to the first embodiment of the present invention controls a display.
Figure 6B:
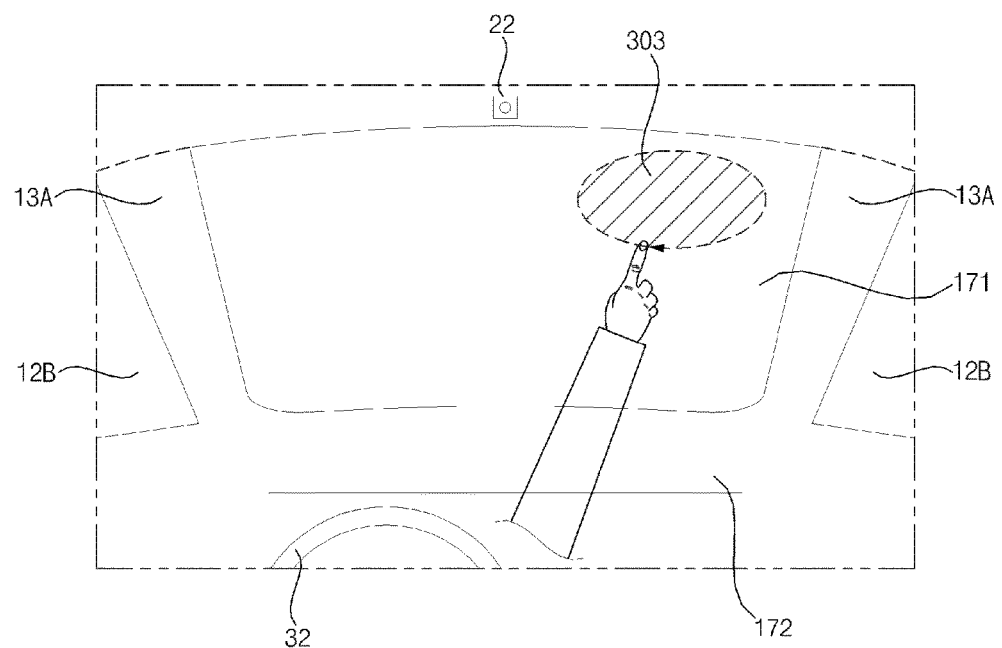
Figure 6C:
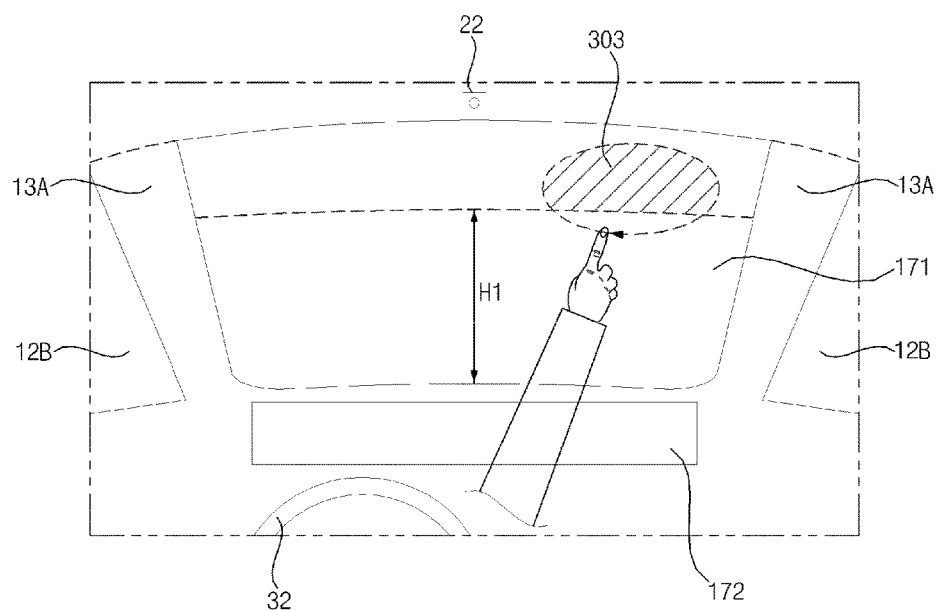

FIGS. 6A to 6C are diagrams showing another example in which the display apparatus 100 according to the first embodiment of the present invention controls the display 170. For convenience of description, FIGS. 6A to 6C show the case in which the front window 12A is implemented as the transparent display 171.

The interior camera 22 may generate an interior image including the driver and the sensing unit 140 may detect a driver gesture from the interior image and acquire gesture information. For example, the sensing unit 140 may detect a gesture corresponding to a trajectory drawn by the finger of the driver facing the transparent display 171 from the interior image. When a pattern corresponding to the detected gesture is present in a variety of pattern information pre-stored in the memory 130, the controller 190 may generate information corresponding to the pattern.

In addition, the controller 190 may display new information on the transparent display 171 or remove displayed specific information according to the direction, movement distance or speed of the detected gesture. Alternatively, the controller 190 may consecutively change the transmittance, brightness, etc. of the transparent display 171 according to the direction, movement distance or speed of the detected gesture.

FIGS. 6A to 6C show the state in which the controller 190 displays information 303 having a predetermined transmittance value or less on the transparent display 171 according to driver gestures. Such information 303 may be used to execute a sun protection function. That is, the information 303 having a predetermined transmittance value or less may be used to execute the function of a sun visor. The controller 190 may determine the display position of the information 303 having a predetermined transmittance value or less in the entire area of the transparent display 171 according to the position of the gesture. For example, the information 303 having a predetermined transmittance value or less may be displayed in an area corresponding to the position where the gesture is finished or between the start and end positions of the gesture in the entire area of the transparent display 171.

First, referring to FIG. 6A, the controller 190 may detect the trajectory of the finger of the driver moved from top to bottom by a predetermined distance d1 as a gesture and display the information 303 having a length corresponding to the movement distance d1 of the detected gesture. At this time, the information 303 may have the same width as the transparent display 171.

Referring to FIG. 6B, the controller 190 may detect the trajectory of the finger of the driver, which indicates a closed curve, as a gesture and display the information 303 having a size corresponding to the closed curve on the transparent display 171. The driver can simply display the information 303 using the gesture in the area having a position and size capable of blocking sunlight in the entire area of the transparent display 171.

Referring to FIG. 6C, the controller 190 may control the information 303 having the predetermined transmittance value or less to be not displayed at a position less than a specific height H1 of the transparent display 171. That is, the controller 190 may display the information 303 having the predetermined transmittance value or less only at the position greater than the specific height H1 of the transparent display 171 in the entire area of the transparent display 171. When some of the closed curve corresponding to the gesture is located at the position less than the specific height H1 of the transparent display 171, the controller 190 may display only the information 303 corresponding to the part of the closed curve located at the specific height H1 or more on the transparent display 171. Therefore, it is possible to prevent the information 303 from being displayed in an extremely low area of the transparent display to obstruct the field of vision of the driver due to a driver mistake.

Figure 7A:
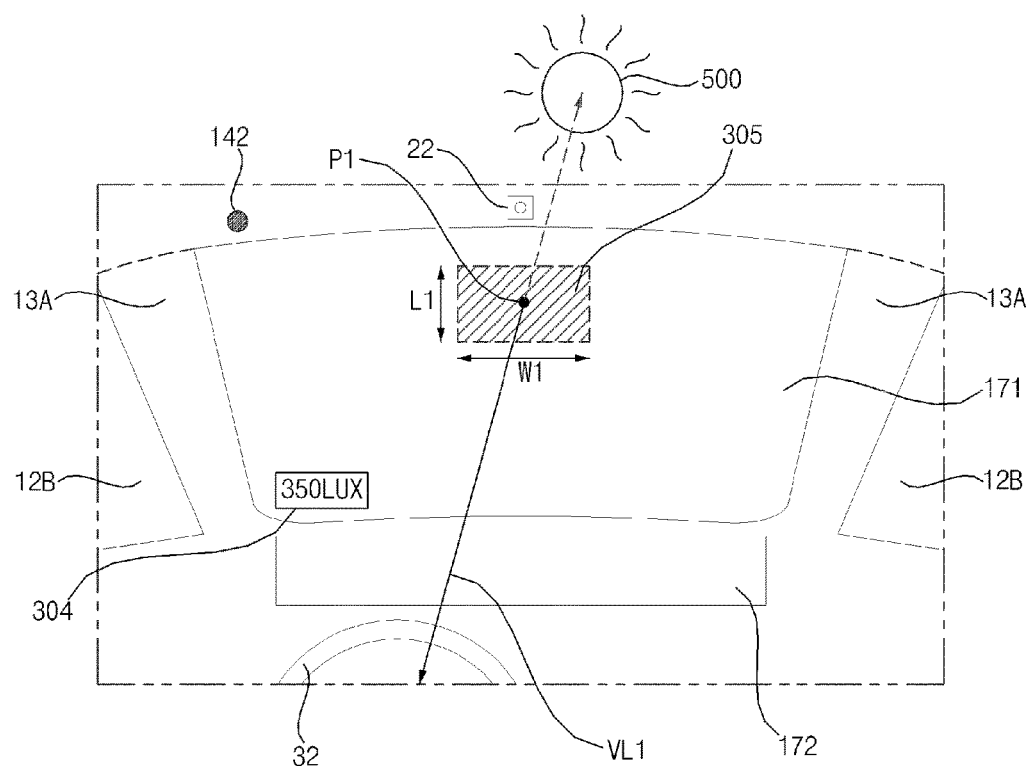
FIGS. 7A and 7B are diagrams showing another example in which the display apparatus according to the first embodiment of the present invention controls a display.
Figure 7B:
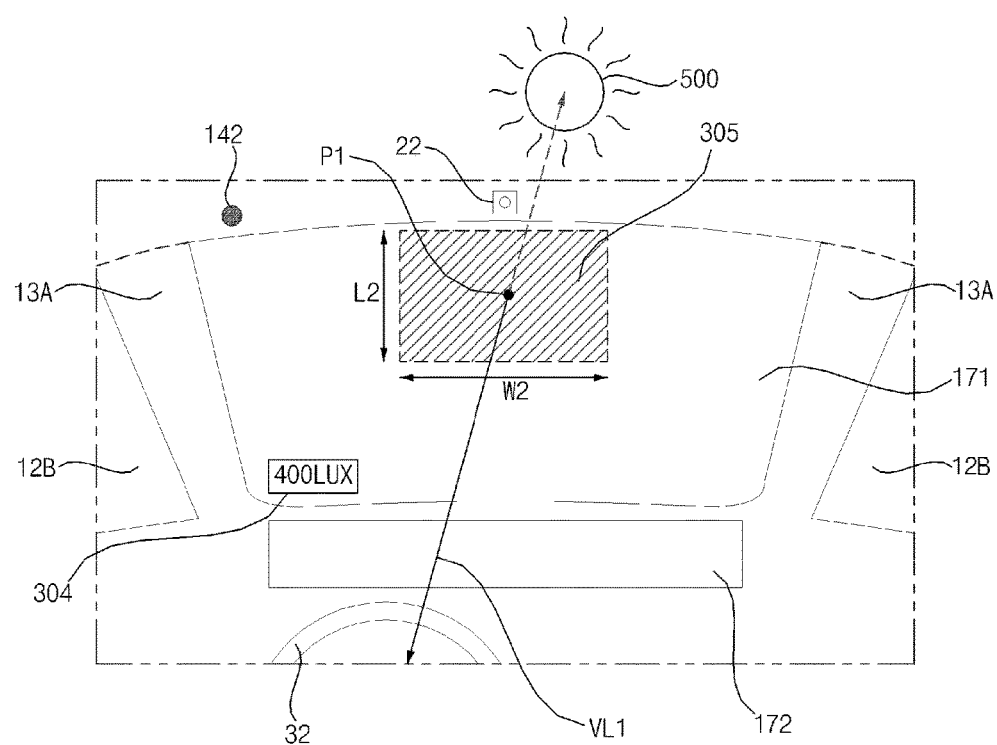

FIGS. 7A and 7B are diagrams showing another example in which the display apparatus 100 according to the first embodiment of the present invention controls the display 170. For convenience of description, FIGS. 7A and 7B show the case in which the front window 12A is implemented as the transparent display 171.

The controller 190 may sense the interior illuminance of the vehicle 1 using the illuminance sensor 142. The controller 190 may display information 304 indicating the value of the sensed illuminance on one side of the transparent display 171. In addition, the sensing unit 140 may sense the position of the sun 500 using the sun tracker sensor 143. The sun tracker sensor 143 may be provided on one side of the vehicle (e.g., the roof).

As the interior illuminance of the vehicle 1 is increased, the driver may be blinded. In order to solve such a problem, the controller 190 may generate and display information 305 having a predetermined transmittance value or less on the transparent display 171 when the sensed illuminance is greater than or equal to a pre-stored value. Therefore, since sunlight introduced into the interior of the vehicle 1 is blocked, the blinding of the driver can be reduced.

Referring to FIG. 7A, the controller 190 may display a graphic object 305 having a size corresponding to the interior illuminance value on the transparent display 171 if the interior illuminance sensed by the illuminance sensor 142 is greater than or equal to a predetermined value. For example, as shown, if the interior illuminance is 350 Lux, the controller 190 may control display of the graphic object 305 having the predetermined transmittance value or less with a width W1 and a length L1.

In addition, the controller 190 may control the display position of the graphic object 305 having the predetermined transmittance value or less based on the position of the sun 500 sensed by the sun tracker 143, when the illuminance sensed by the illuminance sensor 142 is greater than or equal to a predetermined value. More specifically, the controller 190 may determine an area including a point P1 where a virtual line VL1 connecting the point of gaze of the driver and the position of the sun 500 and the transparent display 171 intersect as an area in which the information 305 having the predetermined transmittance value or less is displayed.

FIG. 7B shows a state in which the position of the sun 500 is not changed but the illuminance sensed by the illuminance sensor 142 is increased (see reference numeral "304"), as compared to FIG. 7A. Referring to FIG. 7B, the controller 190 may increase the size of the graphic object 305 having the predetermined transmittance value or less as the sensed illuminance is increased. That is, as shown, when the interior illuminance is increased from 350 Lux to 400 Lux, the controller 190 may control display of the graphic object 305 having the predetermined transmittance value or less with a width W2 and a length L2. At this time, W2 is greater than W1 and L2 is greater than L1. For example, increase of the width and length of the graphic object 305 may be proportional to increase of the interior illuminance. In addition, the maximum size of the graphic object 305 may be determined by experimentation so as not to obstruct the field of vision of the driver.

In contrast, the controller 190 may gradually decrease the size of the graphic object 305 having the predetermined transmittance value or less as the interior illuminance is decreased.

The controller 190 may control the total area of a variety of information displayed on the transparent display 171 not to exceed a predetermined ratio to the total area of the transparent display 171 based on the internal environment information. When the size or amount of information displayed on the transparent display 171 is excessively increased, the field of vision of the driver may be obscured or the attention of the driver may be deteriorated.

For example, when n pieces of information are generated according to the internal environment information of the vehicle 1 and a sum of the display areas of the n pieces of information exceeds 20% the total area of the transparent display 171, the controller 190 may decrease the size of the n pieces of information.

As another example, when n pieces of information is generated according to the internal environment information of the vehicle 1 and a sum of the display areas of the n pieces of information exceeds 20% the total area of the transparent display 171, the controller 190 may display only a predetermined amount of information of the n pieces of information on the transparent display 171 in descending order of priority. For example, the priority of the information indicating the speed of the vehicle 1 may be set to be higher than that of the information indicating information about a music file which is currently being played back. The priority of the information may be set or changed according to driver input.

Figure 8:
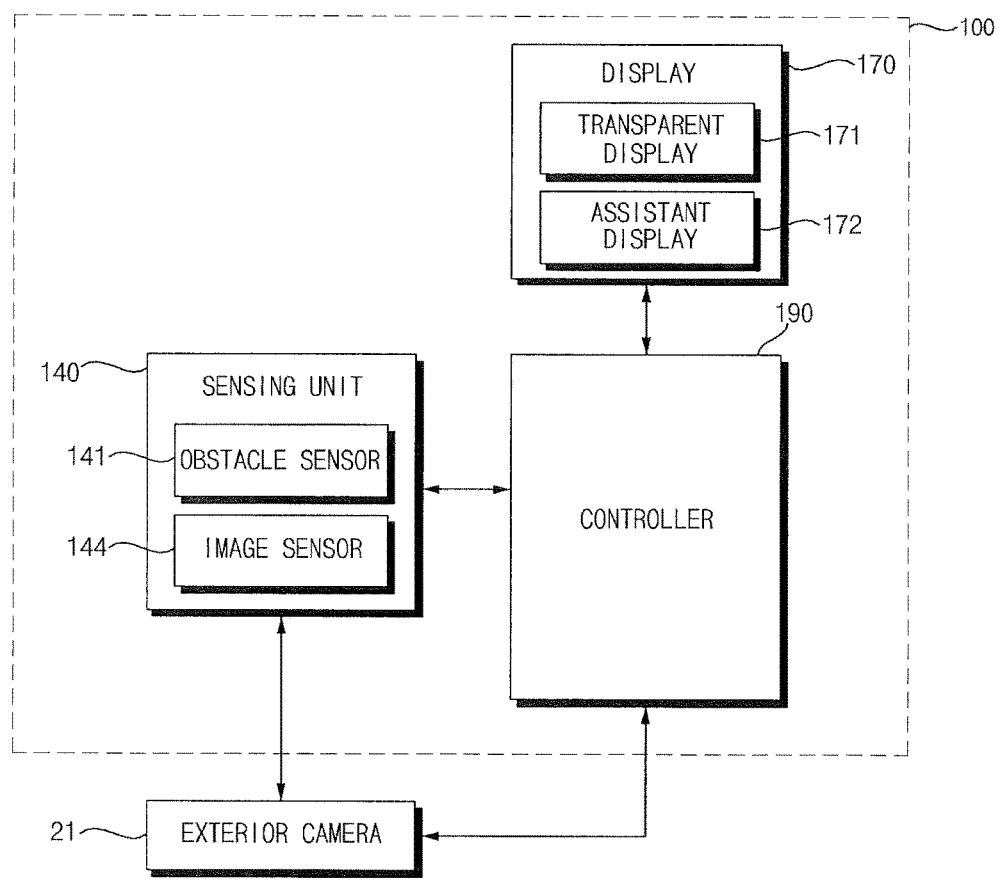
FIG. 8 is a diagram showing the function of a display apparatus according to a second embodiment of the present invention.

FIG. 8 is a diagram showing the function of a display apparatus 100 according to a second embodiment of the present invention.

Referring to FIG. 8, the display apparatus 100 according to the second embodiment of the present invention may include a display 170, a sensing unit 140 and a controller 190. At this time, the display 170 may include at least one transparent display 171. In addition, the display 170 may include at least one assistant display 172. In addition, the display apparatus 100 may further include a communication unit 120.

The transparent display 171 is equal to that of the first embodiment described with reference to FIG. 3 and a detailed description thereof will thus be omitted.

The sensing unit 140 may acquire external environment information of the vehicle 1. The sensing unit 140 may include at least one sensor for sensing the external state of the vehicle 1. Here, the external environment information of the vehicle 1 means information about the external environment of the vehicle 1. For example, the external surrounding environment information may include driving image information, accident information, obstacle information, etc.

More specifically, the driving image information may include a front image, a left image, a right image or a rear image of the vehicle 1. In addition, the driving image information may include an image of a blind spot which cannot be viewed by the driver seated on the driver seat. The sensing unit 140 may generate driving image information using at least one exterior camera 21 provided on the exterior of the vehicle 1.

In addition, the obstacle information may include information about presence/absence of an obstacle located within a predetermined distance from the vehicle 1. In addition, the obstacle information may include information about the distance from the vehicle 1 to the obstacle, the number of obstacles, the position of the obstacle, the speed of the obstacle, etc. The sensing unit 140 may generate obstacle information using the at least one obstacle sensor 141 provided on the exterior of the vehicle 1. The obstacle sensor 141 may include a laser sensor, an ultrasonic sensor, an infrared sensor, etc. The obstacle sensed by the obstacle sensor 141 may include a moving object such as another vehicle or a pedestrian and a fixed object such as a building.

The communication unit 120 receives a variety of information about the external surrounding environment of the vehicle 1 via wired or wireless communication with an external device. The communication unit 120 may receive external environment information from the external device. The external device may be a mobile terminal of a driver or a passenger or an external server. The external environment information received by the communication unit 120 from the external device may include a variety of information such as position information, route information, weather information, accident information, etc.

For example, the communication unit 120 may receive a global positioning system (GPS) signal from the external device and calculate the current position of the vehicle 1 based on the received GPS signal.

In addition, the communication unit 120 may transmit a request for calculating a route including current position and destination information to the external device and receive route information of at least route from the current position to the destination.

In addition, the communication unit 120 may receive weather information of the current position from the external device. The weather information may include a variety of information related to weather, such as temperature, humidity, wind speed, snow, rain, fog, hail, etc.

The communication unit 120 may receive accident information from the external device. At this time, the accident information may include only information about accidents occurring on the route according to the route information. The accident information may include a distance from the current position of the vehicle 1 to an accident point, an accident type, a cause of accident, etc.

The controller 190 may control operations of the display 170, the sensing unit 140 and the communication unit 120. For example, the controller 190 may generate predetermined information based on information received from the sensing unit 140 or the communication unit 120 and display the generated information on the transparent display 171. The controller 190 may analyze data received from the communication unit 120, the sensing unit 140 or the exterior camera 21 and acquire external environment information.

More specifically, the controller 190 may display information corresponding to the driving image received from the exterior camera 21 on the transparent display 171. The exterior camera 21 may be mounted near the bonnet, side-view mirrors, pillar or license plate of the vehicle 1. The position, number, type, etc. of the interior camera 21 mounted on the vehicle 1 may be diverse.

The controller 190 may change the display position of the display 170 according to the type of the driving image. For example, the controller 190 may display a rear image on the center upper area of the transparent display 171, display a left image on the left upper area of the transparent display 171 and display a right image on the right upper area of the transparent display 171.

In addition, the controller 190 may change predetermined information displayed on the display 170 based on the obstacle information received from the sensing unit 140. For example, when an obstacle approaches the vehicle at the left rear side of the vehicle 1, the controller 190 may enlarge the left image displayed on the transparent display 171 in correspondence with the distance from the obstacle. For example, when an obstacle approaches the vehicle at the right rear side of the vehicle 1, the right image displayed on the transparent display 171 may be periodically switched on and off.

In addition, the controller 190 may display information corresponding to the route information received via the communication unit 120 on the transparent display 171. For example, the controller 190 displays information indicating a left arrow on the transparent display 171, when information about a sharp curve to the left within a predetermined distance from the current position of the vehicle 1 is included in the route information. Thereafter, when the vehicle 1 passes the sharp curve, the controller 190 may remove the left arrow from the transparent display 171.

In addition, the controller 190 may display information corresponding to the weather information received via the communication unit 120 on the transparent display 171. For example, the controller 190 may compare the weather information with a pre-stored weather condition (e.g., bad weather) and display information (e.g., a virtual lane) indicating a current driving route on the transparent display 171 if the weather information is equal to the pre-stored weather in the result of comparison.

In addition, the controller 190 may display information corresponding to a blind spot image received from the exterior camera 21 on the display 170. For example, one assistant displays 172 may be provided to the interior surface of each front pillar 13A of the vehicle 1 and one exterior cameras 21 may be provided to the exterior surface of each front pillar 13A. In this case, the controller 190 may display the blind spot image received from the exterior camera 21 provided on the exterior surface of the front pillar 13A on the assistant display 172 provided to the interior surface of the front pillar 13A.

Figure 9A:
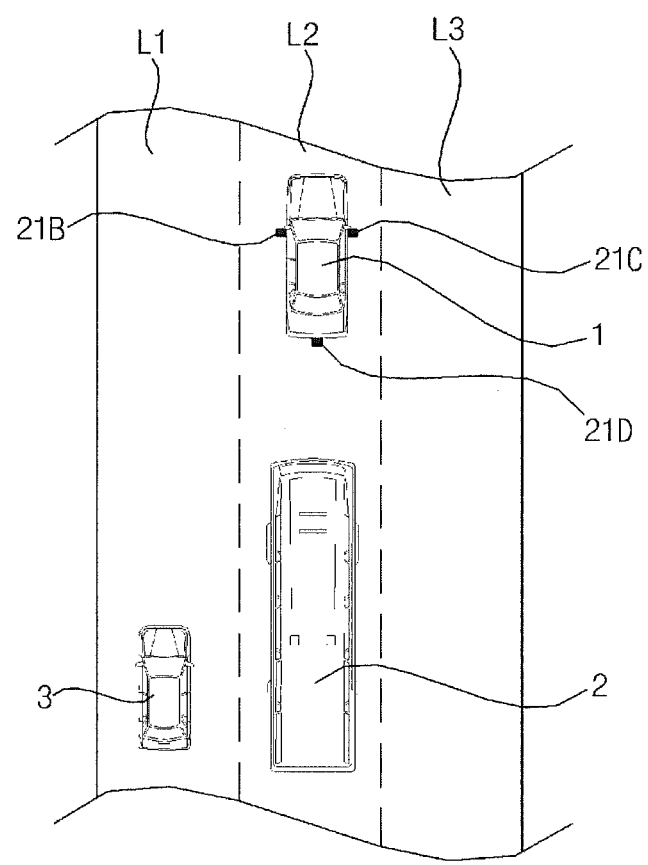
FIGS. 9A and 9B are diagrams showing an example in which the display apparatus according to the second embodiment of the present invention controls a display.
Figure 9B:
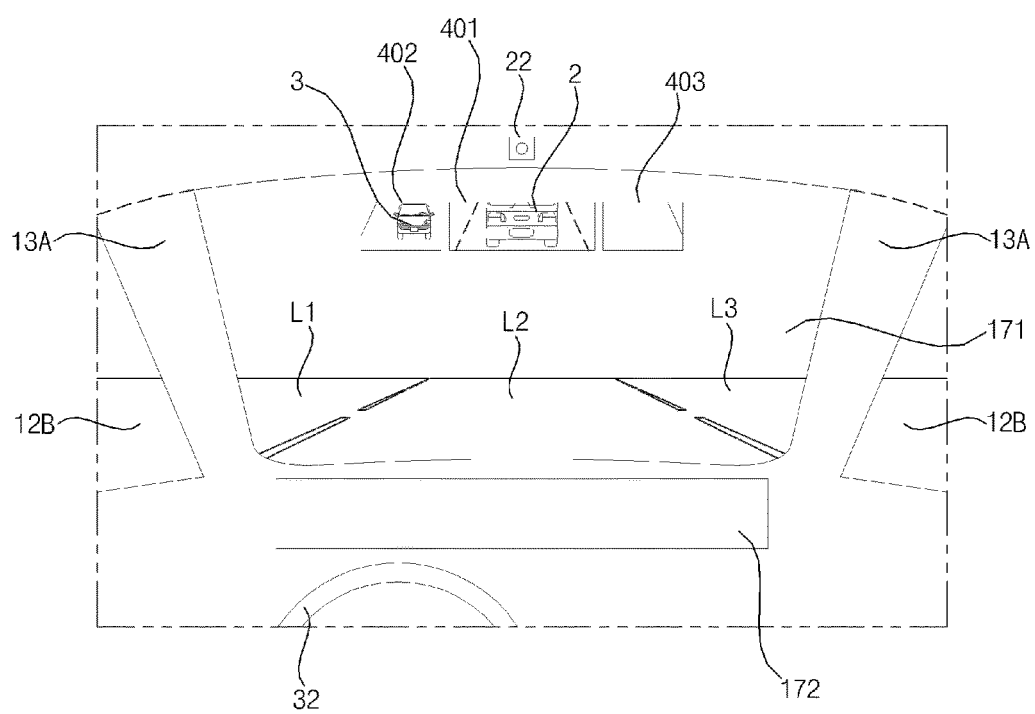

FIGS. 9A and 9B are diagrams showing an example in which the display apparatus 100 according to the second embodiment of the present invention controls the display 170. FIGS. 9A and 9B show the case in which the front window 12A is implemented as the transparent display 171.

The controller 190 may generate a driving image using the exterior camera 21 provided in the vehicle 1. Several exterior cameras 21 may be provided at various positions of the exterior of the vehicle 1 to capture the periphery of the vehicle 1. On the driving image, various objects such as other vehicles located near the vehicle 1 and ground state such as lane may be displayed.

FIG. 9A shows a state in which the vehicle 1 is driving on a three-lane road. Assume that no vehicle is driving in front of the vehicle 1. Referring to FIG. 9A, the vehicle 1 is driving in a second lane L2 of the three-lane road. In addition, a bus 2 is driving in the second lane L2 behind the vehicle 1 and a compact car 3 is driving in a first lane L1 at the left rear side of the vehicle 1. In addition, no vehicle is driving in the third lane L3.

FIG. 9B shows an example in which a left image 402, a right image 403 and a rear image 401 are displayed on the transparent display 171 in the state shown in FIG. 9A. The controller 190 may display the left image 402 at the left side of the rear image 401 and display the right image 403 at the right side of the rear image 401. Referring to FIG. 9A, the left image 402 may be generated by the second exterior camera 21B, the right image 403 may be generated by the third exterior camera 21C and the rear image 401 may be generated by the fourth exterior camera 21D.

In this case, the bus 2 which is driving in the second lane L2 may appear on the rear image 401, the compact car 3 which is driving in the first lane L1 may appear on the left image 402 and only the ground of the third lane L3 in which no vehicle is driving may appear on the right image 403.

Since the driver may check the circumstance of the vehicle 1 via the driving image displayed on the transparent display 171, even when the driver wishes to change the lanes or pass another vehicle, the driver need not change the gaze in order to check the distance from another vehicle.

The rear image 401 may replace the function of a rear-view mirror. In addition, the left image 402 and the right image 403 may supplement or replace the function of side-view mirrors (see reference numerals 14A and 14B of FIG. 1A) mounted at both sides of the vehicle 1.

The driving image may include not only the left image 402, the right image 403 and the rear image 401 but also a front image generated by the first exterior camera 21A and a blind spot image generated by fifth and sixth exterior cameras 21F.

Figure 10A:
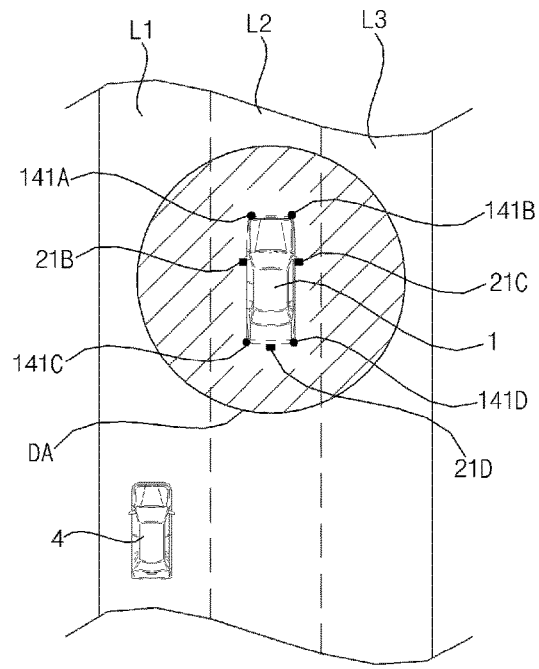
FIGS. 10A and 10B are diagrams showing another example in which the display apparatus according to the second embodiment of the present invention controls a display.
Figure 10A:
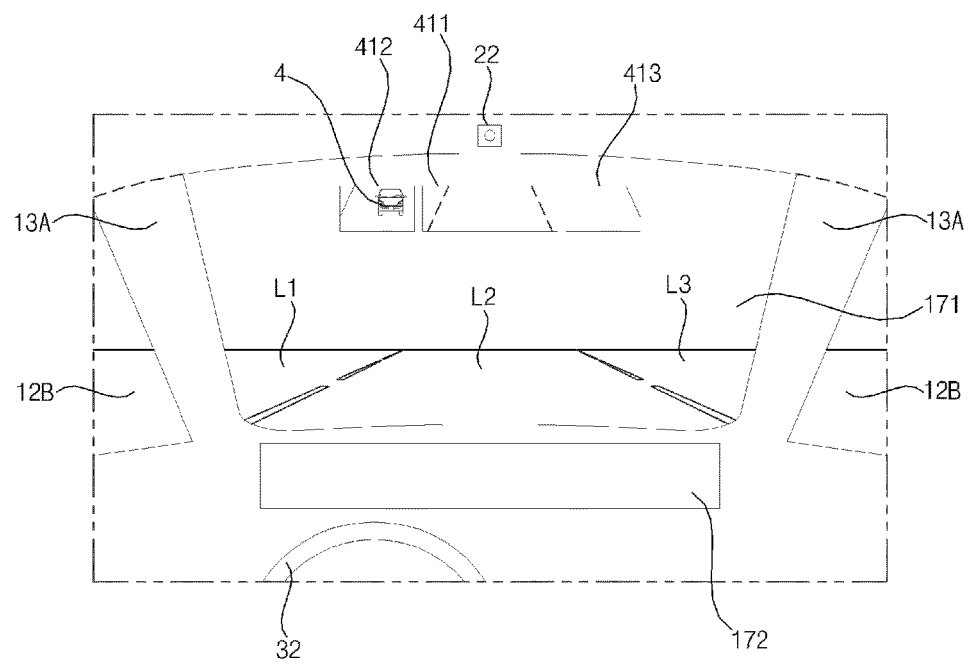
Figure 10B:
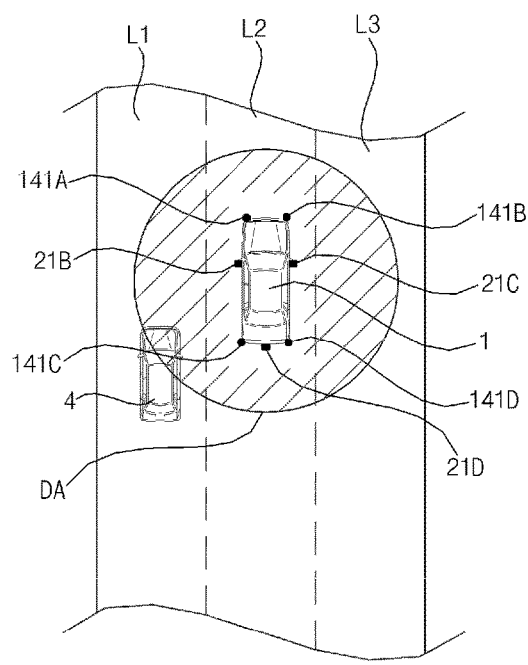
Figure 10B:
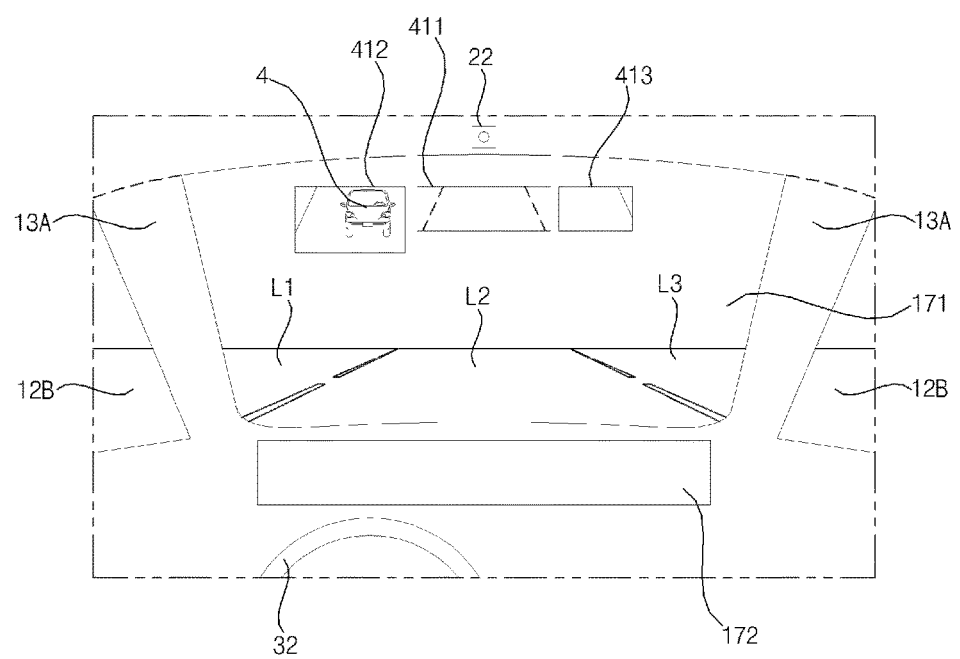

FIGS. 10A and 10B are diagrams showing another example in which the display apparatus 100 according to the second embodiment of the present invention controls the display 170. FIGS. 10A and 10B show the case in which the front window 12A is implemented as the transparent display 171.

The controller 190 may change the size, position, color, transmittance, etc. of the driving image displayed on the transparent display 171 according to the external environment information of the vehicle 1.

FIGS. 10A and 10B shows a state in which the controller 190 controls the size of any one piece of driving image displayed on the transparent display 171 according to obstacle information of the external environment information, for convenience of description. The obstacle sensor 141 may sense an obstacle located within a detection area (hereinafter, referred to as a DA) of the vehicle 1 and the controller 190 may control the size of the driving image based on the sensed obstacle information. The detection area DA may have a circular shape centered on the center of gravity of the vehicle 1.

Several obstacle sensors 141 may be mounted at various positions of the exterior of the vehicle 1. For convenience of description, FIGS. 10A and 10B illustrate a state in which four obstacle sensors 141A to 141D are mounted.

Referring to FIG. 10A, the left image 412, the rear image 411 and the rear image 413 may be displayed on the transparent display 171 in parallel as the driving images. As shown, since no obstacle is located in the detection area DA, the controller 190 does not change the size of the driving image.

Referring to FIG. 10B, as another vehicle 4 moves into the detection area DA, at least one of the four obstacle sensors 141A to 141D may sense the vehicle 4 as an obstacle. Since the vehicle 4 appears on the left image 412 generated by the second exterior camera 21B, the controller 190 may increase only the size of the left image of the driving images which are being displayed on the transparent display 171. The controller 190 may increase the size of the left image 412 within a predetermined area as the vehicle 4 approaches the vehicle 1. Of course, when the vehicle 4 moves away from the vehicle 1 to escape from the detection area, the controller 190 may return the increased size of the left image 412 to the original size of the left image.

Although FIG. 10B shows the state of controlling the size of the driving image, this is only exemplary and the other visual effects may be generated. For example, when an obstacle is located in the detection area DA, the controller 190 may change the color of at least some border of the driving images which are being displayed on the transparent display 171 to red and control light to flicker on and off.

Figure 11A:
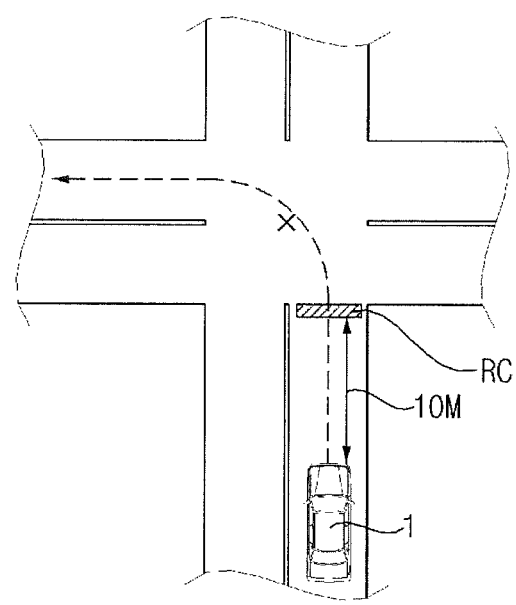
FIGS. 11A and 11B are diagrams showing another example in which the display apparatus according to the second embodiment of the present invention controls a display.
Figure 11B:
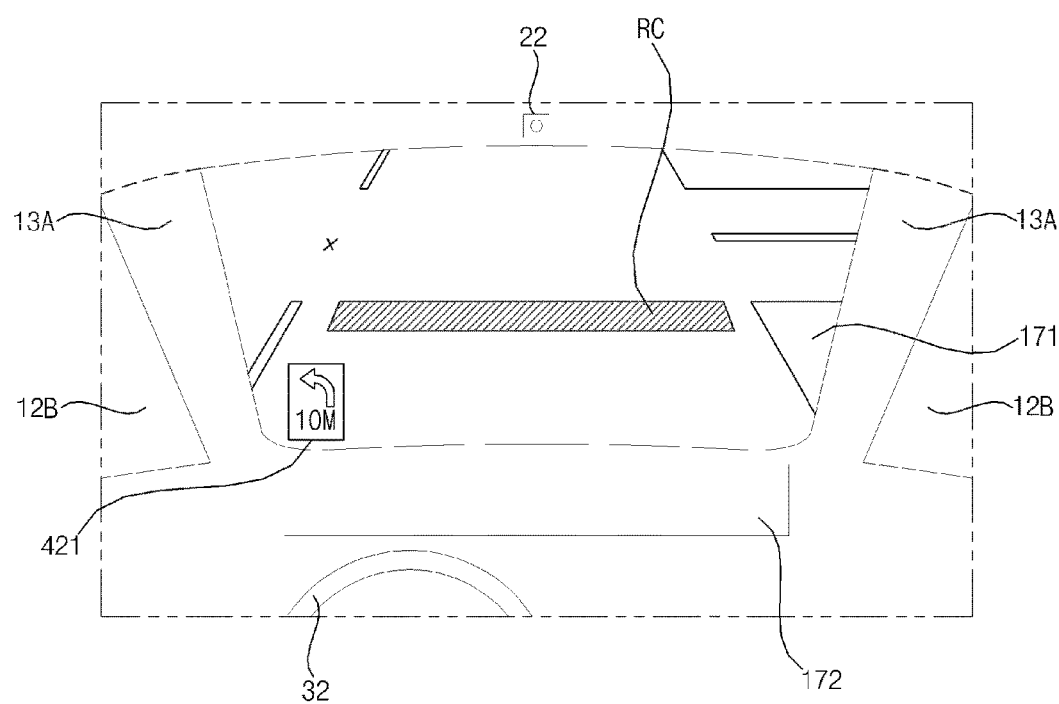

FIGS. 11A and 11B are diagrams showing another example in which the display apparatus 100 according to the second embodiment of the present invention controls the display 170. For convenience of description, FIGS. 11A and 11B show the case in which the front window 12A is implemented as the transparent display 171.

The controller 190 may display information 421 corresponding to route information received via the communication unit 120 on the transparent display 171. The information corresponding to the route information may be changed according to the current position of the vehicle 1. For example, when the vehicle 1 passes a first position on the route, the information displayed on the transparent display 171 may be different from information displayed at a second position on the route.

Referring to FIG. 11A, the controller 190 may determine a course change point RC closest to the current position of the vehicle 1 based on the route information. As shown, when a left-hand turn section is present on a current driving route, the course change point RC may correspond to a point just before the vehicle 1 enters an intersection, as shown.

FIG. 11B shows an example of the information 421 displayed on the transparent display 171 in the state of FIG. 11A. For convenience of description, assume that the information 421 includes an arrow image indicating a scheduled travel direction and a text indicating a distance to the course change point RC.

The controller 190 may display the information 421 indicating the left-hand turn section on the transparent display 171 when the current position of the vehicle 1 is within a predetermined distance from the course change point RC on the route according to the route information. The information 421 may include an arrow image indicating a scheduled travel direction.

In this case, the display position of the information 421 may be changed according to the driving direction of the vehicle 1 to be changed at the course change point RC. For example, at the course change point RC connected to the left-hand turn section, as shown, the controller 190 may display the information 421 at the left side of the transparent display 171. In contrast, at the course change point RC connected to the right-hand turn section, the information 421 may be displayed at the right side of the transparent display 171.

Figure 12A:
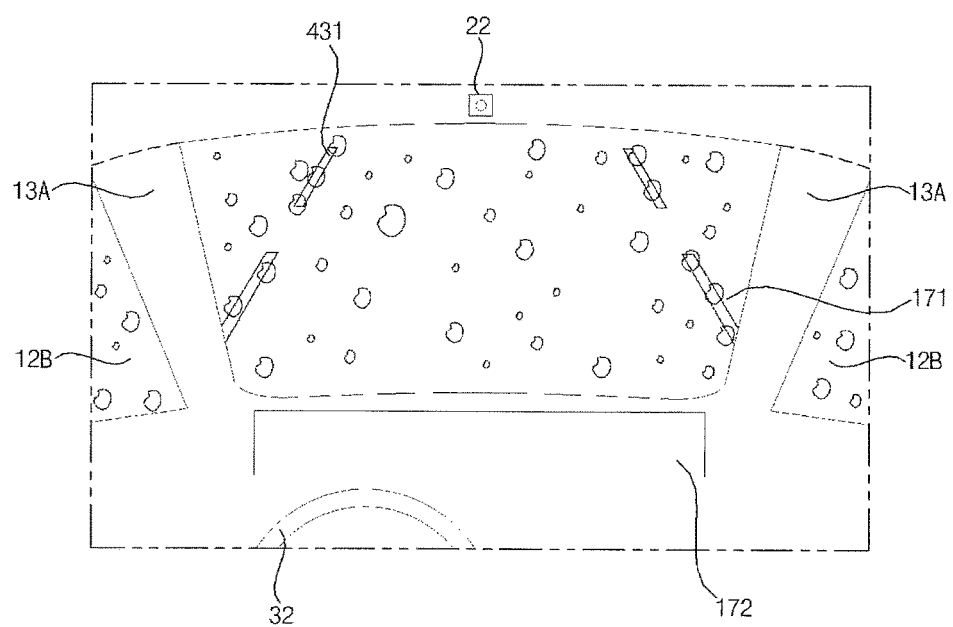
FIGS. 12A and 12B are diagrams showing another example in which the display apparatus according to the second embodiment of the present invention controls a display.
Figure 12B:
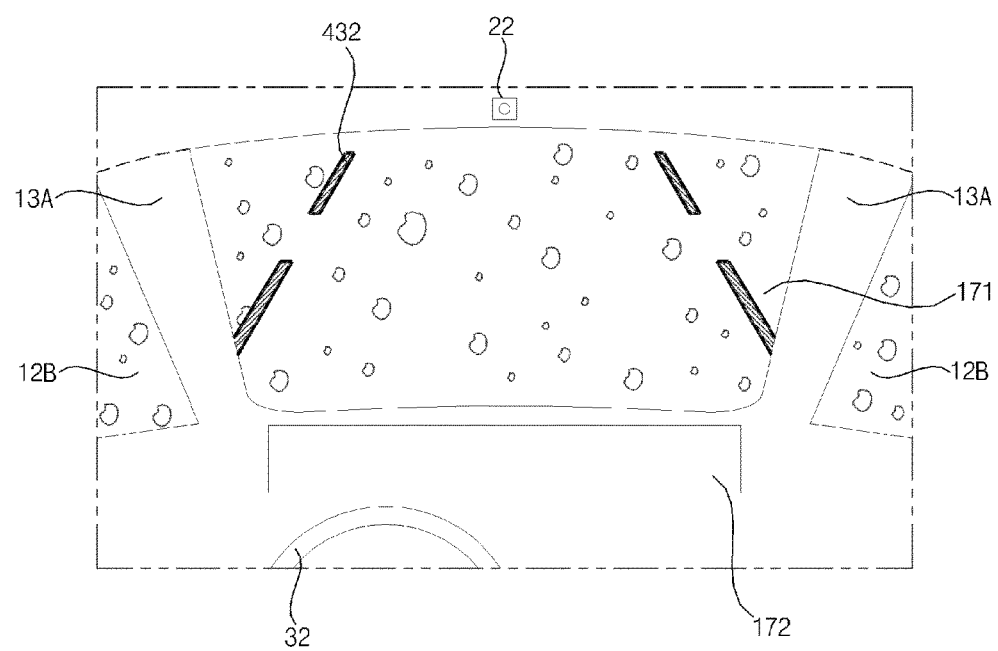

FIGS. 12A and 12B are diagrams showing another example in which the display apparatus 100 according to the second embodiment of the present invention controls the display 170. For convenience of description, FIGS. 12A and 12B show the case in which the front window 12A is implemented as the transparent display 171.

The controller 190 may display the weather information received via the communication unit 120 on the transparent display 171. The weather information may be changed according to the type of weather. The controller 190 may compare the weather information with a pre-stored weather condition and display a graphic object indicating a current driving route on the transparent display 171 when it is determined that the current weather corresponds to bad weather.

In FIGS. 12A and 12B, for convenience of description, assume that the current weather determined based on the weather information is heavy rain corresponding to bad weather.

First, referring to FIG. 12A, as raindrops run down the outside of the transparent display 171, an actual lane 431 drawn on the ground of the driving route may not be visible to the driver.

FIG. 12B shows an example of a virtual lane 432 displayed on the transparent display 171 in the state shown in FIG. 12A. The controller 190 may display the virtual lane 432 on the transparent display 171 as information indicating the current driving route. The controller 190 may display the virtual lane 432 at a position corresponding to the actual lane 431 in the entire area of the transparent display 171. As a result, the driver may check the virtual lane 432 overlapping the actual lane 431.

More specifically, the route information received via the communication unit 120 may include the number of lanes on which the vehicle 1 is currently driving, a curve direction, a road width, etc. Accordingly, the controller 190 may determine and display the direction, form, length, width, etc. of the virtual lane 432 corresponding to the current position of the vehicle 1 on the transparent display 171 based on the route information.

Referring to FIGS. 12A and 12B, when a possibility that an obstacle occurs in the field of vision of the driver due to heavy rain is high, the information 432 indicating the driving route of the vehicle 1, such as a virtual lane, may be displayed to aid to improve driver safety.

The controller 190 may analyze the route information and determine whether the vehicle 1 is currently in a no-passing zone. When the vehicle 1 is in a passing zone, the controller 190 may display the information 432 as a dotted line as shown in FIG. 12B. When the vehicle 1 enters a no-passing zone, the controller 190 may change the virtual lane displayed in the form of the dotted line to the virtual lane displayed in the form of a solid line.

Figure 13A:
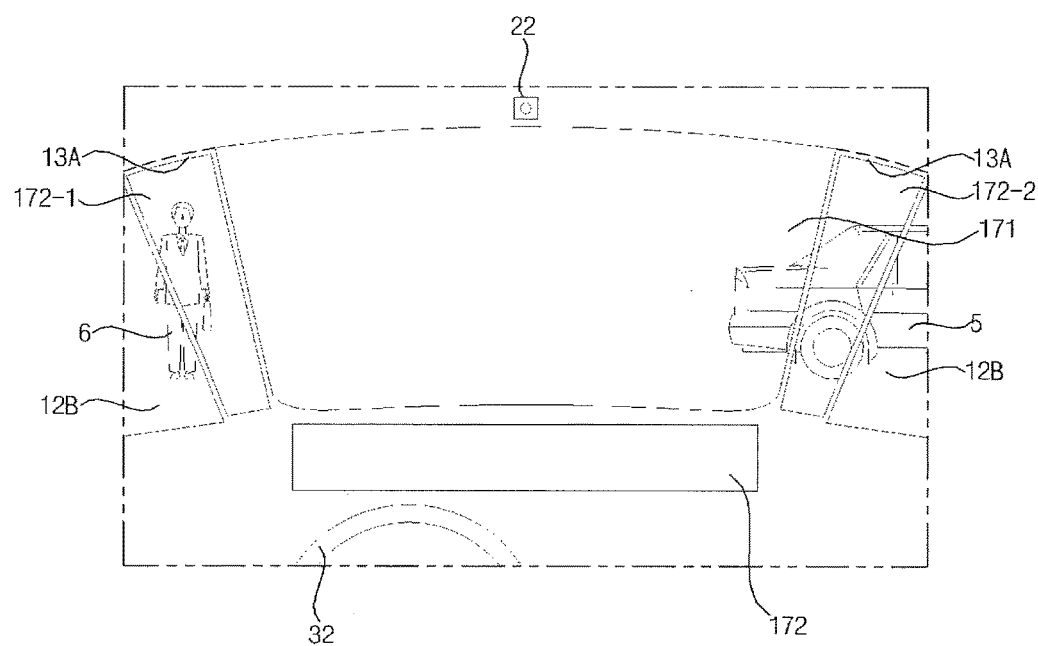
FIGS. 13A and 13B are diagrams showing an example in which the display apparatus according to the second embodiment of the present invention displays a blind spot image.
Figure 13B:
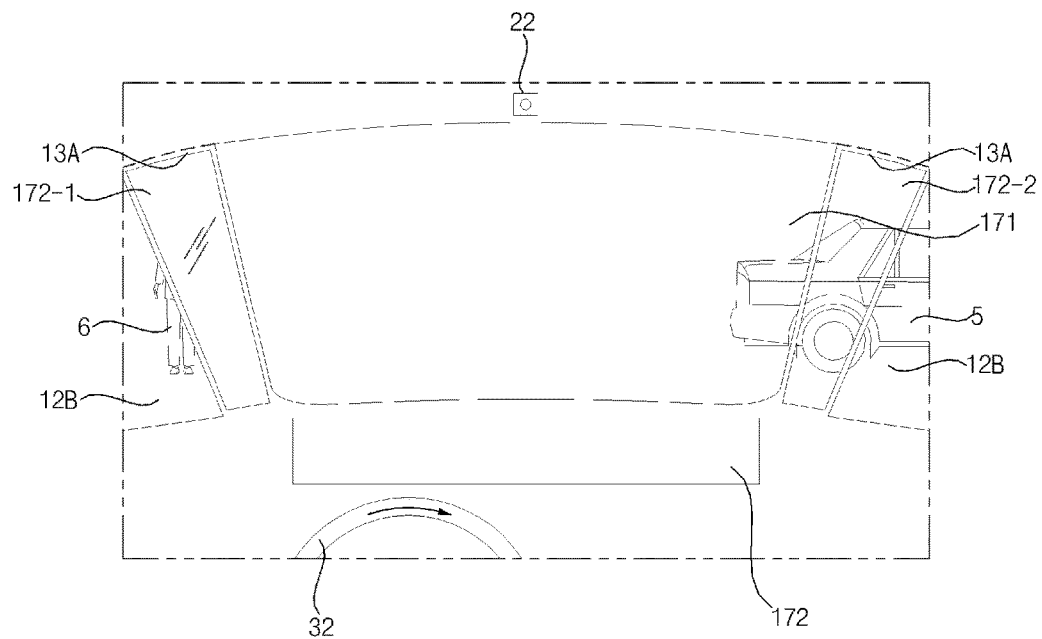

FIGS. 13A and 13B are diagrams showing another example in which the display apparatus 100 according to the second embodiment of the present invention controls the display 170. For convenience of description, FIGS. 13A and 13B show the case in which the front window 12A is implemented as the transparent display 171.

The controller 190 may generate a blind spot image using the exterior camera 21. In the present invention, the blind spot means an area which is not visible to the driver due to obstruction of the field of vision of the driver by a specific part of the vehicle 1.

In FIGS. 13A and 13B, an area in the field of vision of the driver obscured by a pair of front pillars 13A may correspond to a blind spot. For convenience of description, assume that the fifth exterior camera 21E and the sixth camera 21F shown in FIGS. 1A and 1B generate a blind spot image corresponding to the area obscured by the pair of front pillars 13A. In addition, assume that the assistant display 172 is mounted on the interior surface of each front pillar 13A to display the blind spot image generated by the fifth exterior camera 21E and the sixth exterior camera 21F. That is, the blind spot image generated by the fifth exterior camera 21E may be displayed on the assistant display 172-1 mounted on the left front pillar 13A and the blind spot image generated by the sixth exterior camera 21F may be displayed on the assistant display 172-2 mounted on the right front pillar 13A.

Referring to FIG. 13A, a blind spot image, in which a pedestrian 6 obscured by the left front pillar 13A appears, is displayed on the left assistant display 172-1. In addition, a blind spot image on which some of another vehicle 5 obscured by the right front pillar 13A appears is displayed on the right assistant display 172-2. As a result, since the field of vision of the driver may widen as if the front pillar 13A is not present, it is possible to cope with an unexpected situation which may occur during driving.

The controller 190 may individually activate the fifth exterior camera 21E and the sixth exterior camera 21F according to the driving direction of the vehicle 1. FIG. 13B shows an example of displaying a blind spot image according to the rotation direction of the steering wheel 32 of the vehicle 1.

Referring to FIG. 13B, as the driver rotates the steering wheel 32 of the vehicle 1 clockwise for right turn, the controller 190 may display the blind spot image generated by the sixth exterior camera 21F on the right assistant display 172-2 mounted on the right front pillar 13A. Thus, the vehicle 5 may be continuously displayed on the transparent display 171, the right assistant display 172-2 and the right side window 12B. In this case, the controller 190 may turn the fifth exterior camera 21E or the assistant display 172-1 mounted on the left front pillar 13A off. Unlike FIG. 13A, since the pedestrian 6 does not appear on the assistant display 172-1, the upper half of the pedestrian 6 is obscured by the left front pillar 13A.

That is, since collision with an obstacle is changed according to the driving direction of the vehicle 1, the controller 190 may selectively display only some of the blind spot image according to the driving direction of the vehicle 1. Therefore, it is possible to reduce power required to display the blind spot image.

The controller 190 may select a blind spot image to be displayed on the assistant display 172 based on information other than the rotation direction of the steering wheel 32. For example, when a left turn light provided in the vehicle 1 is turned on, the controller 190 may activate the fifth exterior camera 21E to display the blind spot image on the left assistant display 172-1. As another example, when it is determined that the vehicle 1 will enter a right turn section based on the route information, the sixth exterior camera 21F may be activated to display the blind spot image only on the right assistant display 172-2. As another example, when the driver detected from the interior image gazes at the left side, the controller 190 may activate the fifth exterior camera 21E.

Figure 14A:
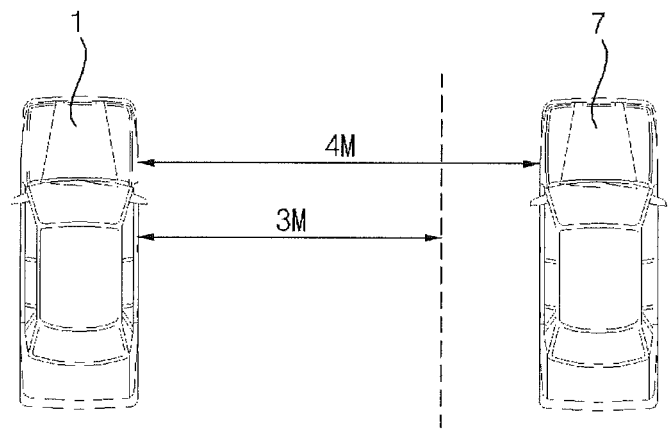
FIGS. 14A and 14B are diagrams showing another example in which the display apparatus according to the second embodiment of the present invention controls a display.
Figure 14A:
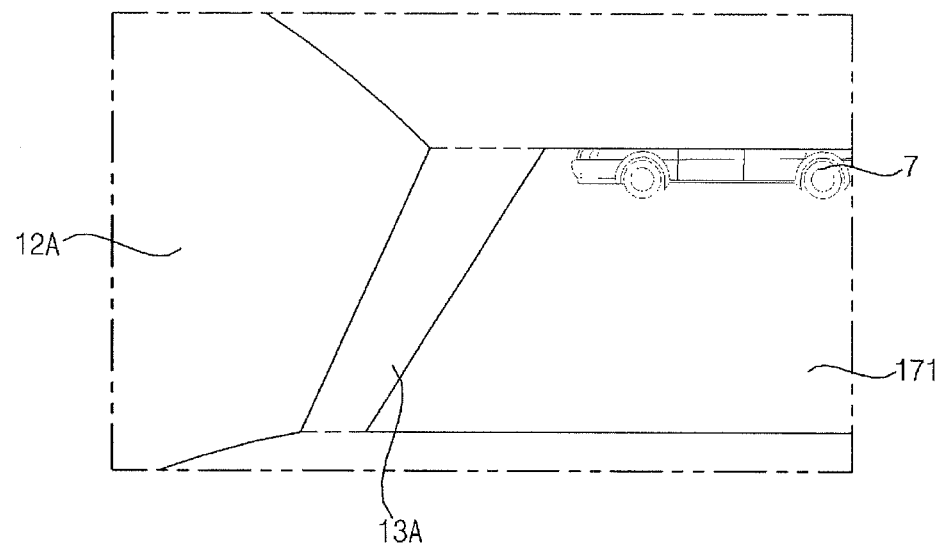
Figure 14B:
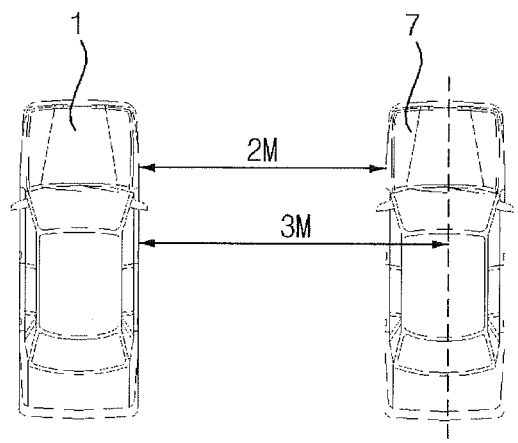
Figure 14B:
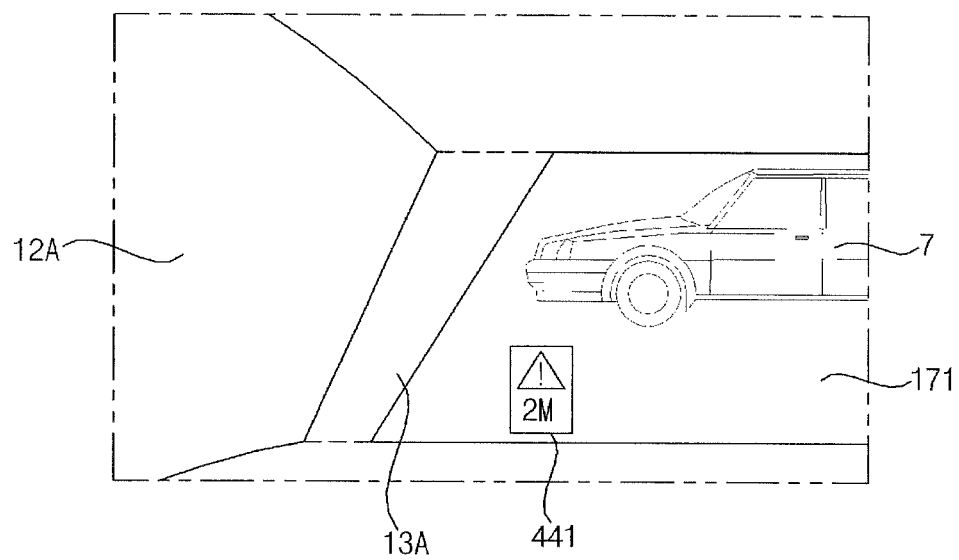

FIGS. 14A and 14B are diagrams showing another example in which the display apparatus 200 according to the second embodiment of the present invention controls the display 170.

The side window 12B as well as the front window 12A may be implemented as the transparent display 171, as described above.

Applying the transparent display 171 to the side window 12B may mean a method of placing the transparent display 171 on the side window 12B or a method of mounting the transparent display 171 instead of the side window 12B. When the transparent display 171 is applied to the side window 12B, the driver can view the outside views of the left and right sides of the vehicle 1. In addition, the driver can confirm a variety of information on the transparent display 171 under control of the controller 190, while viewing the outside views of the left and right sides of the vehicle. For convenience of description, FIGS. 14A and 14B show the case in which the right side window 12B is implemented as the transparent display 171.

FIG. 14A shows the case in which another vehicle 7 is driving at the right side of the vehicle 1 which is currently driving. The sensing unit 140 may sense the distance to the vehicle 7 using the obstacle sensor 141. Information about a risk-of-collision distance may be pre-stored in the memory 130. Assume that the risk-of-collision distance is 3 m. The controller 190 may compare the distance to the vehicle 7 with the risk-of-collision distance and may not display information 441 indicating risk of collision with the vehicle 7 when the distance to the vehicle 7 is greater than the risk-of-collision distance. In the state of FIG. 14A, since the distance to the vehicle 7 is 4 m, which is greater than the risk-of-collision distance of 3 m, the controller 190 may not generate the information 441 indicating risk of collision with another vehicle.

Referring to FIG. 14B, a distance between the vehicle 1 and the vehicle 7 in the state shown in FIG. 14A is reduced such that the vehicle 7 is located within the risk-of-collision distance of 3 m. In this case, the controller 190 may display the information 441 indicating risk of collision with another vehicle sensed via the obstacle sensor 141 on the transparent display 171 applied to the side window 12B. For example, as shown, the information 441 may be expressed by an alert symbol and a numeral indicating the distance to another vehicle.

Although not shown, the left image or the right image corresponding to the image reflected in the side mirrors 14A and 14B may be displayed on the transparent display 171 applied to the side window 12B. As described above, the left image may be generated by the second exterior camera 21B and the right image may be generated by the third exterior camera 21C. When the left image and the right image are displayed on the transparent display 171, the side-view mirrors 14A and 14B mounted outside the vehicle 1 may be obscured by the left image and the right image. Therefore, the driver receives only the left image and the right image to reduce confusion.

The controller 190 may control the total area of a variety of information displayed on the transparent display 171 not to exceed a predetermined ratio to the total area of the transparent display 171 based on the external environment information. When the size or amount of information displayed on the transparent display 171 is excessively increased, the field of vision of the driver may be obscured or the attention of the driver may be deteriorated.

Figure 15:
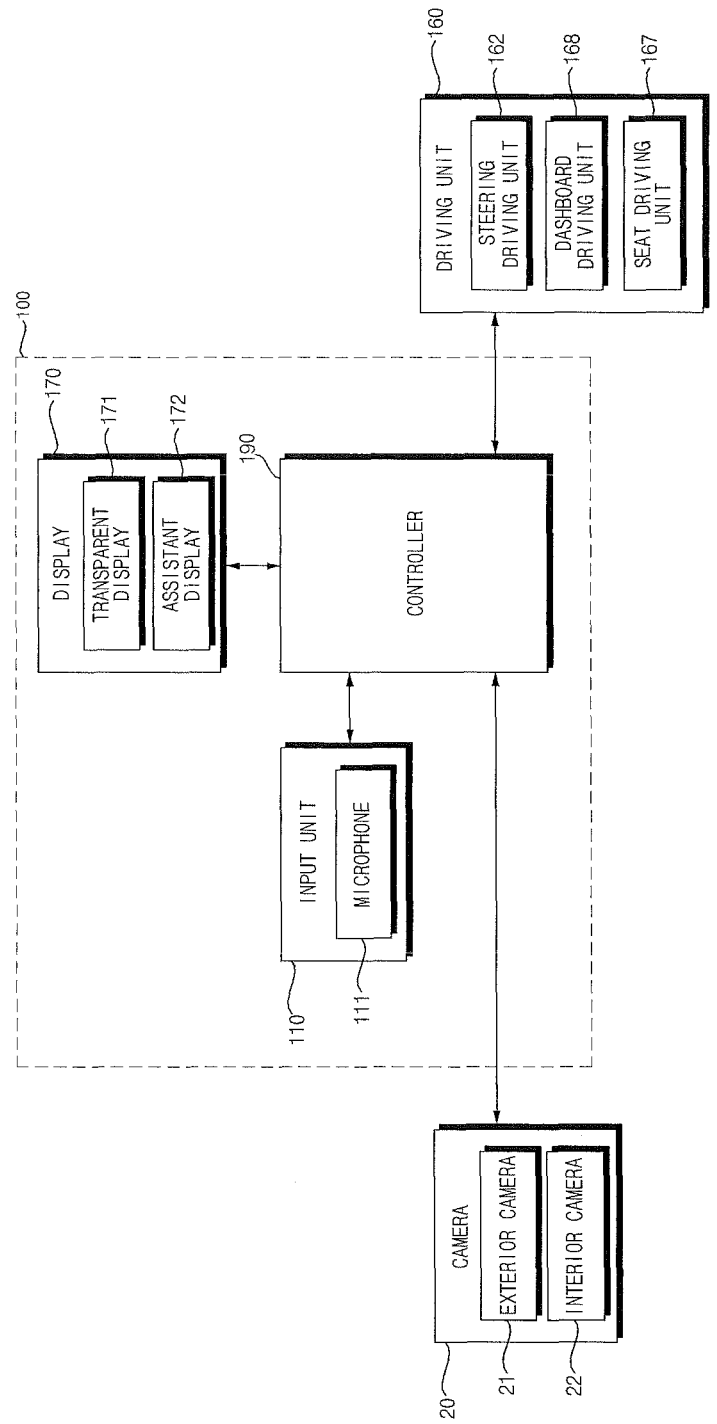
FIG. 15 is a diagram showing the function of a display apparatus according to a third embodiment of the present invention.

FIG. 15 is a block diagram showing the function of a display apparatus 100 according to a third embodiment of the present invention.

Referring to FIG. 15, the display apparatus 100 according to the third embodiment of the present invention may include a display 170, an input unit 110 and a controller 190. At this time, the display 170 may include at least one transparent display 171. In addition, the display 170 may include at least one assistant display 172.

The transparent display 171 is equally applicable to the above-described embodiments and thus a detailed description thereof will be omitted.

The input unit 110 may receive a variety of commands or information from the driver. More specifically, the input unit 110 may receive touch, voice, etc. of the driver. The input unit 110 may be implemented in various forms such as a microphone 111, a mouse, a touch panel, a joystick, a trackball, a switch, a button, etc. The controller 190 may control operation of the display apparatus 100 according to the information received via the input unit 110.

The input unit 110 may receive the driving mode of the vehicle 1 from the driver. The driving mode may be largely divided into a manual driving mode and an autonomous driving mode. The descriptions of the first and second embodiments are equally applicable to the manual driving mode and thus a detailed description thereof will be omitted. The controller 190 may switch the driving mode of the vehicle 1 from any one of the manual driving mode and the autonomous driving mode to the other based on the input information of the driving mode. The controller 190 may generate different control signals according to the driving mode before or after switching the driving mode of the vehicle 1.

The controller 190 may generate a control signal corresponding to the driving mode of the vehicle 1. The display 170 may display predetermined information or change a display state based on the control signal generated according to the driving mode.

For example, the controller 190 may generate a first control signal and control the display state of the transparent display 171 to become a first display state corresponding to the first control signal, when the driving mode of the vehicle 1 is switched from the autonomous driving mode to the manual driving mode. For example, the first display state may be a state in which brightness is maintained at a predetermined value or more.

As another example, the controller 190 may generate a second control signal different from the first control signal and control the display state of the transparent display 171 to become a second display state corresponding to the second control signal, when the driving mode of the vehicle 1 is switched from the manual driving mode to the autonomous driving mode. For example, the second display state may be a state in which brightness is maintained at less than a predetermined value.

As another example, the controller 190 may display the driving image on the transparent display 171 and change the size or position of the driving image according to the driving mode of the vehicle 1. Alternatively, the controller 190 may change the display position of the driving image from the transparent display 171 to the assistant display 172 and control the brightness or transmittance of the transparent display 171 to become a predetermined value or less, when the driving mode of the vehicle 1 is switched from the manual driving mode to the autonomous driving mode. In contrast, the controller 190 may control the brightness and transmittance of the transparent display 171 to become a predetermined value or more and change the display position of the driving image from the assistant display 172 to the transparent display 171, when the driving mode of the vehicle 1 is switched from the autonomous driving mode to the manual driving mode.

Unlike the manual driving mode, in the autonomous driving mode, since the need for the driver to carefully watch the outside view via various windows including the front window 12A is low, the brightness or transmittance of the transparent display 171 applied to the front window 12A may be decreased so as to block the outside view. Therefore, in the autonomous driving mode, it is possible to provide a variety of content to the driver via the transparent display 171 instead of the outside view.

The driving unit 160 changes the positions or postures of various components included in the vehicle 1 under control of the controller 190. For example, the driving unit 160 may control the position or posture of the dashboard 31, the steering wheel 32 or the seat 33 mounted in the interior of the vehicle 1.

For example, when the driving mode of the vehicle 1 is switched from the manual driving mode to the autonomous driving mode, the dashboard driving unit 168 may move the dashboard 31 forward, the steering wheel 32 may be tilted in a predetermined direction along a steering axis, and the seat driving unit 167 may move the seat backward. Therefore, in the autonomous driving mode, as compared to the manual driving mode, an indoor space where the driver may be located may be extended.

In contrast, when the driving mode of the vehicle 1 is switched from the autonomous driving mode to the manual driving mode again, the driving unit 160 may return the position and posture of the dashboard 31, the steering wheel 32 and the seat 33.

Information about the positions or postures of the components of the vehicle 1 varying according to the driving mode may be stored in the memory 130 of the vehicle 1 and may be changed according to the driver input via the input unit 110.

The controller 190 may control operation of the transparent display 171 based on the driving result of the driving unit 160. The driving result of the driving unit 160 may mean movement or rotation of the component, the position or posture of which has been changed. When the positional relationship between the driver and the transparent display 171 is changed according to driving of the driving unit, the controller 190 may control the transparent display 171 based on the changed positional relationship.

For example, assume that the transparent display 171 is formed on the front window 12A of the vehicle 1 and, as the vehicle 1 enters the autonomous driving mode, the driving unit 160 moves the driver seat 33 backward by a predetermined distance. In this case, as a result, a distance between the driver and the transparent display 171 increases. Increase in the distance between the driver and the transparent display 171 may correspond to backward movement of the seat 33. The controller 190 may increase the size of the information displayed on the transparent display 171 as the distance between the driver and the transparent display 171 increases.

Figure 16:
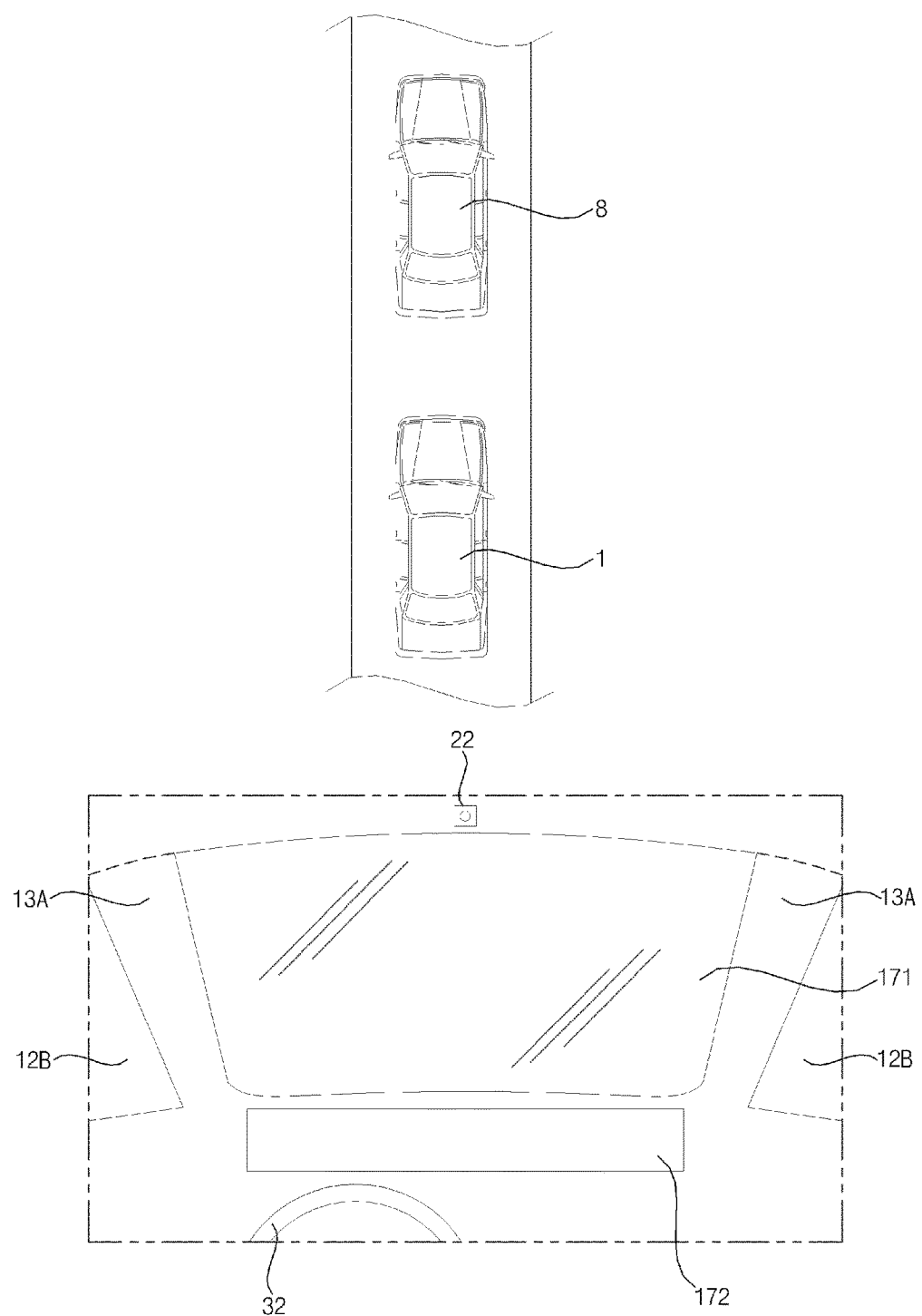
FIG. 16 is a diagram showing another example in which the display apparatus according to the third embodiment of the present invention controls a display.

FIG. 16 is a diagram showing an example in which the display apparatus 100 according to the third embodiment of the present invention controls the display 170. For convenience of description, in FIG. 16, the front window 12A is implemented as the transparent display 171.

The controller 190 may control the transmittance of the transparent display 171 to a predetermined value or less when the driving mode of the vehicle 1 is switched from the manual driving mode to the autonomous driving mode. As the transmittance of the transparent display 171 is controlled to the predetermined value or less, the outside view seen via the transparent display 171 may not be visible to the driver. That is, in the autonomous driving mode, since the front field of vision of the driver may not be secured, the controller 190 may decrease the transmittance of the transparent display 171 such that the front outside view of the vehicle 1 passes through the transparent display 171.

Referring to FIG. 16, as the transmittance of the transparent display 171 is controlled to the predetermined value or less, another vehicle 8 which is driving in front of the vehicle 1 is obscured by the transparent display 171 to be invisible to the driver.

When the driving mode of the vehicle 1 is switched from the manual driving mode to the autonomous driving mode, the attributes of the transparent display 171 changed by the controller 190 is not limited thereto. For example, the controller 190 may control only the brightness of the transparent display 171 without changing the transmittance of the transparent display 171 or may control the transmittance and brightness of the transparent display 171.

Figure 17:
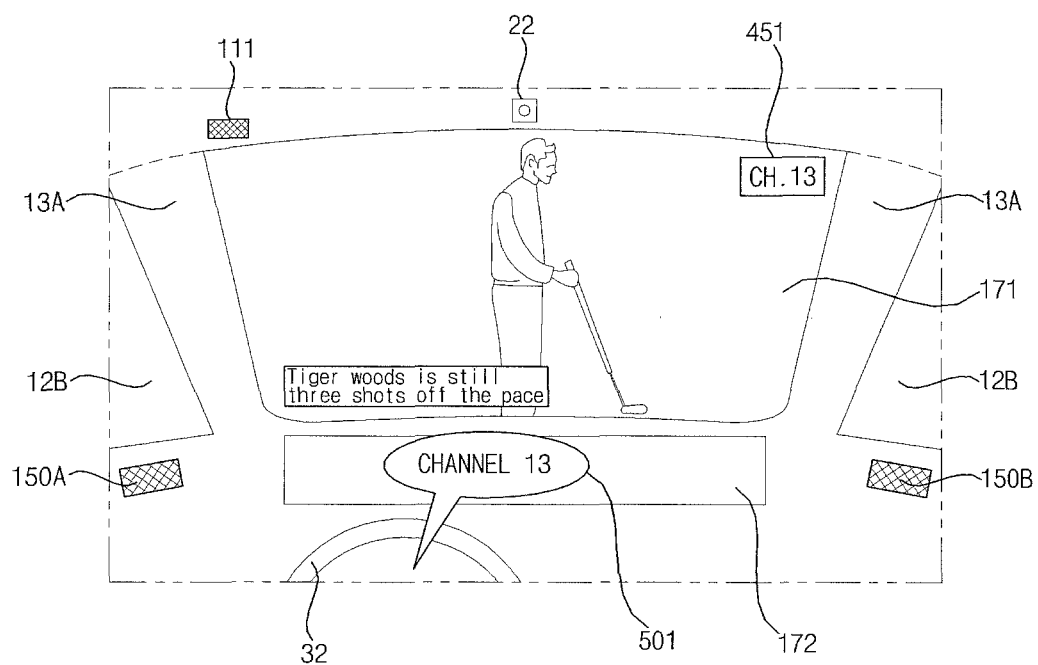
FIG. 17 is a diagram showing another example in which the display apparatus according to the third embodiment of the present invention controls a display.

FIG. 17 is a diagram showing an example in which the display apparatus 100 according to the third embodiment of the present invention controls the display 170. For convenience of description, in FIG. 17, the front window 12A is implemented as the transparent display 171.

Referring to FIG. 17, as shown in FIG. 16, in a state in which the transmittance of the transparent display 171 is controlled to a predetermined value or less, the controller 190 may display information corresponding to a variety of content on the transparent display 171. The content displayed on the transparent display 171 may include broadcast programs, web pages, news, movie, electronic books, games, etc. and the type of content is not specially limited. Such content may be pre-stored in the memory 130 or received via the communication unit 120.

In FIG. 17, for convenience of description, the controller 190 displays a broadcast program among a variety of content on the transparent display 171. The controller 190 may display a broadcast program of a specific channel among a variety of displayable content on the transparent display 171 based on a content selection command received via the input unit 110. For example, the content selection command may be the voice 501 of the driver for setting the specific channel. The input unit 110 may convert the voice 501 of the driver received via the microphone 111 into an electrical signal and the controller 190 may display the broadcast program of the specific channel on the transparent display 171 based on the electrical signal corresponding to the voice 501 of the driver.

When a selected broadcast program is a golf game program, as shown, the golf game program is displayed on the transparent display 171. In addition, the sound output units 150A and 15B may be provided in the interior of the vehicle 1 to output sound included in the content displayed on the transparent display 171. In addition, information 451 indicating the channel information of the broadcast program which is currently being displayed on the transparent display 171 may also be displayed.

That is, referring to FIG. 17, in the autonomous driving mode, the transparent display 171 is used as a content execution screen to make better use of the vehicle 1.

When the driving mode of the vehicle 1 is switched from the manual driving mode to the autonomous driving mode, the controller 190 may change the display position of the driving mode from the transparent display 171 to the assistant display 172.

Figure 18A:
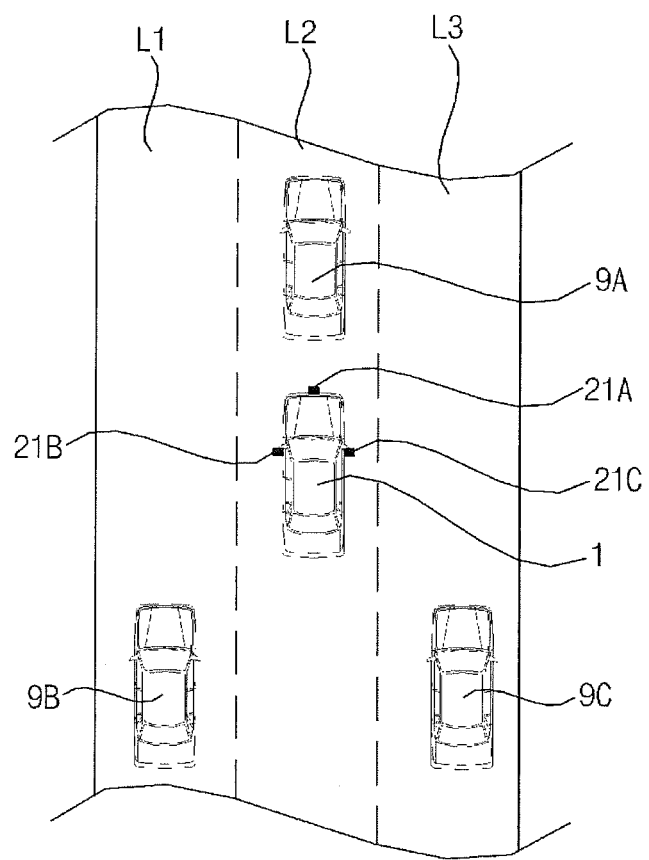
FIGS. 18A and 18B are diagrams showing an example in which the display apparatus according to the third embodiment of the present invention controls a display.
Figure 18B:
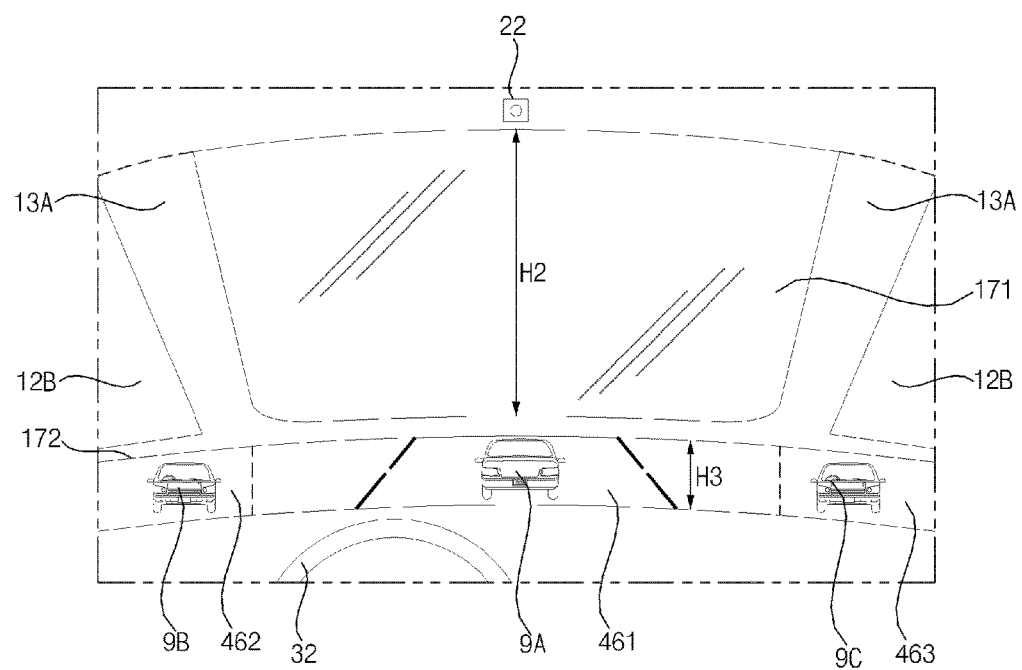

FIGS. 18A and 18B are diagrams showing an example in which the display apparatus 100 according to the third embodiment of the present invention controls the display 170. For convenience of description, assume that the vehicle 1 is currently set to the autonomous driving mode such that the transmittance of the transparent display 171 is controlled to a predetermined value or less as shown in FIG. 16.

First, referring to FIG. 18A, the vehicle 1 is driving in the second lane L2 of a three-lane road, another vehicle 9A which is driving in the second lane L2 is present in front of the vehicle 1, and another vehicle 9B which is driving in the first lane L1 and another vehicle 9C which is driving in the third lane L3 are present at the back of the vehicle 1.

In FIG. 18B, for convenience of description, the front window 12A is implemented as the transparent display 171 and the assistant display 172 is provided in the interior of the vehicle 1. For example, the assistant display 172 may be provided at various positions of the interior of the vehicle 1, such as the lower end of the transparent display 171. The controller 190 may divide the entire area of the assistant display 172 into a plurality of sub-areas and display different information in each sub-area.

Referring to FIG. 18B, a front image 461 on which another vehicle 9A which is driving in the second lane L2 appears may not be displayed on the transparent display 171, transmittance of which is controlled to a predetermined value or less. Instead, the controller 190 may display the front image in a center area of the assistant display 172.

In addition, the controller 190 may display a left image 462 on the left area of the assistant display 172 and display a right image in a right area of the assistant display 172.

The front image 461 may be generated by the first exterior camera 21A, the left image 462 may be generated by the second exterior camera 21B and the right image 463 may be generated by the third exterior camera 21C.

Referring to FIGS. 18A and 18B, the driver can view the driving images 461 to 463 only using the assistant display 172. Although the front image 461, the left image 462 and the right image 463 are shown as being displayed on the assistant display 172 in FIG. 18B, this is only exemplary. For example, at least one of the front image 461, the left image 462 and the right image 463 may not be displayed on the assistant display 172. As another example, a rear image may be further displayed on the assistant display 172.

In addition, the assistant display 172 may display a variety of information in addition to the driving images 461 to 463. For example, the controller 190 may display a virtual lane (see FIG. 12B) for indicating the driving route of the vehicle 1 on the assistant display 172.

Figure 19:
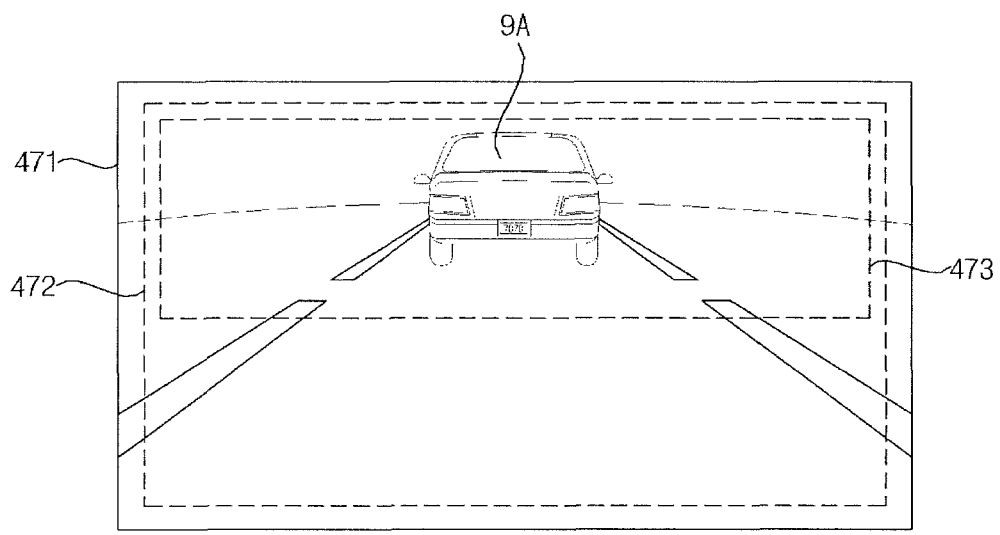
FIG. 19 is a diagram showing operation for setting an area to be displayed on a display in an entire area of a driving image by the display apparatus according to the third embodiment of the present invention.

FIG. 19 is a diagram showing operation for setting an area to be displayed on a display 170 in an entire area of a driving image by the display apparatus 100 according to the third embodiment of the present invention. For convenience of description, in the state shown in FIG. 18A, the front image generated by the first exterior camera 21A will be described. In FIG. 18A, since another vehicle 9A is present in front of the vehicle 1, the vehicle 9A appears on the front image.

In this case, the controller 190 may calculate an area 472 having a size displayable on the transparent display 171 in the entire area 471 of the front image. More specifically, the size information of the transparent display 171 may be pre-stored in the memory 130 and the controller 190 may calculate the area 472 to be displayed on the transparent display 171 in the entire area 471 of the front image based on the size information of the transparent display 171.

As shown in FIG. 18B, the height H3 of the assistant display 172 may be shorter than the height H2 of the transparent display 171. In this case, only some of the area 472 to be displayed on the transparent display 171 may be displayed on the assistant display 172. Accordingly, an area 473 having a size less than that of the area 472 to be displayed on the transparent display 171 needs to be calculated. The size information of the assistant display 172 may be pre-stored in the memory 130 and the controller 190 may calculate the area 473 belonging to the area 472 to be displayed on the transparent display 171 based on the size information of the assistant display 172.

That is, the area 472 to be displayed on the transparent display 171 belongs to the entire area 471 of the front image and the area 473 to be displayed on the assistant display 172 belongs to the area 472 to be displayed on the transparent display 171. In this case, the controller 190 may include an area, in which another vehicle 9A appears, in the area 472 to be displayed on the transparent display 171, when calculating the area 473 to be displayed on the display 172.

Referring to FIG. 19, a variety of content may be displayed on the transparent display 171 and a driving image may be displayed on the assistant display 172. As a result, the driver may view content via the larger display of the transparent display 171 and the assistant display 172. That is, the transparent display 171, and check the driving image via the assistant display 172.

Figure 20A:
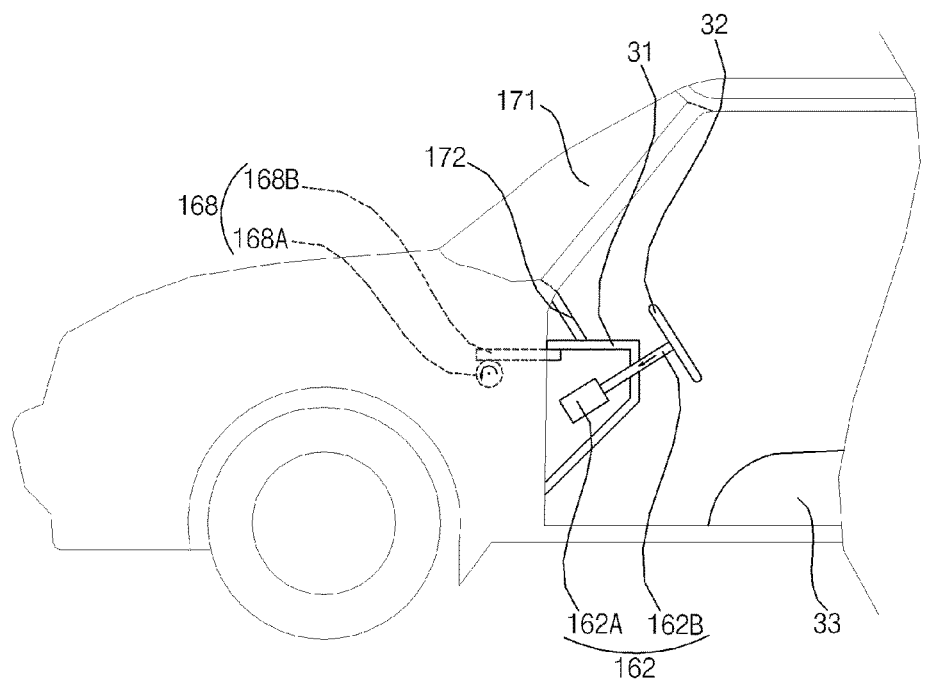
FIGS. 20A and 20B are diagrams showing operation for moving a dashboard and a steering wheel using a driving unit of a vehicle.
Figure 20B:
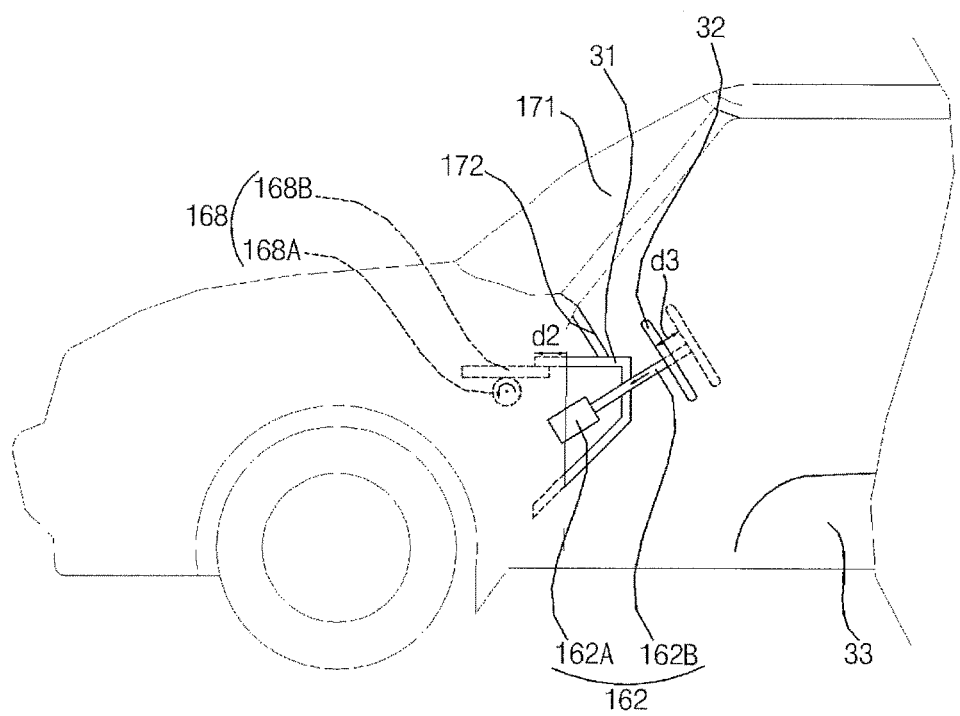

FIGS. 20A and 20B are diagrams showing operation for moving a dashboard 31 and a steering wheel 32 using a driving unit 160 of a vehicle 1.

The controller 190 may operate the driving unit 160 according to driver input to move at least one of the dashboard 31, the steering wheel 32 or the seat 33 in any one of front and rear, left and right and upward and downward directions. Alternatively, the controller 190 may operate the driving unit 160 to change the angle of the back of the seat 33.

FIGS. 20A and 20B show operations for moving the dashboard 31 and the steering wheel 32 forward by the controller 190, for convenience of description.

First, referring to FIG. 20A, the dashboard driving unit 168 may include an electric motor 168A and a guide rail 168B. The guide rail 168B connects the electric motor 168A and the dashboard 31. The electric motor 168A may rotate clockwise or counterclockwise under control of the controller 190. The guide rail 168B converts a rotary motion of the electric motor 168A into a linear motion. The dashboard 31 is connected to one side of the guide rail 168B to rectilinearly move along with the guide rail 168B.

For example, referring to FIG. 20A, when the electric motor 168A rotates clockwise, the dashboard 31 moves to the left along with the guide rail 168B. In this case, the distance between the dashboard 31 and the driver may be increased.

In contrast, when the electric motor 168A rotates counterclockwise, the dashboard 31 moves to the right along with the guide rail 168B. In this case, the distance between the dashboard 31 and the driver may be decreased.

In addition, the steering driving unit 162 may include a regulator 162A and a steering shaft 162B. The steering shaft 162B connects the regulator 162A and the steering wheel 32. In addition, the steering shaft 162B delivers the driving force of the regulator 162A to the steering wheel 32. More specifically, some of the steering shaft 162B may be drawn into or from the regulator 162A according to operation of the regulator 162A. By drawing the steering shaft 162B into or from the regulator, the position of the steering wheel 32 may also be changed. That is, when the steering shaft 162B is drawn toward the regulator 162A, the steering wheel 32 may move away from the driver and, when the steering shaft 162B is drawn from the regulator 162A, the steering wheel 32 approaches the driver. In addition, the steering shaft 162B may deliver the rotation force of the steering wheel 32 to the regulator 162A.

Referring to FIG. 20B, the state in which the dashboard 31 and the steering wheel 32 have been moved forward is shown. The dashboard 31 may move forward by a predetermined distance d1 according to the clockwise rotation of the electric motor 168A. In addition, as some of the steering shaft 162B is drawn into the regulator 162A by a predetermined distance d3, the steering wheel 31 may also be moved forward.

Operation of the dashboard driving unit 168 and the steering driving unit 162 shown in FIGS. 20A and 20B is exemplary and the positions or postures of the dashboard 31 and the steering wheel 32 may be changed using various methods. For example, an electric pump may be included in the dashboard driving unit 168 instead of the electric motor 168A to move the guide rail 168B. Alternatively, the rotation force of the electric motor 168A may be delivered to the guide rail 168B via a gear assembly (not shown). Alternatively, the dashboard driving unit 168 may have two or more electric motors 168A and two guide rails 168B.

Of course, it is apparent to those skilled in the art that the positions or postures of the dashboard 31 and the steering wheel 32 may be manually controlled.

Figure 21A:
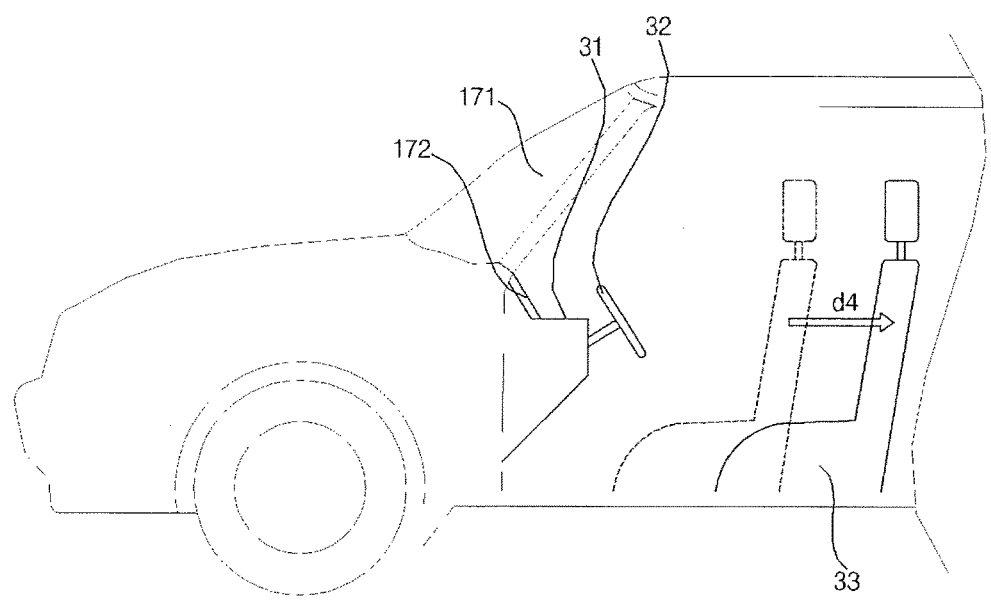
FIGS. 21A and 21B are diagrams showing another example in which the display apparatus according to the third embodiment of the present invention controls a display.
Figure 21B:
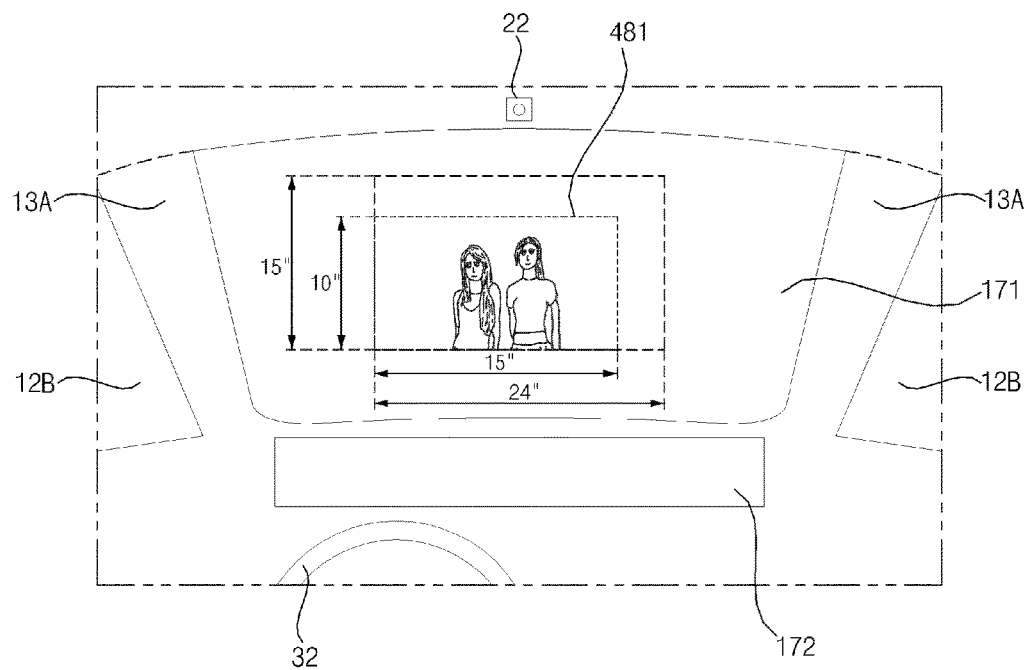

FIGS. 21A and 21B are diagrams showing another example in which the display apparatus 100 according to the third embodiment of the present invention controls the display 170. For convenience of description, the front window 12A is implemented as the transparent display 171.

The controller 190 may change the size of information 481 displayed on the transparent display 171 according to change in distance between the transparent display 171 and the driver. More specifically, the controller 190 may increase the size of the information 481 displayed on the transparent display 171, as the driver moves away from the transparent display 171. In contrast, the controller 190 may decrease the size of the information 481 displayed on the transparent display 171, as the driver approaches the transparent display 171.

First, referring to FIG. 21A, the driver seat 33 may move backward by a predetermined distance d4 according to operation of the seat driving unit 167. For example, when the driving mode of the vehicle 1 is switched from the manual driving mode to the autonomous driving mode, the controller 190 may display specific content on the transparent display 171 and, at the same time, drive the seat driving unit 167 to move the driver seat 33 backward by the predetermined distance d4. Therefore, the distance between the driver seated on the driver seat and the transparent display 171 may be increased. As a result, even when the size of the content displayed on the transparent display 171 is not changed, the same content seems small to the driver and thus visibility may deteriorate.

Referring to FIG. 21B, the controller 190 may change the size of the content displayed on the transparent display 171 based on the movement distance d4 of the driver seat 33. Information about the movement distance d4 of the driver seat 33 may be provided from the seat driving unit 167. In FIG. 21A, since the driver seat 33 moves backward, the controller 190 may increase the size of the content displayed on the transparent display 171.

Referring to FIG. 21B, the content 481 displayed on the transparent display 171 may be a picture stored in the memory 130. In the manual driving mode, assume that the width and length of the picture image 481 displayed on the transparent display 171 are 16 inches and 10 inches, respectively. When the driving mode of the vehicle 1 is switched to the autonomous driving mode, the controller 190 may increase the size of the picture image 481 by a predetermined ratio based on the movement distance d4 of the driver seat 33.

For example, the magnification of the width and length corresponding to the movement distance d4 of the driver seat 33 pre-stored in the memory 130 may be 50%. In this case, as shown, the controller 190 may increase the picture image 481 such that the width and length of the picture image become 24 (16+8) inches and 15 (=10+5) inches, respectively. Even when the driver and the transparent display 171 move away from each other, as the size of the information displayed on the transparent display 171 is increased, the driver can recognize the information without deteriorating visibility.

Although not shown, when the driving mode of the vehicle 1 is switched from the autonomous driving mode to the manual driving mode again, the controller may decrease the size of the picture image 481 to return to an original size.

Figure 22:
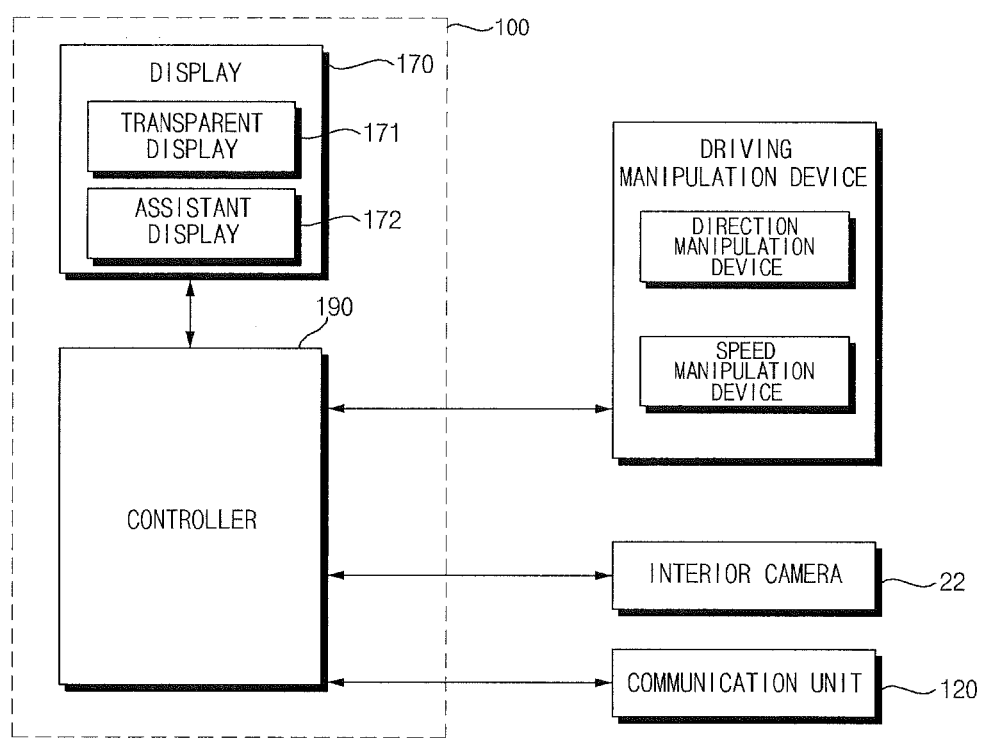
FIG. 22 is a diagram showing the function of a display apparatus according to a fourth embodiment of the present invention.

FIG. 22 is a diagram showing the function of a display apparatus according 100 to a fourth embodiment of the present invention.

Referring to FIG. 22, the display apparatus 100 according to the fourth embodiment includes a display 170 and a controller 190.

The display 170 displays a variety of information under control of the controller 190. For example, the display 170 may include at least one transparent display 171 or at least one assistant display 172. The transparent display 171 may be mounted in at least one area of the interior of the vehicle. For example, when the transparent display 171 is applied to the front window 12A of the vehicle, the driver may view a variety of information displayed on the transparent display 171 along with the front view of the vehicle. In addition, the assistant display 172 may be a navigation display, for example.

The controller 190 monitors the manipulation variable of the driving manipulation device provided in the vehicle. The driving manipulation device provided in the vehicle may include at least one of a direction manipulation device or a speed manipulation device.

More specifically, the direction manipulation device may change the driving direction of the vehicle. For example, the direction manipulation device may include a steering wheel 32 and a direction indication lever 501. The type of the direction manipulation device is not limited to the above-described examples and is not specifically limited so long as the driving direction of the vehicle may be changed.

The speed manipulation device may change the speed of the vehicle. For example, the speed manipulation device may include a gear shifter 511, an accelerator pedal 512 and a brake pedal 513. The type of the speed manipulation device is not limited to the above-described examples and is not specifically limited so long as the speed of the vehicle may be changed.

When a plurality of driving manipulation devices is provided in the vehicle, the controller 190 may monitor the manipulation variable of each driving manipulation device. For example, the controller 190 may independently monitor the manipulation variable of the direction manipulation device and the manipulation variable of the speed manipulation device. In addition, the controller 190 may independently monitor the manipulation variables of the steering wheel 32 and the direction indication lever 501 and may independently monitor the manipulation variables of the gear shifter 511, the accelerator pedal 512 and the brake pedal 513.

The manipulation variable of the driving manipulation device may indicate whether the driving manipulation device is manipulated. For example, the manipulation variable when the driver manipulates the driving manipulation device may have a first value and the manipulation variable when the driver does not manipulate the driving manipulation device may have a second value.

Alternatively, the manipulation variable of the driving manipulation device may indicate a manipulation degree of the driving manipulation device. For example, as the rotation angle of the steering wheel 32 by the driver is increased, the manipulation variable of the steering wheel 32 may be increased. As another example, the manipulation variable of the brake pedal 513 may be increased as the driver deeply depresses the accelerator pedal 513.

That is, the controller 190 may monitor the manipulation variable corresponding to the type of the driving manipulation device. For example, the controller 190 may monitor the rotation direction and rotation angle of the steering wheel 32 or whether the driver is grasping the steering wheel 32. As another example, the movement direction of the direction indication lever 501 by the driver may be monitored or touch pressure of the direction indication lever 501 may be monitored. As another example, the position of the gear shifter 511 may be monitored or the touch pressure of the direction indication lever 501 may be monitored. As another example, the movement distance of the accelerator pedal 512 may be monitored or the pressure applied to the accelerator pedal 512 by the driver may be monitored. As another example, the movement distance of the brake pedal 513 may be monitored or the pressure applied to the accelerator pedal 512 by the driver may be monitored. This is exemplary and the controller 190 may monitor manipulation variables related to various variables such as pressure, temperature, touch, position, etc. of the driving manipulation device. A sensor for sensing the manipulation variable may be positioned in each driving manipulation device provided in the vehicle.

The controller 190 may select any one driving mode corresponding to the manipulation variable of the driving manipulation device among a plurality of driving modes.

The plurality of driving modes may be distinguished depending on whether an autonomous driving function is allowed. For example, a driving mode for blocking the autonomous driving function is a first driving mode and a driving mode for allowing an autonomous driving function may be a second driving mode.

The controller 190 may select any one of the first driving mode for blocking the autonomous driving function and the second driving mode for allowing the autonomous driving function, depending on whether the manipulation variable of the driving manipulation device satisfies a predetermined criterion.

For example, when a first manipulation value is monitored from at least one of a plurality of driving manipulation devices, the controller 190 may determine that the driver wishes to directly drive the vehicle and select the first driving mode for blocking the autonomous driving function. The first manipulation value may be monitored when the driver manipulates at least one of the plurality of driving manipulation devices. In this case, the controller 190 may block the autonomous driving function such that the driver directly drives the vehicle.

As another example, when a second manipulation value is monitored from the plurality of driving manipulation devices, the controller 190 may determine that the driver does not wish to directly drive the vehicle or the driver cannot directly drive the vehicle and select the second driving mode for allowing the autonomous driving function. The second manipulation value may be monitored when the driver does not manipulate any of the plurality of driving manipulation devices. In this case, the controller 190 may execute the autonomous driving function such that the vehicle is autonomously driven.

In the fourth embodiment of the present invention, the first driving mode may block the autonomous driving function such that the driver directly drives the vehicle and may display, on the display 170, more driving information than in a section in which the autonomous driving function is allowed. In addition, the second driving mode may execute the autonomous driving function such that the vehicle is autonomously driven and display, on the display 170, more convenience information than in a section to which a grade for prohibiting the autonomous driving function is allocated.

The controller 190 may control the display 170 to display different information according to the plurality of driving modes. Displaying different information according to the plurality of driving modes may mean that, when the driving mode is changed, at least one piece of information is newly displayed or previously displayed information disappears.

For example, the controller 190 may control the display 170 to display first information when the first driving mode is selected and to further display new information along with the first information when the second driving mode is selected. At this time, the newly added information may be changed according to various criteria such as driver input, the speed of the vehicle, etc.

As another example, the controller 190 may control the display 170 to display second information when the first driving mode is selected and to remove at least some of the second information from the screen when the second driving mode is selected.

As another example, the controller 190 may control the display 170 to display third information when the first driving mode is selected and to display fourth information which does not overlap the third information when the second driving mode is selected.

In addition, the controller 190 may control the display 170 to display information about the driving mode selected from among the plurality of driving modes in correspondence with the manipulation variable of the driving manipulation device. For example, the controller 190 may control the display 170 to display text information notifying the driver that the first driving mode has been selected, when the first driving mode is selected from among the plurality of driving modes in correspondence with the manipulation variable of the driving manipulation device. As another example, the controller 190 may control the display 170 to display image information notifying the driver that the second driving mode has been selected, when the second driving mode is selected from among the plurality of driving modes in correspondence with the manipulation variable of the driving manipulation device.

Information about the driving mode selected from among the plurality of driving modes in correspondence with the manipulation variable of the driving manipulation device may be provided to the driver using a method other than a visual delivery method via the display 170. For example, when the first driving mode is selected from among the plurality of driving modes in correspondence with the manipulation variable of the driving manipulation device, the controller 190 may control the audio output unit 150 of the vehicle to output a voice message notifying the driver that the first driving mode has been selected to the driver. As another example, when the second driving mode is selected from among the plurality of driving modes in correspondence with the manipulation variable of the driving manipulation device, the controller 190 may control a vibration output unit (not shown) of the vehicle to output vibrations notifying the driver that the second driving mode has been selected to the driver.

In addition, the controller 190 may change the transmittance of the transparent display 171 according to the plurality of driving modes. For example, when the vehicle is set to the second driving mode for executing the autonomous driving function, the driver may not directly drive the vehicle and thus the controller 190 may decrease the transmittance of the transparent display 171 to be less than that of the transparent display when the vehicle is set to the first driving mode.

In addition, the controller 190 may set the vehicle to the driving mode selected from among the plurality of driving modes in correspondence with the manipulation variable of the driving manipulation device. At this time, the controller 190 may set the vehicle to the selected driving mode, only when driver input for accepting that the vehicle is set to the selected driving mode is received. For example, when a driver voice command (e.g., "Okay") for accepting the second driving mode is received via the input unit 110 of the vehicle in a state in which information about the second driving mode selected from among the plurality of driving modes is displayed on the display 170, the controller 190 may set the vehicle to the second driving mode. If the second driving mode allows the autonomous driving function, the controller 190 may drive the vehicle toward a destination instead of the driver, since the driver voice command (e.g., "Okay") is received. In contrast, when a driver voice command (e.g., "Hold the first driving mode") for rejecting the second driving mode is received via the input unit 110 of the vehicle in a state in which information about the second driving mode selected from among the plurality of driving modes is displayed on the display 170, the controller 190 may not set the vehicle to the second driving mode.

The controller 190 may change the type, amount, size, position, color, transmittance, etc. of the information displayed on the display 170 according to the manipulation value of the driving manipulation device.

The controller 190 may decrease driving information displayed on the display 170 and increase convenience information displayed on the display 170 when the driving mode corresponding to a relatively small manipulation variable is selected, as compared to the case in which the driving mode corresponding to a relatively large manipulation variable is selected.

For example, the controller 190 may control the display 170 to decrease driving information displayed on the display 170 and to increase convenience information displayed on the display 170 as the manipulation variable of the driving manipulation device is decreased.

That is, the controller 190 may control the display 170 to display less driving information or more convenience information when the manipulation variable of the driving manipulation device is a first value, as compared to the case in which the manipulation variable of the driving manipulation device is a second value greater than the first value.

The driving information means information related to the driving state of the vehicle. For example, the driving information may include speed information, route guidance information, a driving image, a blind spot image, obstacle information, traffic sign information, gas mileage information, fuel amount information, failure information, accident information, traffic information, etc. When the driver directly drives the vehicle, the driver receives help in driving the vehicle as the amount of driving information displayed on the display 170 is increased.

In addition, the convenience information means information unrelated to the driving state of the vehicle. That is, the convenience information may include all information except for the above-described driving information. For example, the convenience information may include multimedia, email, games, weather, shopping, Internet, pictures, documents, surrounding facilities, etc. When the vehicle moves to a destination using the autonomous driving function, as the amount of convenience information displayed on the display 170 is increased, the driver may more efficiently use the indoor space of the vehicle.

Since the controller 190 selects any one of the plurality of driving modes based on the manipulation variable of the driving manipulation device and changes the driving information and the convenience information according to the manipulation variable of the driving manipulation device, the controller 190 may change the driving information or the convenience information displayed before switching the driving mode, when one driving mode is switched to another driving mode. For example, when the first driving mode for blocking the autonomous driving function is switched to the second driving mode for executing the autonomous driving function, the controller 190 may control the display 170 to display less driving information and more convenience information.

The controller 190 may determine whether the manipulation variable of the driving manipulation device is greater than or equal to a reference value. The controller 190 may select any one of the plurality of driving modes, depending on whether the manipulation variable of the driving manipulation device is greater than or equal to the reference value.

For example, the controller 190 may select the first driving mode from among the plurality of driving modes when at least one of the manipulation variables of the driving manipulation device is greater than or equal to the reference value. This is because, when at least one of the manipulation variables of the driving manipulation device is greater than or equal to the reference value, the driver directly drives the vehicle. At this time, the first driving mode may be a mode for blocking the autonomous driving function such that the driver directly drives the vehicle and displaying more driving information on the display 170 as compared to the case of executing the autonomous driving function.

As another example, the controller 190 may select the second driving mode from among the plurality of driving modes when all the manipulation variables of the driving manipulation device are less than the reference value. This is because, when all the manipulation variables of the driving manipulation device are less than the reference value, the driver does not directly drive the vehicle. At this time, the second driving mode may be a mode for blocking the autonomous driving function such that the vehicle executes the autonomous driving function such that the vehicle is autonomously driven and displaying more convenience information on the display 170 as compared to the case of blocking the autonomous driving function.

If the autonomous driving function is blocked even when the driver cannot directly drive the vehicle due to an unexpected accident of the driver, a dangerous situation such as collision may occur. According to the present invention, when the driver does not manipulate any manipulation control device, the controller 190 may automatically execute the autonomous driving function such that the vehicle is autonomously driven, thereby aiding in maintaining safety of the driver.

In addition, the controller 190 may change the driving mode of the vehicle according to the point of gaze of the driver. For example, the controller 190 may release the first driving mode and select the second driving mode, when the point of gaze of the driver deviates from a predetermined area in a state setting the vehicle to the first driving mode. Here, the predetermined area may correspond to the front side of the vehicle. For example, when the point of gaze of the driver deviates from the area corresponding to the front window 12A of the vehicle, the controller 190 may release the first driving mode and select the second driving mode. The controller 190 may receive the interior image from the interior camera 22 of the vehicle, analyze the interior image and detect the point of gaze of the driver. When the point of gaze of the driver is detected from the image, a known gaze detection algorithm may be used, a detailed description of which will be omitted.

In addition, the controller 190 may release the first driving mode and select the second driving mode when the state, in which the point of gaze of the driver deviates from the predetermined area, is maintained for a predetermined time or more in a state of setting the vehicle to the first driving mode. When the point of gaze of the driver deviates from the predetermined area for a time shorter than the predetermined time in order to view the side-view mirror, the second driving mode may not be selected.

The controller 190 may control the display 170 to display a message for urging the driver to gaze within the predetermined area, before releasing the first driving mode and selecting the second driving mode.

In addition, the controller 190 may restrict the setting of the second driving mode according to the position of the vehicle. More specifically, the controller 190 may determine whether the position of the vehicle is within a section allowing the second driving mode before switching the first driving mode to the second driving mode, when the manipulation variable of the driving manipulation device is less than the reference value in a state of setting the vehicle to the first driving mode. That is, the controller 190 may determine whether the vehicle is driving within the section allowing the autonomous driving function.

The controller 190 may receive the current position of the vehicle via the communication unit 120 of the vehicle. In addition, information as to whether the second driving mode is allowed according to the section may be received via the communication unit 120 of the vehicle or may be pre-stored in the memory 130 of the vehicle. Information as to whether the second driving mode is allowed according to the section, which is received via the communication unit 120 of the vehicle, may be received from an intelligent transport system (ITS) or a mobile device.

When the position of the vehicle is within the section for blocking the second driving mode as the result of determining whether the position of the vehicle is within the section allowing the second driving mode, the controller 190 may restrict execution of the autonomous driving function. That is, even when the manipulation variable of the driving manipulation device is less than the reference value in a state of setting the vehicle to the first driving mode, the controller 190 may block the autonomous driving function and continuously maintain the first driving mode. In this case, the controller 190 may control the display 170 to display information notifying the driver that the current position of the vehicle is within the section for blocking the second driving mode. For example, the controller 190 may control the display 170 to display a message notifying the driver that switching from the first driving mode to the second driving mode is blocked and the driver should directly drive the vehicle.

In addition, the controller 190 may display information indicating that the autonomous driving function is executed on the exterior surface of the display 170, when the second driving mode is selected from among the plurality of driving modes. For example, the controller 190 may display a text message indicating that the autonomous driving function is executed on the external surface of the transparent display 171. Thus, a pedestrian may be informed that the vehicle is currently executing the autonomous driving function.

Hereinafter, the fourth embodiment of controlling the display 170 based on the manipulation variable of the driving manipulation device will be described in greater detail with reference to FIGS. 23 to 31. For convenience of description, in FIGS. 23 to 31, assume that the display 170 is a transparent display 171 formed on the front window 12A.

Figure 23:
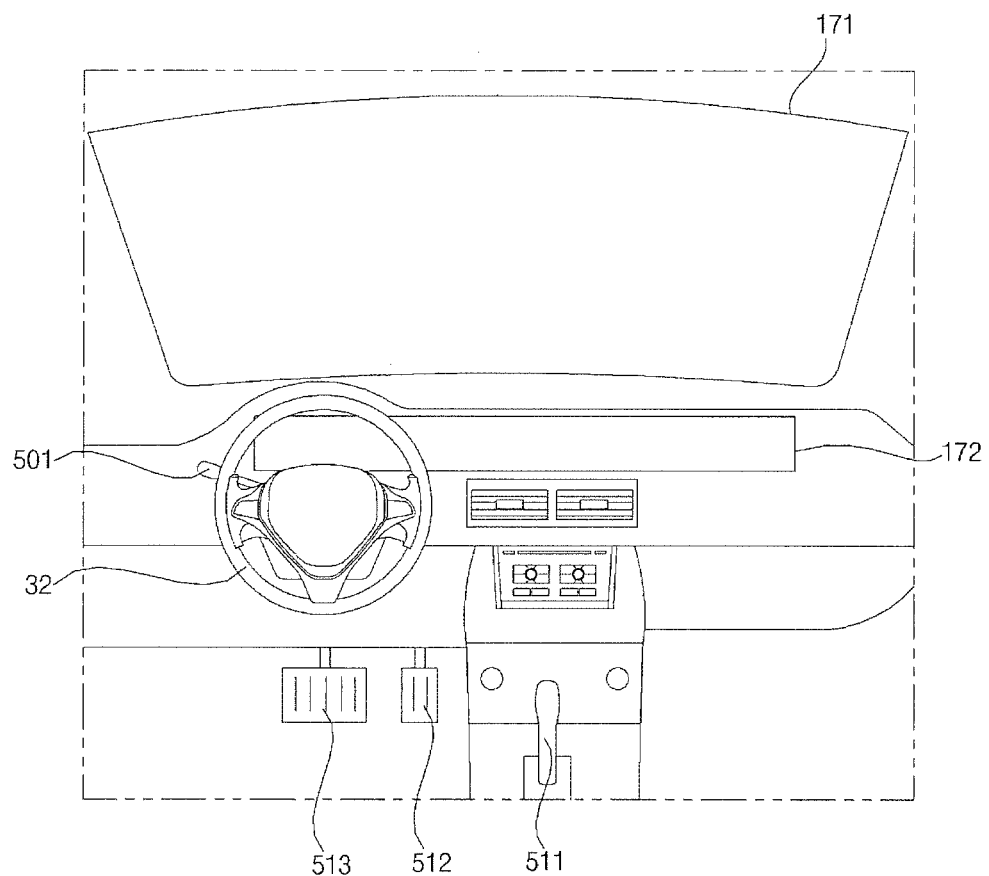
FIG. 23 is a diagram showing the interior of a vehicle including the display apparatus according to the fourth embodiment of the present invention.

FIG. 23 is a diagram showing the interior of a vehicle including the display apparatus 100 according to the fourth embodiment of the present invention.

Referring to FIG. 23, the vehicle including the display apparatus 100 according to the fourth embodiment of the present invention may include at least one driving manipulation device. The driving manipulation device may mean a device for receiving a driver command for changing the driving state of the vehicle.

For example, the vehicle may include a direction manipulation device such as a steering wheel 32, a direction indication lever 501, etc.

In addition, the vehicle may include a speed manipulation device such as an accelerator pedal 512 and a brake pedal 513.

In addition, the vehicle may include a device related to direction control and speed control, such as a gear shifter 511.

As described above, the driving manipulation devices of the vehicle may include different sensors for sensing manipulation variables and the controller 190 may monitor the manipulation variables of the driving manipulation devices based on the signals received from the sensors.

Figure 24:
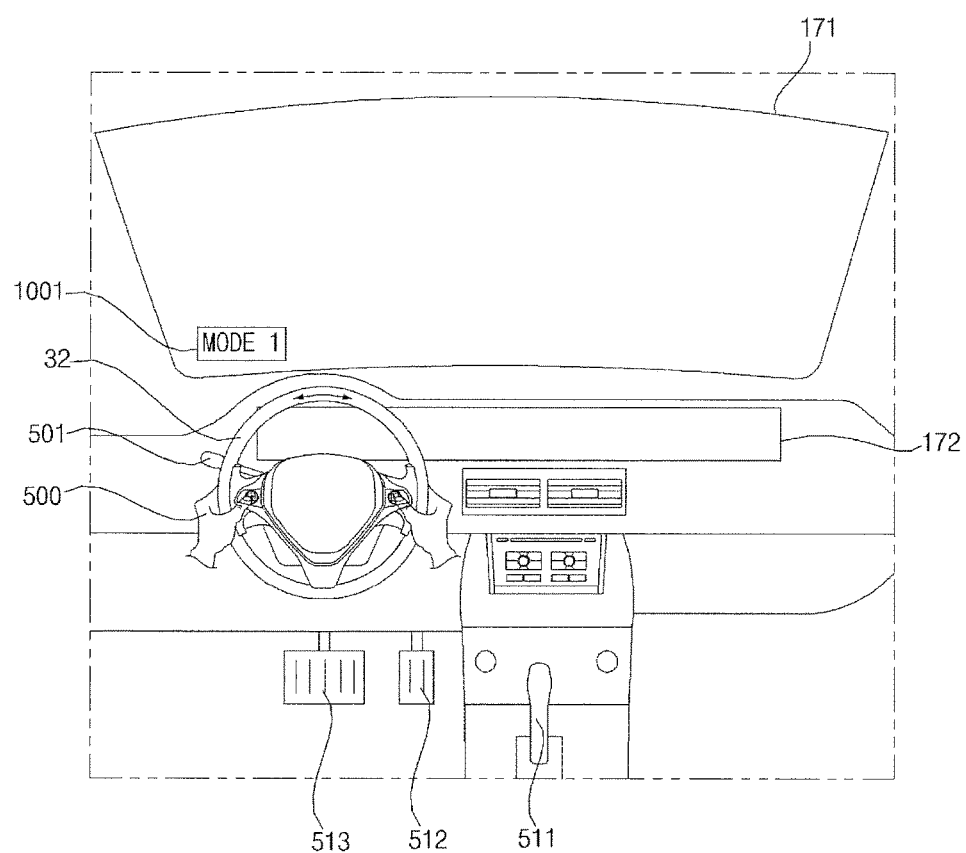
FIG. 24 is a diagram showing an example in which the display apparatus according to the fourth embodiment of the present invention controls a display.

FIG. 24 is a diagram showing an example in which the display apparatus 100 according to the fourth embodiment of the present invention controls the display 170.

The controller 190 may monitor the manipulation variables of the driving manipulation devices of the vehicle and compare the monitored manipulation variables with a reference value. At this time, the controller 190 may compare different manipulation variables of the driving manipulation devices with different reference values. For example, the controller 190 may compare the manipulation variable of the brake pedal 513 with a first reference value and compare the manipulation variable of the accelerator pedal 512 with a second reference value.

When the monitored manipulation variable is greater than the reference value as the result of comparison, the controller 190 may select the first driving mode for blocking the autonomous driving function.

Referring to FIG. 24, the driver may manipulate the steering wheel 32 among the driving manipulation devices.

For example, as shown, when pressure applied to the steering wheel 32 in a state in which the driver grasps the steering wheel 32 is greater than or equal to the reference value, the controller 190 may select the first driving mode from among the plurality of driving modes.

In this case, the controller 190 may control the display 170 to display information about the pressure applied to the steering wheel 32. For example, the controller 190 may display the value of the pressure applied to the steering wheel 32 on the display 170. Alternatively, when the value of the pressure applied to the steering wheel 32 is greater than or equal to the reference value, the controller 190 may display the pressure value with a color different from that used when the pressure value is less than the reference value.

In addition, the controller 190 may control the display 170 to display information 1001 notifying the driver that the first driving mode is selected, according to information indicating that the pressure applied to the steering wheel 32 is greater than or equal to the reference value.

The steering wheel 32 may be manipulated using a method other than a method of grasping the steering wheel 32. For example, the controller 190 may determine that the driver wishes to directly drive the vehicle and select the first driving mode for blocking the autonomous driving function, when the angle of the steering wheel 32 rotated by the driver is greater than or equal to a reference value (e.g., 2 degrees).

Figure 25:
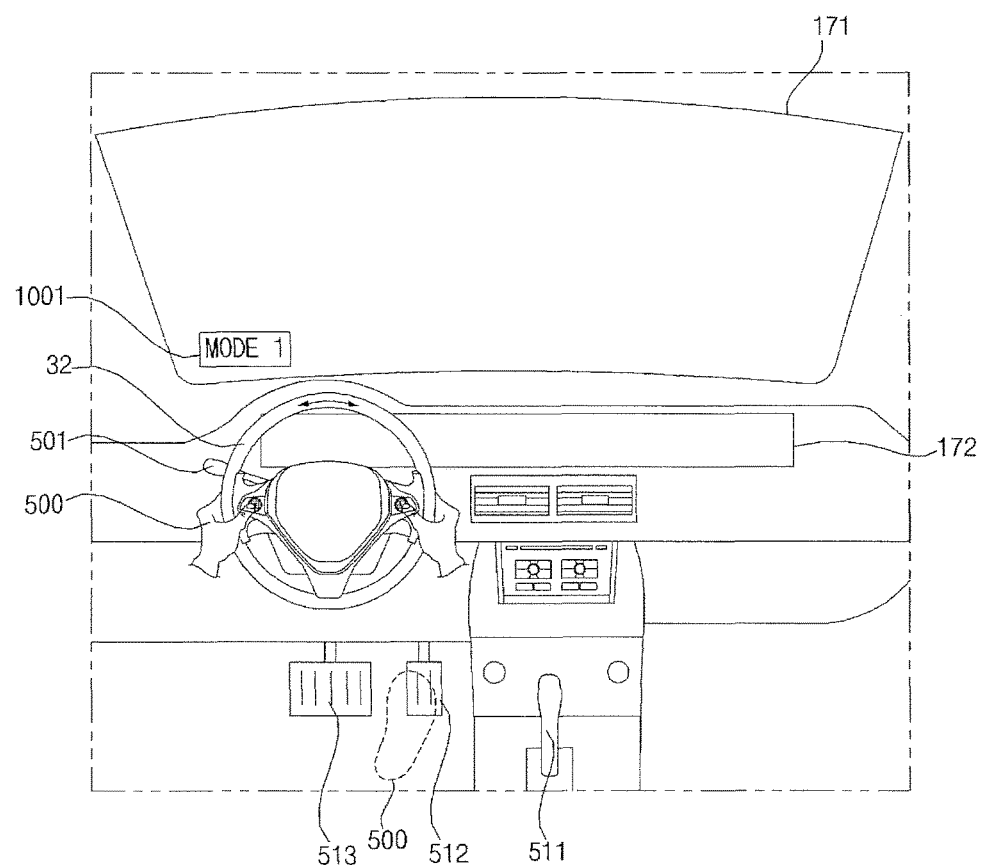
FIG. 25 is a diagram showing an example in which the display apparatus according to the fourth embodiment of the present invention controls a display.

FIG. 25 is a diagram showing an example in which the display apparatus 100 according to the fourth embodiment of the present invention controls the display 170.

Referring to FIG. 25, the driver may manipulate the accelerator pedal 512 among the plurality of driving manipulation devices.

For example, as shown, when the distance of the accelerator pedal 512 moved by depressing the accelerator pedal 512 in a state in which the driver places the driver foot on the accelerator pedal 512 is greater than or equal to a reference value, the controller 190 may select the first driving mode from among the plurality of driving modes.

In this case, the controller 190 may control the display 170 to display information about the movement distance of the accelerator pedal 512. For example, the controller 190 may display the movement distance of the accelerator pedal 512 on the display 170. Alternatively, when the movement distance of the accelerator pedal 512 is greater than or equal to the reference value, the controller 190 may display the movement distance of the accelerator pedal with a color different from that used when the movement distance of the accelerator pedal 512 is less than the reference value.

In addition, the controller 190 may control the display 170 to display information 1001 notifying the driver that the first driving mode has been selected, according to the information indicating that the movement distance of the accelerator pedal 512 is greater than or equal to the reference value.

The accelerator pedal 512 may be manipulated using a method other than the method of controlling the movement distance of the accelerator pedal 512. For example, when the foot of the driver is only placed on the accelerator pedal 512, the controller 190 may determine that the driver wishes to directly drive the vehicle regardless of the movement distance of the accelerator pedal 512 and select the first driving mode for blocking the autonomous driving function.

The controller 190 may control the display 170 to display at least one of the driving information when setting the vehicle to the first driving mode.

The driving information means information related to the driving state of the vehicle. For example, the driving information may include speed information, route guidance information, a driving image, a blind spot image, obstacle information, traffic sign information, gas mileage information, fuel amount information, failure information, accident information, traffic information, etc.

The driving information displayed on the display 170 in the first driving mode may be preset according to circumstance. For example, the controller 190 may display the blind spot image only when the vehicle reverses. As another example, the controller 190 may always display speed information while the vehicle is driven and may display failure information only when failure occurs.

Alternatively, the driving information displayed on the display 170 in the first driving mode may be changed according to driver input. For example, the controller 190 may control the display 170 to display only the speed information and the route guidance information among the driving information according to driver input and not to display the other information.

Although the controller 190 selects the first driving mode based on the manipulation variables of the steering wheel 32 and the accelerator pedal 512 among the driving manipulation devices in FIGS. 24 and 25, it is apparent to those skilled in the art that, for the other driving manipulation devices, the first driving mode may be selected using a similar method.

Figure 26:
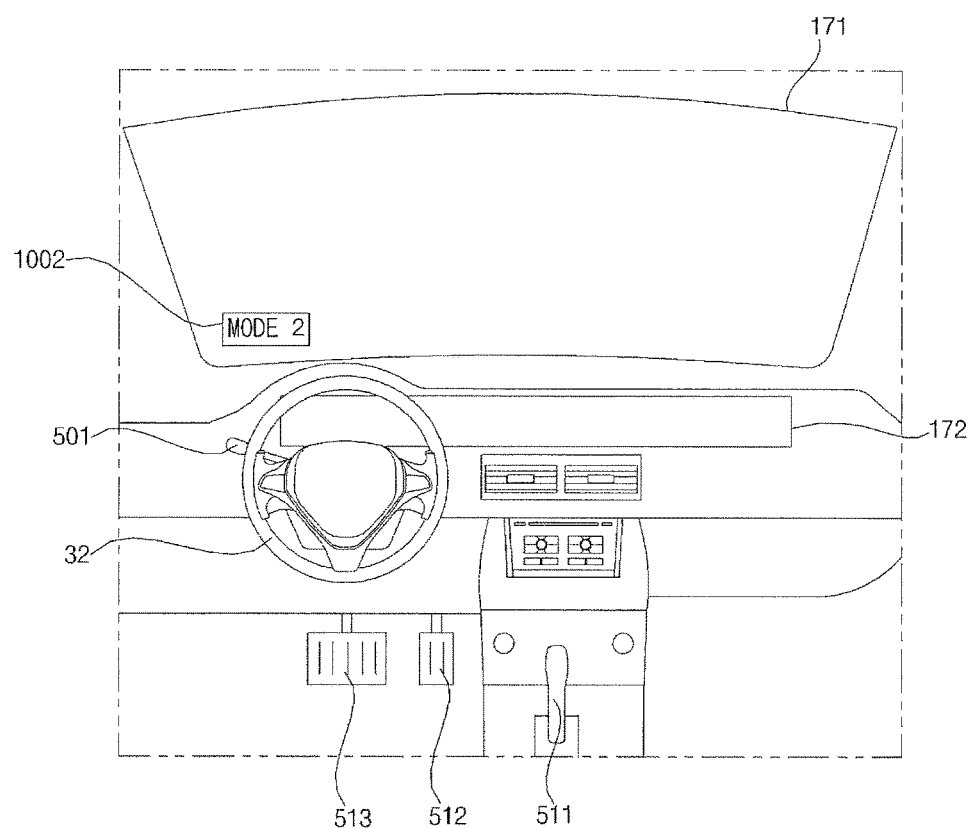
FIG. 26 is a diagram showing an example in which the display apparatus according to the fourth embodiment of the present invention controls a display.

FIG. 26 is a diagram showing an example in which the display apparatus 100 according to the fourth embodiment of the present invention controls the display 170.

The controller 190 may select the second driving mode for executing the autonomous driving function when the manipulation variable of each of the driving manipulation devices of the vehicle is less than the reference value.

Referring to FIG. 26, the driver may not manipulate any one of the driving manipulation devices during driving. For example, as shown, when the steering wheel 32, the direction indication lever 501, the gear shifter 511, the accelerator 512 and the brake pedal 513 are not manipulated by the driver, the manipulation variables of all the driving manipulation devices may be less than the reference value. Therefore, the controller 190 may select the second driving mode for executing the autonomous driving function from among the plurality of driving modes.

There are several situations in which the manipulation variables of all the driving manipulation devices are less than the reference value. For example, the driver may lose consciousness, the driver checks the SMS of the mobile phone during driving or the driver does not intentionally manipulate the driving manipulation device in order to select the second driving mode. When the state of blocking the autonomous driving mode is maintained, the risk of colliding with another vehicle may be increased. Accordingly, the controller 190 may automatically execute the autonomous driving function when all the driving manipulation devices are not manipulated, thereby preventing the risk of collision accident.

In this case, the controller 190 may output a predetermined voice message or display an alert message on the display 170, in order to wake the driver.

In addition, the controller 190 may control the display 170 to display information 1002 indicating that the second driving mode has been selected, according to the information indicating that the manipulation variables of all the driving manipulation devices are less than the reference value. For example, when the manipulation variables of all the driving manipulation devices are less than the reference value while the vehicle is driving in the first driving mode, the controller 190 may display information indicating that the first driving mode is released and the second driving mode is automatically selected on the display 170 and output predetermined alarm sound.

In order to prevent the second driving mode from being unnecessarily selected even when automatic execution of the autonomous driving function is not necessary, the controller 190 may release the first driving mode and select the second driving mode when the state in which the manipulation variables of all the driving manipulation devices are less than the reference value is maintained for a predetermined time or more.

That is, when the driver does not manipulate the driving manipulation device for a time shorter than the predetermined time, the first driving mode may be continuously maintained.

The controller 190 may control the display 170 to display at least one of convenience information when the vehicle is set to the second driving mode. Convenience information means information unrelated to the driving state of the vehicle. For example, the convenience information may include multimedia, email, games, weather, shopping, Internet, pictures, documents, surrounding facilities, etc.

In the second driving mode, since the autonomous driving function is executed and the need for the driver to always watch and perceive the driving state is reduced, a variety of convenience information may be displayed on the display 170 to help the driver more efficiently use the vehicle. Of course, even in the second driving mode, at least one piece of driving information may be displayed.

Figure 27A:
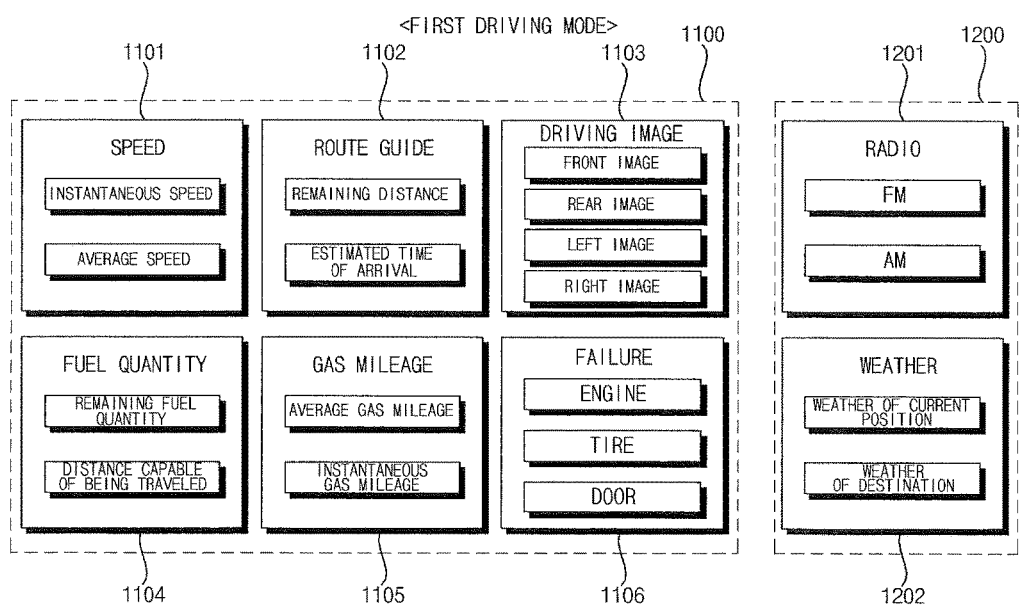
FIGS. 27A and 27B are diagrams showing an example in which the display apparatus according to the fourth embodiment of the present invention controls a display.
Figure 27B:
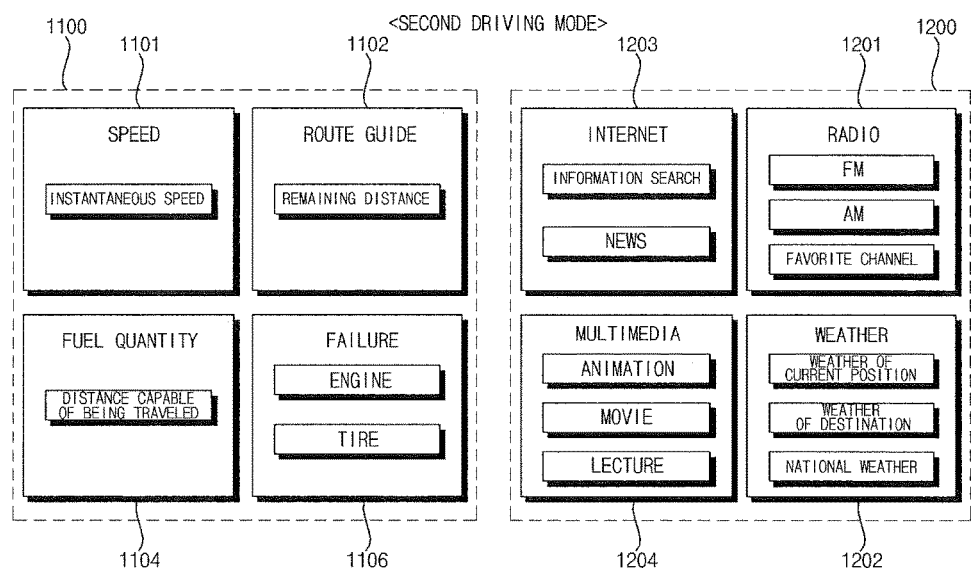

FIGS. 27A and 27B are diagrams showing an example in which the display apparatus 100 according to the fourth embodiment of the present invention controls the display 170.

The controller 190 may decrease driving information displayed on the display 170 and increase convenience information displayed on the display 170 as the manipulation variable of the driving manipulation device is decreased. At this time, since any one of the first driving mode and the second driving mode may be selected according to the manipulation variable of the driving manipulation device, the controller 190 may control the display 170 to change the driving information and the convenience information displayed in the first driving mode and the second driving mode.

First, referring to FIG. 27A, an example of the driving information 1100 and convenience information 1200 displayed in the first driving mode is shown. As shown, the amount of driving information 1100 displayed in the first driving mode may be greater than that of convenience information 1200.

More specifically, the controller 190 may control the display 170 to display the driving information 1100 such as speed 1101 (e.g., instantaneous speed or average speed), a route guide 1102 (e.g., a distance to a destination or an estimated time of arrival), a driving image 1103 (e.g., a front image, a rear image, a left image, a right image), a fuel quantity 1104 (e.g., a remaining fuel quantity, a remaining range), a gas mileage 1105 (e.g., an average gas mileage, an instantaneous gas mileage), failure 1106 (e.g., engine failure, tire failure, door failure), as shown.

In addition, the controller 190 may control the display 170 to display the convenience information 1200 such as a radio channel 1201 (e.g., FM or AM radio channel) and weather 1202 (e.g. weather of a current position or weather of a destination), when the vehicle is set to the first driving mode.

Next, referring to FIG. 27B, an example of driving information 1100 and convenience information 1200 displayed in the second driving mode is shown. As shown, the amount of convenience information 1200 displayed in the second driving mode may be greater than that of driving information 1100.

More specifically, the controller 190 may control the display 170 to display driving information 1100 such as speed 1101 (e.g., instantaneous speed), a route guide 1102 (e.g., a distance to a destination), a fuel quantity 1104 (e.g., a remaining fuel quantity), failure 1106 (e.g., engine failure or tire failure) when the vehicle is set to the second driving mode, as shown.

In addition, the controller 190 may control the display 170 to display the convenience information 1200 such as a radio channel 1201 (e.g., FM or AM radio channel or favorite channel), weather 1202 (e.g. weather of a current position, weather of a destination or national weather), Internet 1203 (e.g., information search, news), and multimedia 1204 (e.g., animation, movie, or lecture), when the vehicle is set to the second driving mode.

The controller 190 may change the driving information 1100 and the convenience information 1200 displayed before switching, when the driving mode of the vehicle is switched from the first driving mode to the second driving mode or from the second driving mode to the first driving mode.

More specifically, when comparing FIG. 27A and FIG. 27B, when the driving mode is switched from the first driving mode to the second driving mode, the controller 190 may control the display 170 to remove at least some of the driving information 1100 displayed in the first driving mode and to increase the number of types of the convenience information 1200. For example, the driving image 1103 which is the driving information 1100 displayed in the first driving mode may not be displayed in the second driving mode but the Internet 1203 and the multimedia 1204 of the convenience information 1200, which are not displayed in the first driving mode, may be displayed in the second driving mode. As another example, the average speed of the speed 1101 which is the driving information 1100 displayed in the first driving mode may not be displayed in the second driving mode but favorite channel information, which is not displayed in the first driving mode, of the information about the radio channel 1201 may be displayed in the second driving mode.

That is, the controller 190 may control the display 170 to display more driving information 1100 when the vehicle is set to the first driving mode for blocking the autonomous driving function, as compared to the second driving mode for executing the autonomous driving function. In addition, the controller 190 may control the display 170 to display more convenience information 1200 when the vehicle is set to the second driving mode for executing the autonomous driving function, as compared to the first driving mode for blocking the autonomous driving function.

The type and amount of driving information 1100 and the convenience information 1200 shown in FIGS. 27A and 27B are exemplary and may be changed according to driver input.

Figure 28:
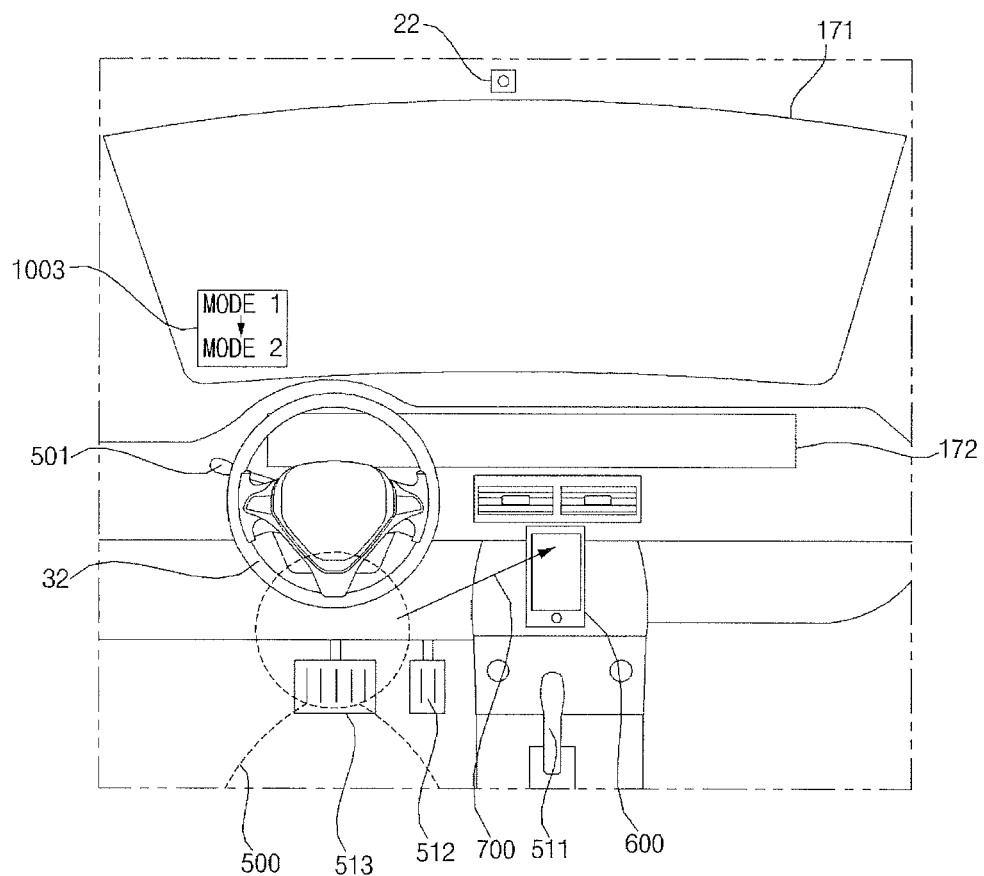
FIG. 28 is a diagram showing an example in which the display apparatus according to the fourth embodiment of the present invention controls a display.

FIG. 28 is a diagram showing an example in which the display apparatus 100 according to the fourth embodiment of the present invention controls the display 170.

The controller 190 may use the point of gaze of the driver along with the manipulation variable of the driving manipulation device when the driving mode of the vehicle is selected.

More specifically, the controller 190 may release the first driving mode and select the second driving mode when the point 700 of gaze of the driver 500 deviates from a predetermined area (e.g., the area of the front window 12A) in a state of setting the vehicle to the first driving mode.

For example, when the point 700 of gaze of the driver 500 sensed in a state of setting the vehicle to the first driving mode for blocking the autonomous driving function deviates from the predetermined area, the controller 190 may release the first driving mode and autonomously set the vehicle to the second driving mode for executing the autonomous driving function even when the manipulation variable of the driving manipulation device is greater than or equal to the reference value.

There are several cases in which the point 700 of gaze of the driver 500 deviates from the predetermined area (e.g., the area of the front window 12A). For example, the driver 500 may intentionally withdraw the point 700 of gaze from the predetermined area to set the vehicle to the second driving mode, the driver 500 may take action other than the driving manipulation (e.g., sleeping or manipulation of a mobile phone 600).

At this time, the controller 190 may control the display 170 to display information indicating that the driving mode of the vehicle is switched from the first driving mode to the second driving mode when the point 700 of gaze of the driver 500 deviates from the predetermined area (e.g., the area of the front window 12A).

In order to prevent the second driving mode from being unnecessarily selected when automatic execution of the autonomous driving function is not necessary, the controller 190 may release the first driving mode and select the second driving mode only when the state in which the point 700 of gaze of the driver 500 deviates from the predetermined area is maintained for a predetermined time or more.

That is, when the driver does not manipulate the driving manipulation device for a time shorter than the predetermined time, the first driving mode may be continuously maintained. For example, when the point 700 of gaze of the driver 500 is directed to the side-view mirror in order to change the lanes and then is returned to the predetermined area within a predetermined time, the controller 190 may maintain the first driving mode without being switched to the second driving mode.

Figure 29A:
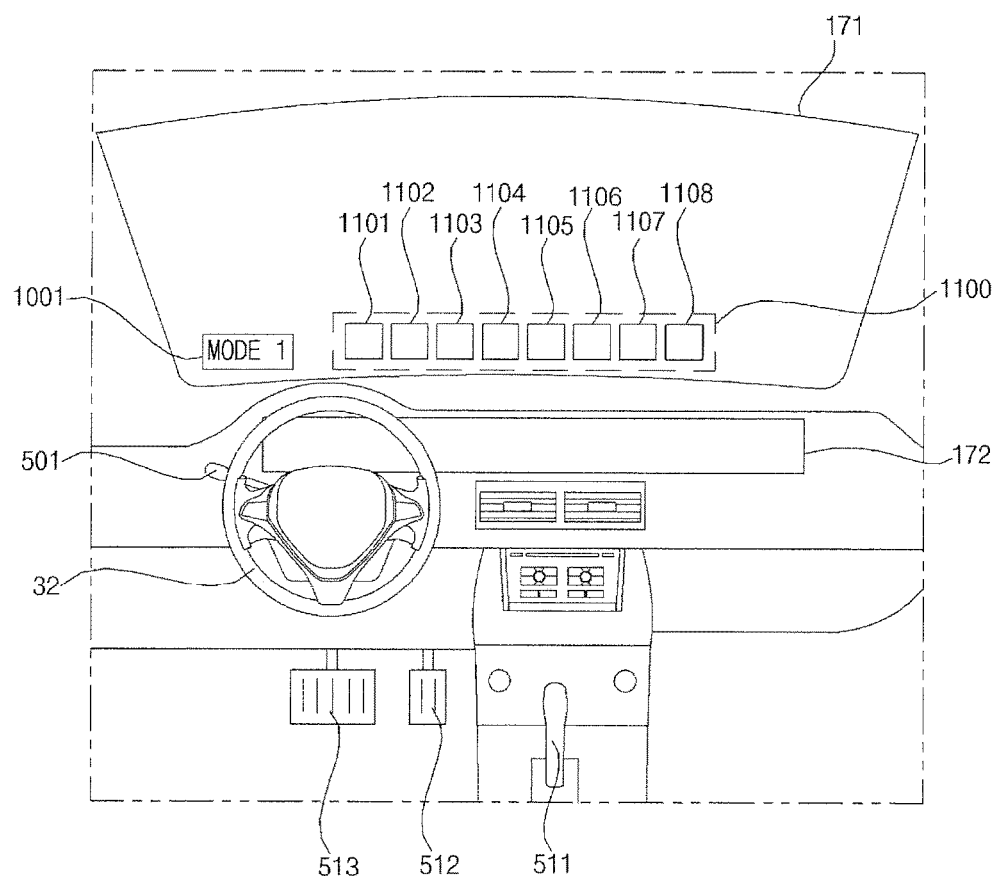
FIGS. 29A and 29B are diagrams showing an example in which the display apparatus according to the fourth embodiment of the present invention controls a display.
Figure 29B:
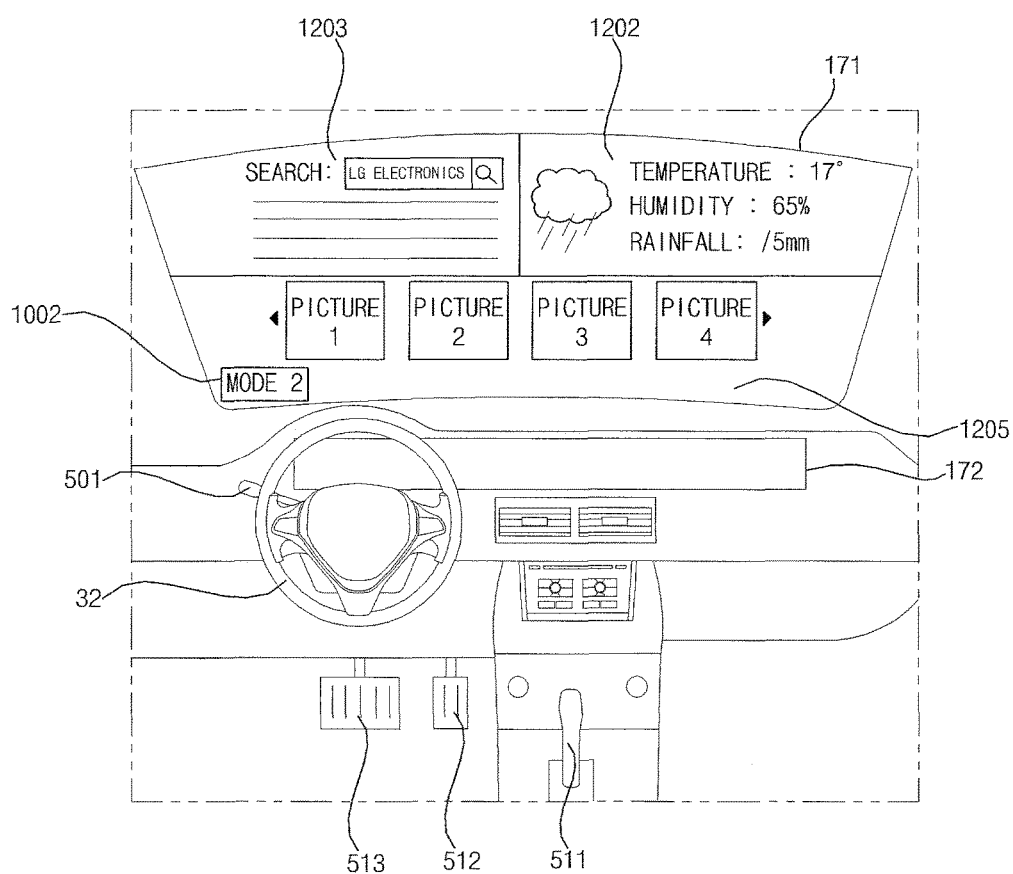

FIGS. 29A and 29B are diagrams showing an example in which the display apparatus 100 according to the fourth embodiment of the present invention controls the display 170.

First, FIG. 29A shows information displayed on the display 170 when the vehicle is set to the first driving mode. For convenience of description, assume that only the driving information is displayed on the display 170 in the first driving mode.

Referring to FIG. 29A, the controller 190 may display at least some of a variety of driving information on the display 170 when the vehicle is set to the first driving mode. At this time, information displayed on the display 170 among all convenience information may be designated according to driver input. In addition, when the display 170 is a transparent display 171 applied to the front window 12A, the controller 190 may place the driving information on the edge of the transparent display 171 in order to prevent the field of vision of the driver from being obstructed by the driving information.

In addition, the controller 190 may control the display 170 to display information 1001 indicating that the vehicle is currently set to the first driving mode along with the driving information.

The display 170 may display a plurality of pieces of driving information in the first driving mode under control of the controller 190. For example, as shown, the display 170 may display information about a speed 1101, a route guide 1102, a driving image 1103, a fuel quantity 1104, a gas mileage 1105, failure 1106, an accident 1107, an obstacle 1108, etc.

Although eight pieces of driving information having the same size are shown as being horizontally aligned at the lower end of the transparent display 171 in FIG. 29A, this is exemplary and some of eight pieces of driving information 1101 to 1108 may be vertically aligned and one piece of driving information may have a different size from than the other driving information.

In addition, the controller 190 may change the order or color of the eight pieces of driving information 1101 to 1108 according to predetermined priority. For example, the controller 190 may display the driving information 1101 to 1108 from the left in descending order of priority. As another example, the controller 190 may display driving information having relatively high priority in red and display driving information having relatively low priority in blue.

The eight pieces of driving information 1101 to 1108 are exemplary and more or less driving information may be displayed. Alternatively, driving information different from the eight pieces of driving information 1101 to 1108 may be displayed.

Next, FIG. 29B shows information displayed on the display 170 when the vehicle is set to the second driving mode. For convenience of description, assume that only the convenience information is displayed on the display 170 in the second driving mode.

Referring to FIG. 29B, the controller 190 may display at least some of a variety of convenience information on the display 170 when the vehicle is set to the second driving mode. At this time, information displayed on the display 170 among all convenience information may be designated according to driver input.

In addition, when the display 170 is a transparent display 171 applied to the front window 12A, the controller 190 may control the transmittance of the transparent display 171 to be greater than or equal to a predetermined value such that the driver can directly view the driving state along with the convenience information.

In addition, the controller 190 may control the display 170 to display information 1002 indicating that the vehicle is currently set to the second driving mode along with the convenience information.

In addition, the controller 190 may divide the screen of the display 170 into a plurality of areas and control the display 170 to display different convenience information in each area, when a plurality of pieces of convenience information is displayed on the display 170.

For example, as shown, the controller 190 may control the display 170 to display Internet information 1203 on the left upper side of the display 170, to display weather information 1202 on the right upper side of the display and to sequentially display a plurality of pictures on the lower end of the display.

For example, the controller 190 may set the vehicle to the second driving mode to display the convenience information 1202, 1203 and 1205 shown in FIG. 29B on the display 170, when the manipulation variables of all the driving manipulation devices are less than the reference values in a state of setting the vehicle to the first driving mode in which the driving information 1101 to 1108 shown in FIG. 29A are displayed.

In contrast, the controller 190 may set the vehicle to the first driving mode to display the driving information 1101 to 1108 shown in FIG. 29A on the display 170, when the manipulation variable of at least one driving manipulation device is greater than or equal to the reference value in a state of setting the vehicle to the second driving mode in which the convenience information 1202, 1203 and 1205 shown in FIG. 29B are displayed.

Since the type, amount, size, color, position, etc. of the information displayed on the display 170 may be changed according to the driving mode of the vehicle, it is possible to make better use the display while driving the vehicle. That is, when the autonomous driving function is blocked and the driver directly drives the vehicle, the driving information may be preferentially displayed rather than the convenience information to secure safety and, when the autonomous driving function is executed and thus the need for the driver to watch the driving state is low, the convenience information may be preferentially displayed rather than the driving information to use the display 170 as a source for providing a variety of information.

Figure 30:
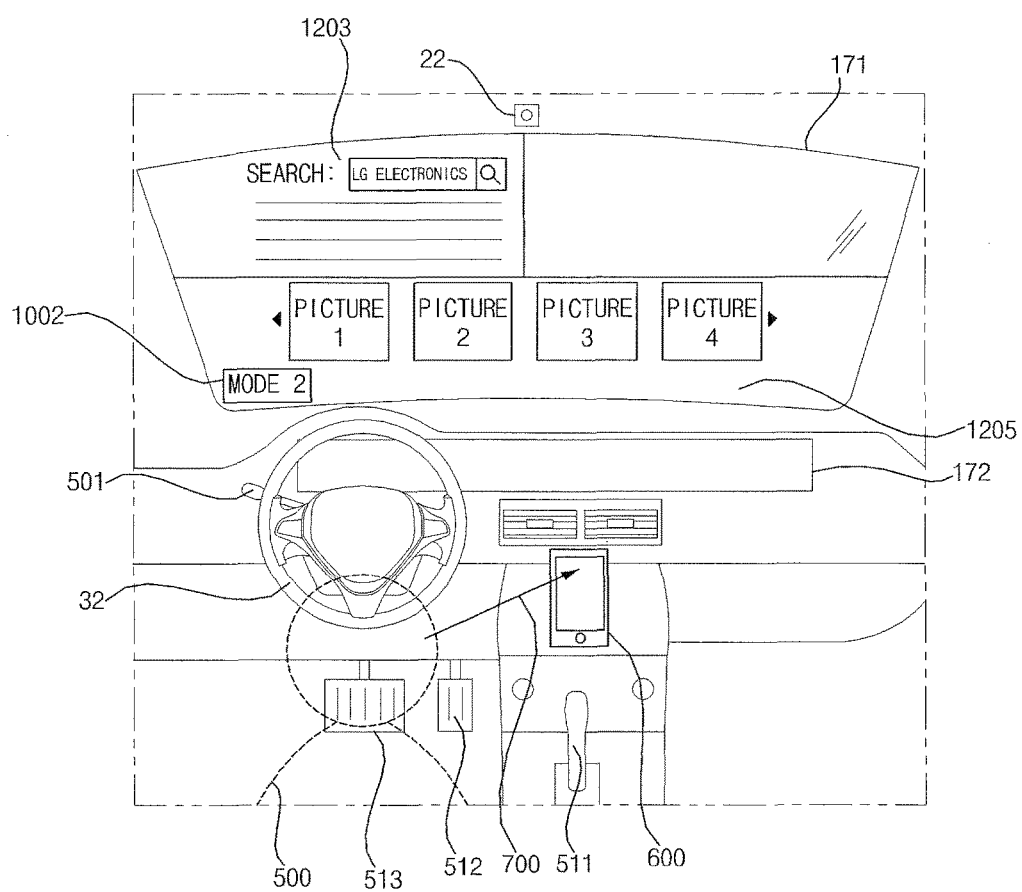
FIG. 30 is a diagram showing an example in which the display apparatus according to the fourth embodiment of the present invention controls a display.

FIG. 30 is a diagram showing an example in which the display apparatus 100 according to the fourth embodiment of the present invention controls the display 170.

The controller 190 may track the point of gaze of the driver. The controller 190 may control the display 170 to remove at least some of the information displayed on the display 170 when the point of gaze of the driver deviates from the screen of the display 170 as the result of tracking the point of gaze of the driver. In addition, the controller 190 may control the display 170 to display the information removed when the point of gaze of the driver deviates from the screen of the display 170, when the point of gaze of the driver is returned to the screen of the display 170.

The point of gaze of the driver may deviate from the screen of the display 170 in various situations. For example, when the driver checks a text message via a mobile phone 600, the point of gaze of the driver may deviate from the screen of the display 170.

In this case, when a variety of information is displayed via the display 170 even when the point of gaze of the driver deviates from the screen of the display 170, power may be unnecessarily wasted.

Referring to FIG. 30, the point 700 of gaze of the driver 500 deviates from the screen of the transparent display 171 in a state of setting the vehicle to the second driving mode.

For example, as shown in FIG. 29B, when the driver does not watch the display 170 as shown in FIG. 30 while convenience information including weather information 1202, Internet information 1203 and a picture 1205 is displayed on the display 170 as shown in FIG. 29B, the controller 190 may control the transparent display 171 not to display the weather information 1202 among the previously displayed convenience information 1202, 1203 and 1205.

This is exemplary and the transparent display 171 may be controlled such that the Internet information 1203 and the picture 1205 disappear instead of the weather information 1202. Alternatively, the controller 190 may control the transparent display 171 such that all previously displayed information disappears when the point of gaze of the driver deviates from the screen of the transparent display 171.

Although not shown, when an image displayed just before the point of gaze of the driver deviates from the screen of the transparent display 171 is a moving image, the controller 190 may temporarily stop the moving image when the point of gaze of the driver deviates from the screen of the transparent display 171. In this case, when the point of gaze of the driver does not return to the screen of the transparent display 171 for a predetermined time or more, the temporarily stopped moving image may be turned off to be no longer displayed on the transparent display 171. Therefore, since the driver can view the moving image again from the time when the point of gaze of the driver deviates from the screen of the transparent display 171 without separate input, it is possible to improve driver convenience.

Figure 31:
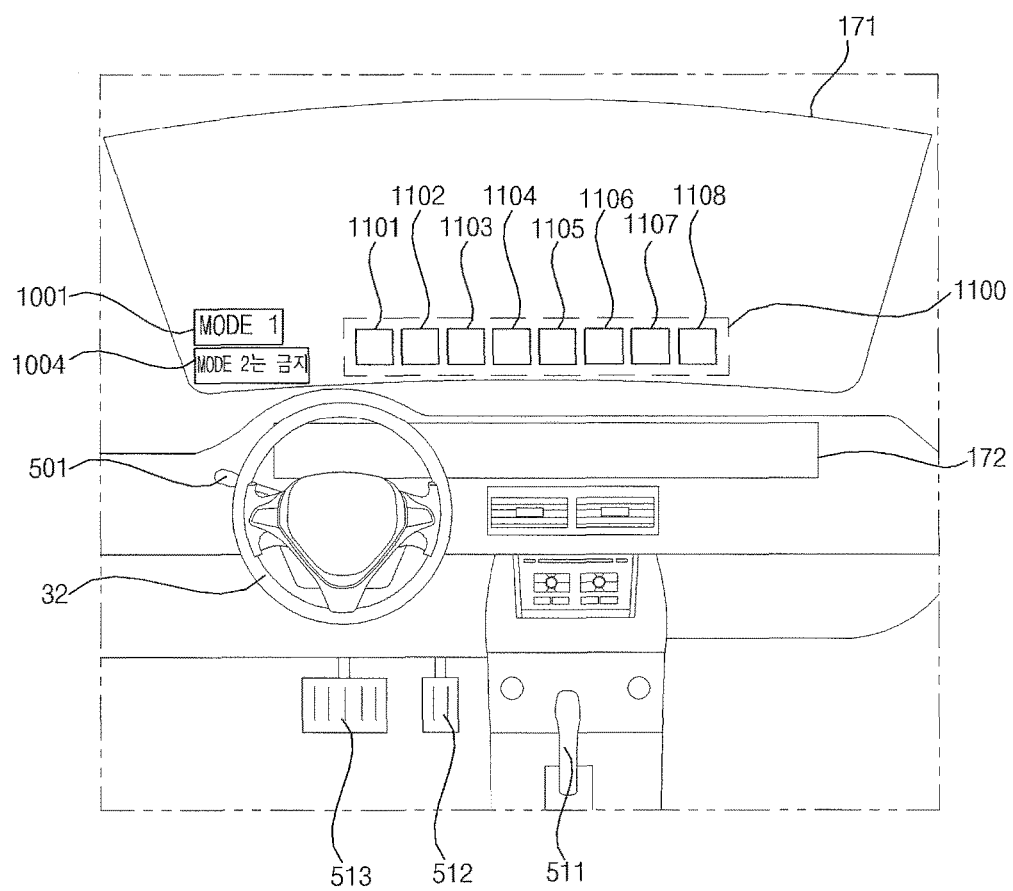
FIG. 31 is a diagram showing an example in which the display apparatus according to the fourth embodiment of the present invention controls a display.

FIG. 31 is a diagram showing an example in which the display apparatus 100 according to the fourth embodiment of the present invention controls the display 170.

The controller 190 may use information about a section where the vehicle is located, along with the manipulation variable of the driving manipulation device, when the driving mode of the vehicle is selected. Here, the information about the section where the vehicle is located may mean information about a section allowing execution or setting of the autonomous driving function.

Such section information may be received from an intelligent transport system (ITS) or a mobile phone of a vehicle passenger or may be pre-stored in the memory 130 of the vehicle.

Referring to FIG. 31, the controller 190 may determine whether the position of the vehicle is a section allowing the second driving mode based on the information about the section where the vehicle is located. For example, the driving route of the vehicle may include any one of a section allowing the second driving mode or a section allowing the first driving mode only. The section allowing the first driving mode only may mean a section for prohibiting the second driving mode.

More specifically, the controller 190 may block or restrict the autonomous driving mode when it is determined that the position of the vehicle is a section for prohibiting the second driving mode, even when the manipulation value of the driving manipulation device is less than the reference value in a state of setting the vehicle to the first driving mode.

For example, when the driver does not manipulate any driving manipulation device while eight pieces of driving information 1101 to 1108 are displayed in the first driving mode as shown in FIG. 29A, the controller 190 may determine whether the vehicle is currently driving in the section allowing the second driving mode, before automatically setting the vehicle to the second driving mode.

If it is determined that the vehicle is currently driving in the section allowing the first driving mode only, the controller 190 may control the display 170 to display information 1004 indicating that the vehicle is currently located in the section for prohibiting the second driving mode to continuously maintain the first driving mode as shown in FIG. 31, without switching the first driving mode to the second driving mode.

Figure 32:
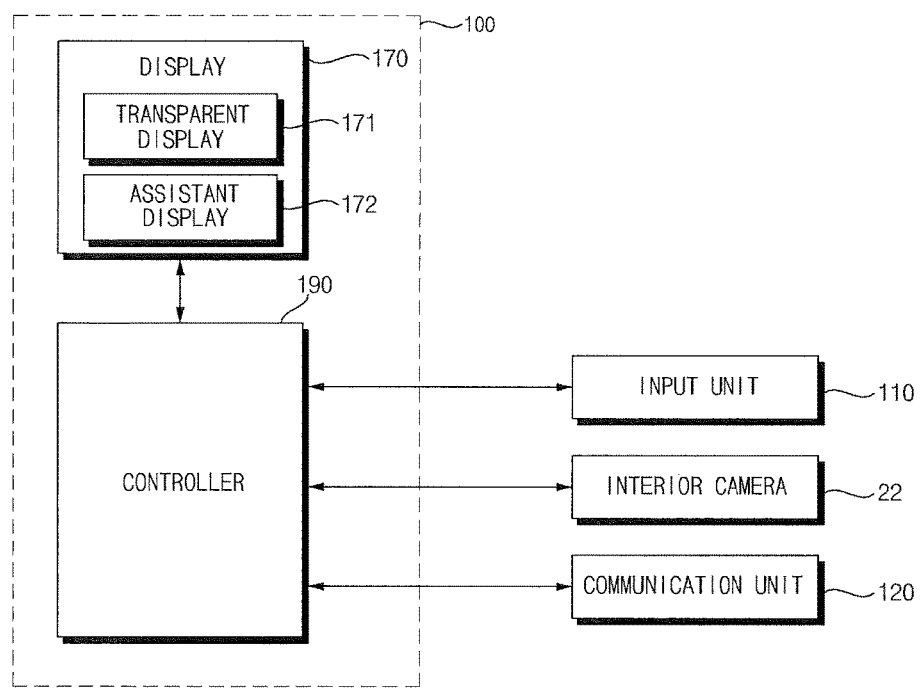
FIG. 32 is a diagram showing the function of a display apparatus according to a fifth embodiment of the present invention.

FIG. 32 is a diagram showing the function of a display apparatus 100 according to a fifth embodiment of the present invention.

Referring to FIG. 32, the display apparatus 100 according to the fifth embodiment includes a display 170 and a controller 190.

The display 170 displays a variety of information under control of the controller 190. For example, the display 170 may include at least one transparent display 171 or at least one assistant display 172. For example, when the transparent display 171 is applied to the front window 12A of the vehicle, the driver may check a variety of information displayed on the transparent display 171 along with the front view of the vehicle. In addition, the assistant display 172 may be a navigation display, for example.

The controller 190 may divide the full route from the current position of the vehicle to a destination into one or more sections according to grade. The destination may be received via the input unit 110 of the vehicle. Here, the destination may include a place to be finally reached and a stopover place.

More specifically, the controller 190 may divide the full route into at least one section based on grade information, when the full route from the position of the vehicle to the destination is searched for. For example, the full route having a distance of 10 km may be divided into a first section having a range from the current position of the vehicle to a position 2 km from the current position of the vehicle and having a first grade, a second section from a position 2 km from the current position of the vehicle to a position 7 km from the current position of the vehicle and having a second grade and a third section from a position 7 km from the current position of the vehicle to a position 10 km from the current position of the vehicle and having the first grade. Here, the first grade may be allocated to the section for prohibiting the autonomous driving function and the second grade may be allocated to the section allowing the autonomous driving function.

The grade information of the sections of the full route may be received from an external device via the communication unit 120 of the vehicle or pre-stored in the memory 130 of the vehicle. For example, when the controller 190 transmits the searched full route to an intelligent transport system (ITS) via the communication unit 120, the ITS may transmit the grade information of the sections of the full route in response thereto.

Any one of a plurality of grades may be allocated to each section in advance. The grade allocated to each section may be decided according to at least one criterion. For example, a first grade may be allocated to the section for prohibiting the autonomous driving function and a second grade may be allocated to the section allowing the autonomous driving function. That is, each section may be allocated any one of the first grade or the second grade, depending on whether the vehicle executes the autonomous driving function.

This is only exemplary and the grade allocated to each section may be changed according to various criteria.

The sections may have the same or different lengths according to the allocated grade. The controller 190 may calculate the length of each section or a time required to pass through each section.

In addition, the controller 190 may control the display 170 to distinguishably display the section to which the grade for allowing the autonomous driving function is allocated and the section to which the grade for prohibiting the autonomous driving function is allocated. For example, the controller 190 may differently display the color, transparency, line thickness, line shape, etc. of the section to which the first grade is allocated and the section to which the second grade is allocated. Therefore, the driver may intuitively check the number, position or order of the sections, to which the second grade for allowing the autonomous driving function is allocated, of the full route to the destination.

The controller 190 may divide the sections of the full route according to the grade in advance to provide the information about the grade of the section to be entered to the driver before the vehicle moves from a section to which any one grade is allocated to a section to which the other grade is allocated. Therefore, it is possible to improve driver driving convenience.

The controller 190 may select any one driving mode corresponding to the grade allocated to the section where the vehicle is located from among a plurality of predetermined driving modes. That is, the controller 190 may switch a driving mode corresponding to a previous grade into a driving mode corresponding to a changed grade when the grade of the section where the vehicle is located is changed as the vehicle moves toward a destination. In addition, the controller 190 may set the vehicle to the selected driving mode automatically or according to driver input.

Here, the plurality of driving modes may be distinguished depending on whether the autonomous driving function is allowed. For example, the driving mode corresponding to the first grade for prohibiting the autonomous driving function may be a first driving mode and the driving mode corresponding to the second grade for allowing the autonomous driving function may be a second driving mode.

Information about the driving mode corresponding to each grade may be pre-stored in the memory 130 of the vehicle.

In the fifth embodiment of the present invention, in the first driving mode, the autonomous driving function is blocked such that the vehicle is driven according to driver manipulation and more driving information than in the section, to which the grade for allowing the autonomous driving function is allocated, may be displayed on the display 170. In addition, in the second driving mode, the autonomous driving function is executed and more convenience information in the section, to which the grade for prohibiting the autonomous driving function is allocated, may be displayed on the display 170.

For example, when the vehicle moves from the section, to which the first grade is allocated, to the section, to which the second grade is allocated, the controller 190 may switch the driving mode of the vehicle from the first driving mode for blocking the autonomous driving function to the second driving mode for executing the autonomous driving mode.

As another example, when the vehicle moves from the section, to which the second grade is allocated, to the section, to which the first grade is allocated, the controller 190 may switch the driving mode of the vehicle from the second driving mode for executing the autonomous driving function to the first driving mode for blocking the autonomous driving mode.

The controller 190 may block the autonomous driving function such that the driver directly drives the vehicle, when the vehicle is set to the first driving mode. In addition, the controller 190 may execute the autonomous driving function such that the vehicle moves toward the destination.

The controller 190 may control the display 170 to display different information according to the plurality of driving modes. Here, displaying different information according to the plurality of driving modes may mean that at least one piece of information is newly displayed or previously displayed information disappears when the driving mode is changed.

For example, the controller 190 may control the display 170 to display first information when the first driving mode is selected and to display new information along with the first information when the second driving mode is selected. At this time, newly added information may be changed according to various criteria such as driver input or the speed of the vehicle.

As another example, the controller 190 may control the display 170 to display second information when the first driving mode is selected and to remove at least some of the second information from the screen when the second driving mode is selected.

As another example, the controller 190 may control the display 170 to display third information when the first driving mode is selected and to display fourth information, which does not overlap the third information, when the second driving mode is selected.

In addition, the controller 190 may control the display 170 to display information about the selected driving mode according to the grade allocated to the section where the vehicle is located among the plurality of driving modes.

For example, the controller 190 may control the display 170 to display information notifying the driver that the first driving mode has been selected in the form of text, when the first driving mode is selected from among the plurality of driving modes.

As another example, the controller 190 may control the display 170 to display information notifying the driver that the second driving mode has been selected in the form of an image, when the second driving mode is selected from among the plurality of driving modes.

The information about the driving mode selected from among the plurality of driving modes according to the grade allocated to the section where the vehicle is located may be provided to the driver using a method other than a method of visually providing information via the display 170.

For example, the controller 190 may control the audio output unit 150 of the vehicle to output a voice message notifying the driver that the first driving mode has been selected, when the first driving mode is selected from among the plurality of driving modes.

As another example, the controller 190 may control a vibration output unit (not shown) of the vehicle to output vibrations notifying the driver that the second driving mode has been selected, when the second driving mode is selected from among the plurality of driving modes.

In addition, the controller 190 may change the transmittance of the transparent display 171 according to the plurality of driving modes. For example, when the vehicle is set to the second driving mode for executing the autonomous driving function, since the driver may not directly manipulate driving of the vehicle, the controller 190 may decrease the transmittance of the transparent display 171 to be less than that of the transparent display when setting the vehicle to the first driving mode.

In addition, the controller 190 may set the vehicle to the driving mode selected from among the plurality of driving modes based on the grade allocated to the section where the vehicle is located.

At this time, the controller 190 may set the vehicle to the selected driving mode, only when driver input for accepting that the vehicle is set to the selected driving mode is received. For example, when driver voice (e.g., "Okay") for accepting the second driving mode is received via the input unit 110 of the vehicle in a state in which information about the second driving mode selected from among the plurality of driving modes is displayed on the display 170, the controller 190 may set the vehicle to the second driving mode. If the second driving mode allows the autonomous driving function, the controller 190 may drive the vehicle toward a destination, after the driver voice (e.g., "Okay") is received.

In contrast, when the second grade is allocated to the section where the vehicle is located, the vehicle may be set to the first driving mode according to selection of the driver, instead of the second driving mode. For example, when driver voice (e.g., "Hold the first driving mode") for rejecting the second driving mode is received via the input unit 110 of the vehicle in a state in which information about the second driving mode selected from among the plurality of driving modes is displayed on the display 170, the controller 190 may not set the vehicle to the second driving mode. That is, when the vehicle is located in the section allowing the autonomous driving function, the controller 190 may or may not execute the autonomous driving function according to driver selection.

The controller 190 may change the type, amount, size, position, color, transmittance, etc. of the information displayed on the display 170 when the driving mode of the vehicle is switched.

The controller 190 may decrease driving information displayed on the display 170 and increase convenience information displayed on the display 170 when the driving mode corresponding to a relatively high grade is selected, as compared to the case in which the driving mode corresponding to a relatively low grade is selected. Here, the second grade for allowing the autonomous driving function may be higher than the first grade for blocking the autonomous driving function.

For example, the controller 190 may control the display 170 to decrease driving information displayed on the display 170 and to increase convenience information displayed on the display 170 when the second driving mode corresponding to the second grade is selected in a state of setting the vehicle to the first driving mode corresponding to the first grade.

As another example, the controller 190 may control the display 170 to decrease convenience information displayed on the display 170 and to increase driving information displayed on the display 170 when the first driving mode corresponding to the first grade is selected in a state of setting the vehicle to the second driving mode corresponding to the second grade.

That is, the controller 190 may control the display 170 to display less driving information or more convenience information when the vehicle is set to the second driving mode, as compared to the case in which the vehicle is set to the first driving mode. For example, the controller 190 may display five pieces of driving information and one piece of convenience information on the display 170 in the first driving mode and display three pieces of driving information and four pieces of convenience information on the display 170 in the second driving mode.

The driving information means information related to the driving state of the vehicle. For example, the driving information may include speed information, route guidance information, a driving image, a blind spot image, obstacle information, traffic sign information, gas mileage information, fuel amount information, failure information, accident information, traffic information, etc. When the driver directly drives the vehicle, the driver receives help in driving the vehicle as the amount of driving information displayed on the display 170 is increased.

In addition, the convenience information means information unrelated to the driving state of the vehicle. That is, the convenience information may include all information except for the above-described driving information. For example, the convenience information may include multimedia, email, games, weather, shopping, Internet, pictures, documents, surrounding facilities, etc. When the vehicle moves toward a destination using the autonomous driving function, as the amount of convenience information displayed on the display 170 is increased, the driver may more efficiently use the indoor space of the vehicle.

The controller 190 may determine whether the state of the driver satisfies a predetermined condition when the vehicle enters the section, to which the third grade is allocated. Here, the third grade may be allocated to the section allowing the autonomous driving function according to the state of the driver. The controller 190 may select the second driving mode corresponding to the third grade, only when the state of the driver satisfies the predetermined condition.

For example, when the vehicle moves from the section, to which the first grade is allocated, to the section, to which the third grade is allocated, the predetermined condition that the controller 190 selects the second driving mode is the point of gaze of the driver located in a predetermined area. That is, the controller 190 may determine whether the point of gaze of the driver is located in the predetermined area.

Here, the predetermined area may correspond to the front side of the vehicle. For example, the predetermined area may be an area corresponding to the front window 12A of the vehicle. That is, the controller 190 may select the second driving mode when entering the section, to which the second grade is allocated, under the condition that the point of gaze of the driver is located within the front window 12A. The controller 190 may receive the interior image from the interior camera 22, analyze the interior image and detect the point of gaze of the driver. In addition, the controller 190 may compare the detected point of gaze of the driver with the predetermined area and determine whether the point of gaze of the driver is located within the predetermined area. A known gaze detection algorithm may be used to detect the point of gaze of the driver from the image and a detailed description thereof will be omitted.

If the point of gaze of the driver deviates from the predetermined area (e.g., the front window 12A) when the vehicle enters the section, to which the third grade is allocated, in a state of setting the vehicle to the first driving mode, the second driving mode may not be selected and, instead, the first driving mode may be continuously maintained.

In addition, before determining whether the point of gaze of the driver is located within the predetermined area when the vehicle enters the section, to which the third grade is allocated, the controller 190 may control the display 170 to display information indicating that the point of gaze of the driver should be located within the predetermined area.

The controller 190 may automatically execute at least one of the driving assistance functions of the vehicle when the first driving mode is selected from among the plurality of driving modes. More specifically, in the present invention, the driving assistance function may mean assisting the driver in driving the vehicle. The driving assistance function is different from the autonomous driving function in that manipulation of the driver is required for the vehicle to move to a destination along a route while avoiding an obstacle, etc.

A driver assistance system (not shown) provided to the vehicle may provide a plurality of driving assistance functions. For example, the driving assistance functions may include adaptive cruise control, autonomous emergency braking, forward collision warning, adaptive headlight control, surrounding view monitor, blind spot detection, lane change assist, lane departure warning, lane maintenance assist, night vision, automatic parking, traffic sign recognition, curve speed warning, etc. These are exemplary and any function for assisting the driver in manipulating the vehicle may be executed.

The controller 190 may automatically execute or release at least one of the plurality of driving assistance functions according to a predetermined criterion upon selecting the first driving mode. For example, the controller 190 may automatically execute more driving assistance functions in a section having a high speed limit than in a section having a low speed limit. As another example, the controller 190 may execute more driving assistance functions as the driver depresses the accelerator pedal 512.

In addition, the controller 190 may change the type and number of the driving assistance functions to be automatically executed using section information received from an external device. For example, the controller 190 may transmit the position information thereof to an ITS via the communication unit 120 of the vehicle, receive a recommended function list from the ITS and automatically execute the driving assistance function included in the received recommended function list.

As an example, when the vehicle is located in a section having the first grade allocated thereto and having a sharp curve, the ITS may transmit a recommended function list including curve speed warning to the vehicle. Then, the controller 190 may automatically execute the curve speed warning function included in the recommended function list among the driving assistance functions without driver input to assist the driver in safely passing through the sharp curve.

In addition, the controller 190 may display information indicating that the autonomous driving function is executed on the exterior surface of the display 170, when the second driving function is selected from among the plurality of driving modes. For example, the controller 190 may display a text message indicating that the autonomous driving function is executed on the exterior surface of the transparent display 171. Therefore, the vehicle may notify pedestrians that the autonomous driving function is currently being executed.

Hereinafter, the fifth embodiment of controlling the display 170 based on the manipulation variable of the driving manipulation device will be described in greater detail with reference to FIGS. 33 to 40. For convenience of description, in FIGS. 33 to 40, assume that the display 170 includes a transparent display 171 formed on the front window 12A.

Figure 33:
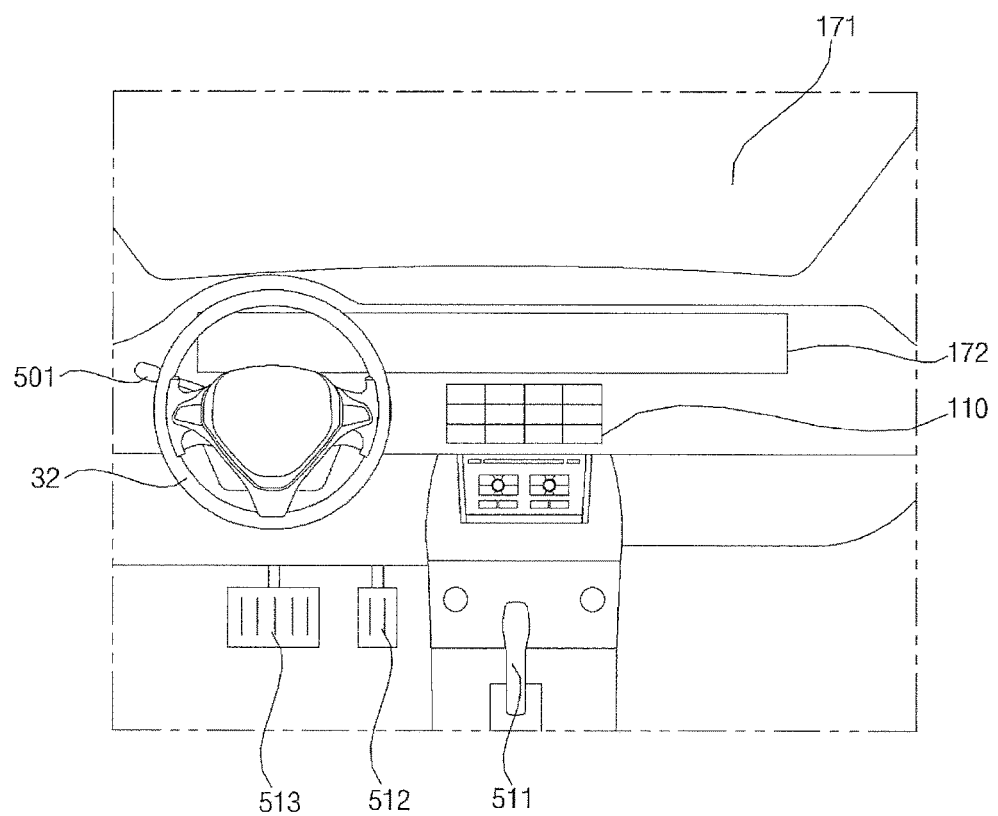
FIG. 33 is a diagram showing the interior of a vehicle including the display apparatus according to the fifth embodiment of the present invention.

FIG. 33 is a diagram showing the interior of a vehicle including the display apparatus 100 according to the fifth embodiment of the present invention.

Referring to FIG. 33, an input unit 110 may be provided in the interior of the vehicle including the display apparatus 100 according to the fifth embodiment of the present invention.

The driver may input a desired destination via the input unit 110 before driving. For example, when the screen of the assistant display 172 is a touchscreen, the driver may input the destination (e.g., "the White House") to a navigation system (not shown) of the vehicle using the touchscreen. In this case, the assistant display 172 may function as the input unit 110.

The input unit 110 may be provided in various forms such as a button, a microphone, a touch panel, a joystick, etc. in addition to the touchscreen. For example, when the driver speaks a destination, the microphone may convert the driver voice into an electrical signal and provide the electrical signal to the navigation system.

The navigation system of the vehicle system may search for a route from the current position of the vehicle to the destination. At this time, a plurality of routes may be searched for and the controller 190 may display the routes searched for by the navigation system on the display 170. For example, the controller 190 may display the searched route on at least one of the transparent display 171 or the assistance display 172. As another example, when the transparent display 171 has a screen wider than that of the assistance display 172, the controller 190 may display the searched routes on the assistance display 172 at a first scale (e.g., 1:50000) and display the searched route on the transparent display 171 at a second scale (1:25000) less than the first scale. Thus, the searched route having a larger size may be displayed on the transparent display 171 in greater detail.

As in the fourth embodiment, the vehicle may include one or more driving manipulation devices. The driving manipulation device may mean a device for receiving a driver command for changing the driving state of the vehicle.

For example, the vehicle may include a direction manipulation device such as a steering wheel 32, a direction indication level 501, etc.

In addition, the vehicle may include a speed manipulation device such as an accelerator pedal 512, a brake pedal 513, etc.

In addition, the vehicle may include a device related to direction manipulation and speed manipulation, such as a gear shifter 511, etc.

As described above, the driving manipulation devices of the vehicle may respectively include different sensors for sensing manipulation variables thereof and the controller 190 may monitor the manipulation variables of the driving manipulation devices based on the signals received from the sensors.

Figure 34:
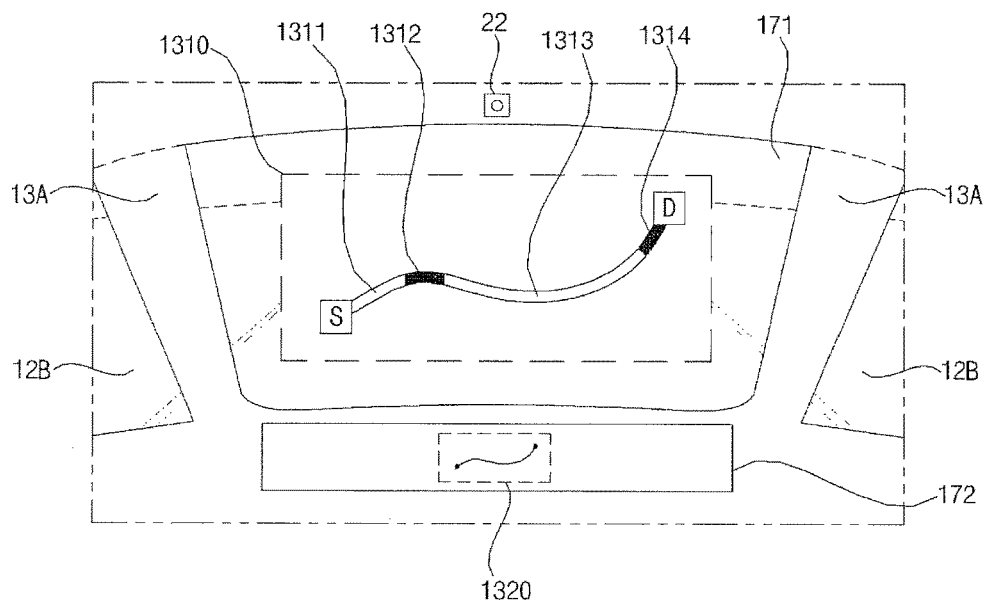
FIG. 34 is a diagram showing an example in which the display apparatus according to the fifth embodiment of the present invention controls a display.

FIG. 34 is a diagram showing an example in which the display apparatus 100 according to the fifth embodiment of the present invention controls the display 170.

The controller 190 may display the full route from the position of the vehicle to the destination on the display 170. In addition, the controller 190 may divide the full route into one or more sections according to the grade. When the full route has been divided, the controller 190 may display information about the result of dividing the full route on the display 170.

Referring to FIG. 34, the controller 190 may display the information of the result of dividing the full route from the position of the vehicle to the destination into one or more sections according to the grade on the transparent display 171 and the assistance display 172.

At this time, the controller 190 may display first division result information on the assistance display 172 at the first scale and display second division result information on the transparent display 171 at the second scale less than the first scale. As shown, since the second division result information displayed on the transparent display 171 is larger and more detailed than the first division result information, the driver can easily check the division result.

Although the division result information is shown as being displayed on the transparent display 171 and the assistance display 172 in FIG. 34, the controller 190 may display the division result information on any one of the transparent display 171 and the assistance display 172.

The controller 190 may provide different visual effects to the sections according to the grade, upon displaying the division result information. More specifically, the controller 190 may control the display 170 to distinguishably display the section, to which the first grade for allowing the autonomous driving function is allocated, and the section, to which the second grade for prohibiting the autonomous driving function is allocated, upon displaying the information about the result of dividing the full route on the display.

For example, the controller 190 may control the transparent display 171 to display a line indicating the section, to which the first grade is allocated, in white and to display a line indicating the section, to which the second grade is allocated, in black.

When the full route from the position of the vehicle to the destination is divided into four sections, as shown in FIG. 34, the second division result information may include the position ("S") of the vehicle, the destination ("D"), a first section 1311, a second section 1312, a third section 1233 and a fourth section 1314. The first section 1311 and the third section 1313 having the white color correspond to the section, to which the first grade is allocated, and the second section 1312 and the fourth section 1314 having the black color correspond to the section, to which the second grade is allocated.

Although the full route is shown as being divided into four sections in FIG. 34, this is exemplary and the present invention is not limited thereto. For example, when the destination is changed, the full route may be divided into fewer than four sections or more than four sections. As another example, when the full route includes only the section, to which the first grade is allocated, the entire section of the second division result information may have a single color (e.g., white).

Although not shown, the controller 190 may further display additional information such as the length of each section, the estimated driving time of each section, etc., upon displaying the division result information on the display 170.

The controller 190 may not display at least some of the second division result information, upon displaying the first division result information on the assistance display 172.

Figure 35:
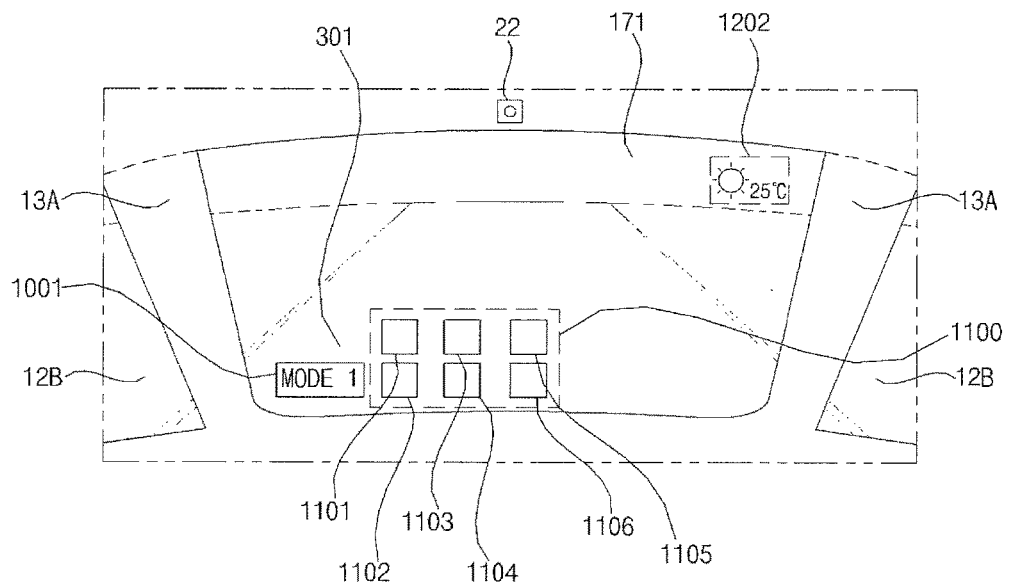
FIG. 35 is a diagram showing an example in which the display apparatus according to the fifth embodiment of the present invention controls a display.

FIG. 35 is a diagram showing an example in which the display apparatus 100 according to the fifth embodiment of the present invention controls the display 170. For convenience of description, assume that the vehicle enters the first section 1311 of the full route shown in FIG. 34.

The controller 190 may select any one driving mode corresponding to the grade allocated to the section where the vehicle is located from among the plurality of driving modes.

When the position of the vehicle is the first section 1311 shown in FIG. 34, since the first grade is allocated to the first section 1311, the controller 190 may select the first driving mode from among the plurality of driving modes. The first driving mode refers to a mode for blocking the autonomous driving function as described above.

The controller 190 may set the vehicle to the selected driving mode automatically or according to acceptance of the driver. For example, after information 101 indicating that the first driving mode has been selected from among the plurality of driving modes is displayed, the controller 190 may set the vehicle to the first driving mode upon receiving, from the driver, input indicating that the driver confirms the information 1001.

The controller 190 may control the display 170 to display at least one piece of driving information upon setting the vehicle to the first driving mode. The driving information is information related to the driving state of the vehicle and may include speed information, route guidance information, driving image, blind spot image, obstacle image, traffic sign information, gas mileage information, fuel quantity information, failure information, accident information, traffic information, etc.

For example, as shown in FIG. 35, the controller 190 may display information about speed 1101, a route guide 1102, a driving image 1103, a fuel quantity 1104, a gas mileage 1105 and failure 1106.

As another example, the controller 190 may display weather information 1202 of the convenience information on the transparent display 171. At this time, the controller 190 may control the amount of driving information displayed on the transparent display 171 to be greater than the amount of convenience information.

Although the plurality pieces of driving information 1101 to 1106 is shown as being aligned with the lower end of the transparent display 171 in the form of a matrix with the same size, this is exemplary. More or less driving information may be displayed, the plurality pieces of driving information 1101 to 1106 may be displayed in the form of a curve, or any one piece of information may have a size different from that of the other driving information.

In addition, the controller 190 may change the position, order or color of the plurality pieces of driving information 1101 to 1106 according to predetermined priority. For example, the controller 190 may display the plurality pieces of driving information 1101 to 1106 on the transparent display 171 from the left in descending order of priority. As another example, the controller 190 may display driving information having relatively high priority in red and display driving information having relatively low priority in blue.

The driving information displayed on the display 170 in the first driving mode may be predetermined according to circumstance. For example, the controller 190 may display a blind spot image only when the vehicle moves in reverse. As another example, the controller 190 may always display speed information while driving the vehicle and display failure information only when failure occurs.

Alternatively, in the first driving mode, the driving information displayed on the display 170 may be changed according to driver input. For example, the controller 190 may control the display 170 to display only the speed information and the route guidance information among the driving information and not to display the other information according to driver input.

Figure 36:
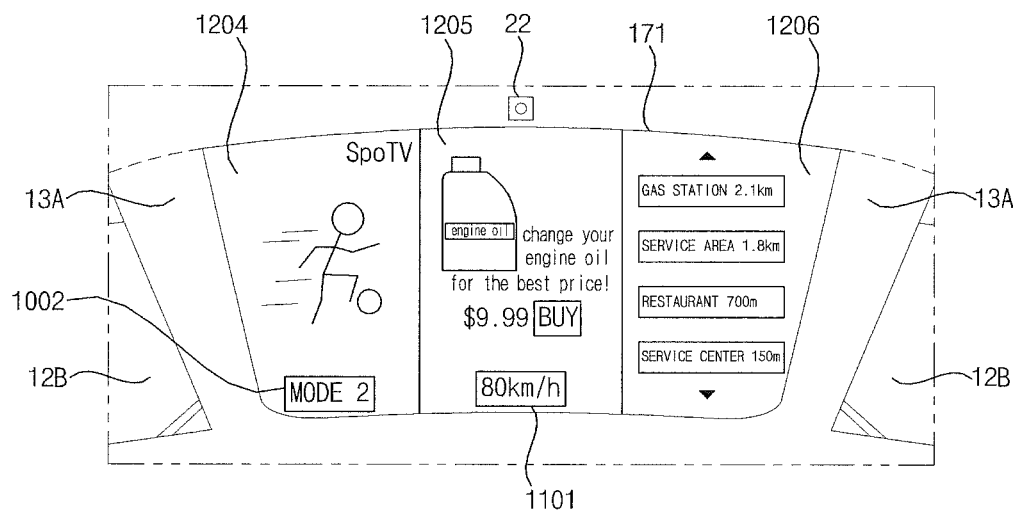
FIG. 36 is a diagram showing an example in which the display apparatus according to the fifth embodiment of the present invention controls a display.

FIG. 36 is a diagram showing an example in which the display apparatus 100 according to the fifth embodiment of the present invention controls the display 170. For convenience of description, assume that the vehicle moves from the first section 1311 to the second section 1312 of the full route shown in FIG. 34.

The controller 190 may select any one driving mode corresponding to the grade allocated to the section where the vehicle is located from among the plurality of driving modes.

When the vehicle enters the second section 1312 shown in FIG. 34, since the second grade is allocated to the second section 1312, the controller 190 may select the second driving mode from among the plurality of driving modes. The second driving mode allows the autonomous driving function as described above.

The controller 190 may set the vehicle to the selected driving mode autonomously or upon driver acceptance. For example, after information 1002 indicating that the second driving mode has been selected from among the plurality of driving modes is displayed, the controller 190 may set the vehicle to the second driving mode upon receiving, from the driver, input indicating that the driver confirms the information 1102.

The controller 190 may control the display 170 to display at least one piece of the convenience information upon setting the vehicle to the second driving mode. The convenience information is unrelated to the driving state of the vehicle and may include a variety of information such as multimedia, email, games, weather, shopping, Internet, pictures, documents and surrounding facilities, etc.

For example, as shown in FIG. 36, the controller 190 may display information about multimedia 1204 (e.g., sports broadcast), shopping 1205 (e.g., engine oil purchase) and surrounding facilities 1206 (e.g., a gas station, a service area, a restaurant or a service center) among a variety of convenience information on the transparent display 171.

As another example, the controller 190 may display speed information 1101 among the plurality pieces of driving information on the transparent display 171. Although the speed information 1101 is shown as being located in the area in which the shopping information 1205 is displayed in FIG. 36, this is exemplary. The driving information other than the speed information 110 may be displayed or the speed information 1101 and the other driving information may be displayed. At this time, the controller 190 may control the amount of convenience information displayed on the transparent display 171 to be greater than the amount of driving information.

Although three pieces of convenience information are shown as being horizontally aligned in FIG. 36, this is exemplary. More or less convenience information may be displayed or the plurality of pieces of convenience information 1204 to 1206 may be vertically aligned.

In addition, the controller 190 may change the position, order, transmittance, etc. of the plurality of pieces of convenience information 1204 to 1206 according to predetermined priority. For example, when the plurality pieces of convenience information 1204 to 1206 is displayed on the transparent display 171, the controller 190 may display the driving information from the left in ascending order of priority preset by the driver. As another example, the controller 190 may set the transmittance of the area, in which driving information having relatively high priority is displayed, to be less than that of the area, in which driving information having relatively low priority is displayed, in the entire area of the transparent display 171.

In the second driving mode, the convenience information displayed on the display 170 may be predetermined according to circumstance. For example, the controller 190 may display information about surrounding facilities on the display 170 only when the surrounding facilities such as a gas station are located within a predetermined distance of the vehicle. As another example, the driver may register a broadcast channel to be viewed via the input unit 110 and input a time for viewing the broadcasting channel and the controller 190 may display the registered broadcast channel on the display 170 when the time input by the driver is reached.

Alternatively, in the second driving mode, the convenience information displayed on the display 170 may be changed according to driver input. For example, the controller 190 may display other convenience information except for information about the multimedia 1204, shopping 1205 and surrounding facilities 1206 shown in FIG. 36 on the display 170 according to driver input.

In the second driving mode, since the autonomous driving function is executed and the need for the driver to always watch and perceive the driving state is reduced, a variety of convenience information may be displayed on the display 170 to help the driver more efficiently use the vehicle.

Figure 37A:
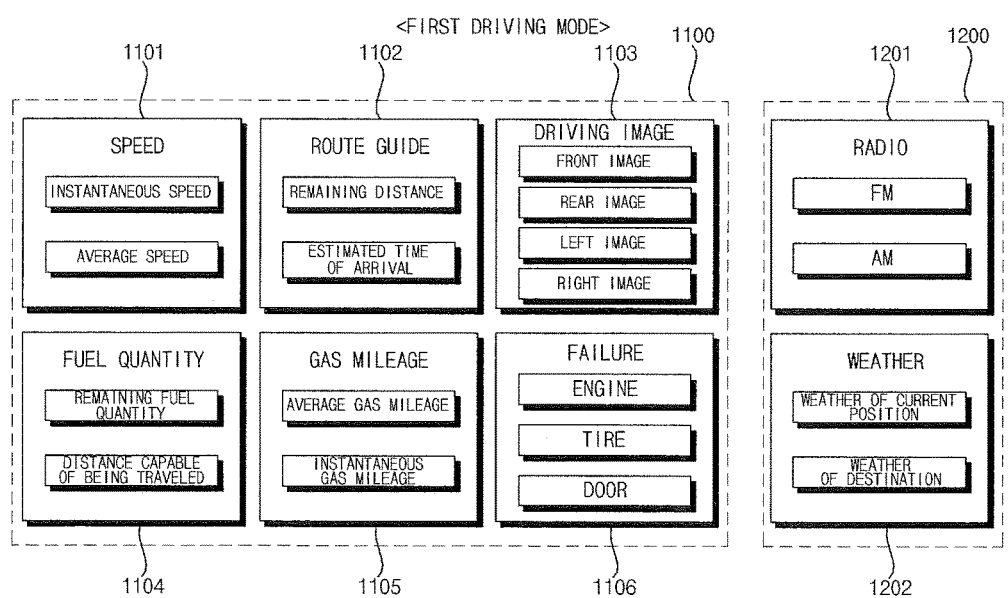
FIGS. 37A and 37B are diagrams showing an example in which the display apparatus according to the fifth embodiment of the present invention controls a display.
Figure 37B:
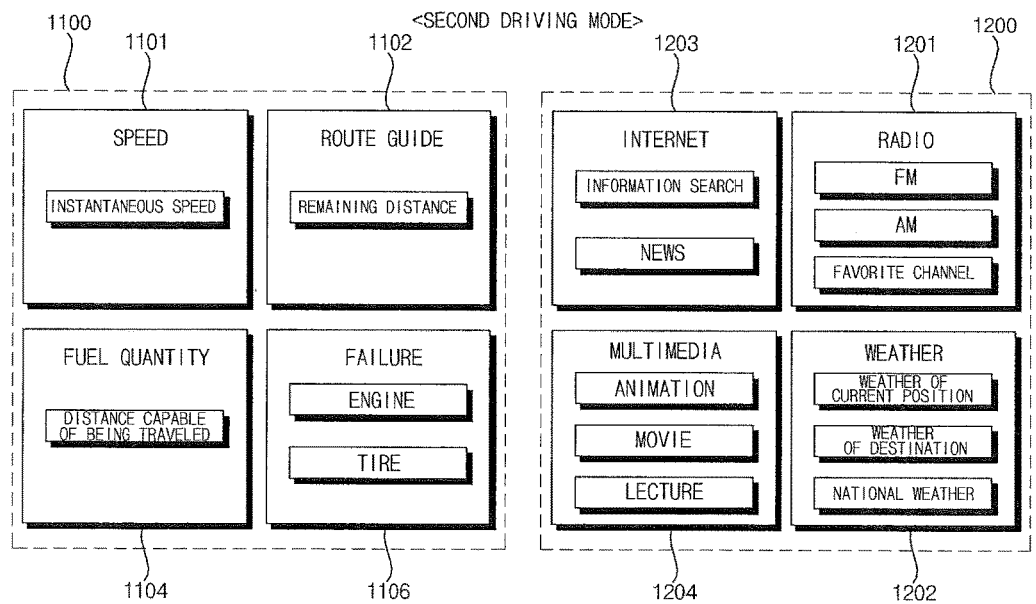

FIGS. 37A and 37B are diagrams showing an example in which the display apparatus 100 according to the fifth embodiment of the present invention controls the display 170.

The controller 190 may decrease driving information displayed on the display 170 and increase convenience information displayed on the display 170 when the vehicle moves from a section, to which a relatively low grade is allocated, to a section, to which a relatively high grade is allocated.

The controller 190 may decrease convenience information displayed on the display 170 and increase driving information displayed on the display 170 when the vehicle moves from a section, to which a relatively high grade is allocated, to a section, to which a relatively low grade is allocated.

That is, since any one of the first driving mode and the second driving mode may be selected according to the grade of the section where the vehicle is located, the controller 190 may control the display 170 to change the amount of driving information and convenience information displayed when the driving mode is switched from the first driving mode to the second driving mode or when the driving mode is switched from the second driving mode to the first driving mode.

First, referring to FIG. 37A, an example of the driving information and convenience information displayed when the vehicle is located within the section, to which the first grade is allocated, to set the vehicle to the first driving mode is shown. As shown, the amount of driving information displayed in the first driving mode may be greater than the amount of convenience information.

More specifically, the controller 190 may control the display 170 to display the driving information such as speed 1101 (e.g., instantaneous speed or average speed), a route guide 1102 (e.g., a distance to a destination or an estimated time of arrival), a driving image 1103 (e.g., a front image, a rear image, a left image, a right image), a fuel quantity 1004 (e.g., a remaining fuel quantity, a remaining range), a gas mileage 1105 (e.g., an average gas mileage, an instantaneous gas mileage), failure 1006 (e.g., engine failure, tire failure, door failure). In addition, the controller 190 may control the display 170 to display the convenience information such as a radio channel 1201 (e.g., FM or AM radio channel) and weather 1202 (e.g. weather of a current position or weather of a destination), as shown, when the vehicle is set to the first driving mode.

Next, referring to FIG. 37B, an example of driving information and convenience information displayed when the vehicle is located in the section to which the second grade is allocated to set the vehicle to the second driving mode is shown. As shown, the amount of convenience information displayed in the second driving mode may be greater than the amount of driving information.

More specifically, the controller 190 may control the display 170 to display convenience information such a radio channel 1201 (e.g., FM or AM radio channel, favorite channel), weather 1202 (e.g., weather of the current position, weather of the destination, national weather), Internet 1203 (e.g., information search, news), and multimedia 1204 (e.g., animation, movie, or lecture), when the vehicle is set to the second driving mode. In addition, the controller 190 may control the display 170 to display driving information such as speed 1101 (e.g., instantaneous speed), a route guide 1102 (e.g., a distance to a destination), a fuel quantity 1104 (e.g., a remaining fuel quantity), failure 1106 (e.g., engine failure or tire failure), as shown, when the vehicle is set to the second driving mode.

The controller 190 may change the driving information and the convenience information displayed before switching, when the driving mode of the vehicle is switched from the first driving mode to the second driving mode or from the second driving mode to the first driving mode.

More specifically, when comparing FIG. 37A and FIG. 37B, when the driving mode is switched from the first driving mode to the second driving mode, the controller 190 may control the display 170 to remove at least some of the driving information displayed in the first driving mode and to increase the number of types of the convenience information. For example, the driving image 1103 which is the driving information 1100 displayed in the first driving mode may not be displayed in the second driving mode but the Internet 1203 and the multimedia 1204 of the convenience information 1200, which are not displayed in the first driving mode, may be displayed in the second driving mode. As another example, the average speed information 1101 of the vehicle which is the driving information 1100 displayed in the first driving mode may not be displayed in the second driving mode but favorite channel information, which is not displayed in the first driving mode, of the information about the radio channel 1201 may be displayed in the second driving mode.

That is, the controller 190 may control the display 170 to display more driving information when the vehicle is set to the first driving mode for blocking the autonomous driving function, as compared to the second driving mode for executing the autonomous driving function. In addition, the controller 190 may control the display 170 to display more convenience information when the vehicle is set to the second driving mode for executing the autonomous driving function, as compared to the first driving mode for blocking the autonomous driving function.

For example, when the vehicle moves from the first section 1311 to the second section shown in FIG. 34, the controller 190 may decrease driving information displayed on the display 170 and increase convenience information. As another example, when the vehicle moves from the second section 1312 to the third section 1313 shown in FIG. 34, the controller 190 may decrease convenience information displayed on the display 170 and increase driving information.

The type and amount of driving information and the convenience information shown in FIGS. 37A and 37B are exemplary and may be changed according to driver input.

Figure 38:
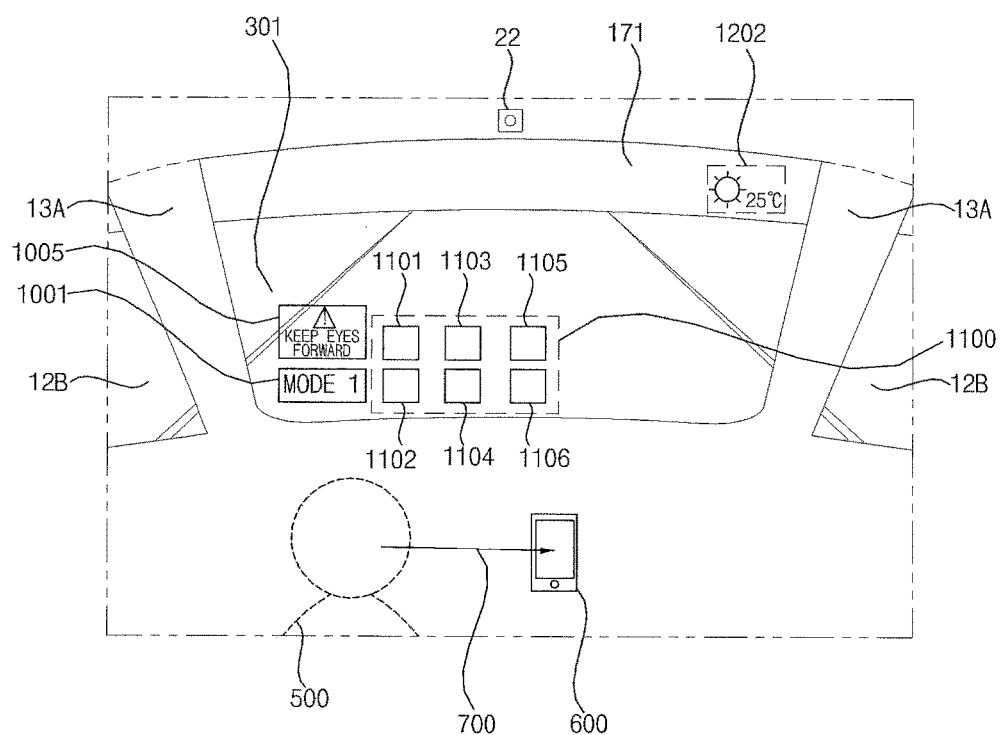
FIG. 38 is a diagram showing an example in which the display apparatus according to the fifth embodiment of the present invention controls a display.

FIG. 38 is a diagram showing an example in which the display apparatus 100 according to the fifth embodiment of the present invention controls the display 170.

The controller 190 may use the state of the driver (e.g., the point of gaze of the driver) along with the grade information of each section, when the driving mode of the vehicle is selected.

More specifically, the controller 190 may select the second driving mode regardless of the state of the driver, when the vehicle enters the section, to which the second grade is allocated, in a state of being set to the first driving mode. In contrast, the controller 190 may select the second driving mode only when the state of the driver satisfies a predetermined condition, when the vehicle enters the section, to which the third grade is allocated, in a state of being set to the first driving mode.

For example, the controller 190 may select the second driving mode in the section, to which the third grade is allocated, under condition that the point of gaze of the driver is located within the predetermined area.

The point 700 of gaze of the driver 500 may deviate from the predetermined area (e.g., the area of the front window 12A) in various situations. For example, as shown in FIG. 38, when the driver manipulates a mobile phone 600, the point 700 of gaze of the driver 500 may deviate from the area of the front window 12A.

Even when the vehicle is located in the section, to which the third grade is allocated, when the point 700 of gaze of the driver 500 deviates from the predetermined area (e.g., the area of the front window 12A), the controller 190 may not select the second driving mode but maintain the first driving mode. That is, the controller 190 may block the autonomous driving function. At this time, the controller 190 may display information 1005 (e.g., "Keep eyes forward") indicating that the point of gaze of the driver should be located within the predetermined area in one region of the display 170, as shown in FIG. 38. In addition, the controller 190 may output alarm sound via the sound output unit 150 when the point 700 of gaze of the driver 500 deviates from the predetermined area (e.g., the area of the front window 12A).

Since the driver is urged to view the driving state even when the vehicle is located in the section, to which the grade for allowing the autonomous driving function is allocated, it is possible to reduce risk of collision due to an unexpected accident which cannot be handled via the autonomous driving function.

Figures 39, 40:
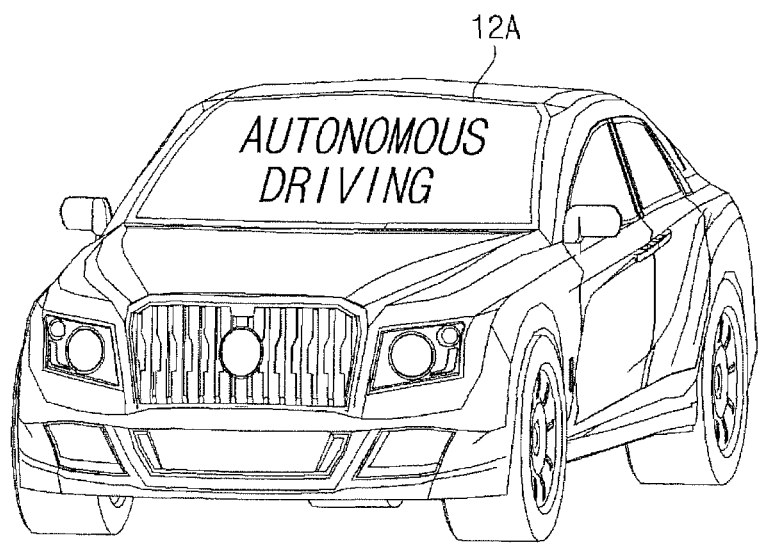
FIG. 39 is a diagram showing an example in which the display apparatus according to the fifth embodiment of the present invention controls a display.
FIG. 40 is a diagram showing an example in which the display apparatus according to the fifth embodiment of the present invention controls a display.

FIG. 39 is a diagram showing an example in which the display apparatus 100 according to the fifth embodiment of the present invention controls the display 170.

The controller 190 may automatically execute or release at least one of the driving assistance functions provided to the vehicle, when the first driving mode is selected from the plurality of driving modes. In addition, the controller 190 may control the display 170 to display the information about the automatically executed driving assistance function.

As described above, the driving assistance function may mean assisting the driver in manipulating the vehicle. A driver assistance system (not shown) provided to the vehicle may provide a plurality of driving assistance functions. For example, the driving assistance functions may include adaptive cruise control, autonomous emergency braking, forward collision warning, etc. These are exemplary and any function for assisting the driver in manipulating the vehicle may be executed. Since the autonomous driving function is blocked in the first driving mode, at least one of the plurality of driving assistance functions needs to be automatically executed to assist the driver manipulation of the vehicle.

The driving assistance function automatically executed in the first driving mode may be set according to various criteria.

For example, the controller 190 may automatically execute only a predetermined driving assistance function regardless of the driving state of the vehicle, when the vehicle enters the first driving mode.

As another example, the controller 190 may automatically execute more driving assistance functions as risk of accident is increased, when the vehicle enters the first driving mode. The controller 190 may calculate risk of accident using various variables such as the speed of the vehicle, the driving experience of the driver, the features of the section (e.g., presence/absence of a sharp curve, a speed bump or a tunnel).

For example, since risk of accident is increased as the speed of the vehicle is increased, the controller 190 may automatically execute more driving assistance functions in a section having a high speed limit as compared to a section having a low speed limit. Alternatively, the controller 190 may automatically execute more driving assistance functions as the driver depresses the accelerator pedal 512.

In FIG. 39, the relationship between the speed of the vehicle and the automatically executed driving assistance function is shown. For convenience of description, the speed of the vehicle may be divided into four speeds and the driving assistance function may be divided into three functions. These may be differently set as necessary.

Referring to FIG. 39, when the speed of the vehicle is 0 to 30 km, the controller 190 may not automatically execute any of the forward collision warning (FCW) function, autonomous emergency braking (AEB) function and lane departure warning (LDW) function.

In addition, when the speed of the vehicle is 30 to 60 km, the controller 190 may automatically execute the lane departure warning (LDW) function only.

In addition, when the speed of the vehicle is 60 to 100 km, the controller 190 may automatically execute the autonomous emergency braking (AEB) function and lane departure warning (LDW) function.

In addition, when the speed of the vehicle exceeds 100 km, the controller 190 may automatically execute the forward collision warning (FCW) function, automatic emergency braking (AEB) function and lane departure warning (LDW) function.

In the first driving mode for blocking the autonomous driving function, one or more driving assistance functions may be automatically executed regardless of the command of the driver, thereby assisting the driver in manipulating the vehicle. Of course, the controller 190 may block at least one of the driving assistance functions to be automatically executed according to the command of the driver.

FIG. 40 is a diagram showing an example in which the display apparatus 100 according to the fifth embodiment of the present invention controls the display 170.

Referring to FIG. 40, the controller 190 may display information indicating that the vehicle executes the autonomous driving function on the exterior surface of the display 170, when the second driving mode is selected.

More specifically, as shown, when the transparent display 171 is located in the area of the front window 12A of the vehicle, the controller 190 may display a text message (e.g., "AUTONOMOUS DRIVING") on the exterior surface of the transparent display 171. In addition, the controller 190 may control the transparent display 171 to display or not to display the information with time or change the color of the information time. Thus, it is possible to rapidly and intuitively notify pedestrians that the vehicle is currently executing the autonomous driving function.

The controller 190 may display the information on the exterior surface of the transparent display 171 and, at the same time, continuously display convenience information or driving information on the interior surface of the transparent display 171 as shown in FIG. 36. That is, while the information indicating that the vehicle is driving using the autonomous driving function is displayed on the exterior surface of the transparent display 171, the driver may receive a variety of information displayed on the interior surface of the transparent display 171. Therefore, it is possible to improve driver convenience.

Although the first to fifth embodiments have been individually described, two or more of the first to fifth embodiments may be combined. For example, the controller 190 may display predetermined information on the transparent display 171 in consideration of both internal environment information and external environment information of the vehicle. As another example, the controller 190 may change the position of the driving image according to the point of gaze of the driver and display the driving image on the transparent display 171. As another example, when another vehicle approaches the vehicle within a detection area (see reference numeral "DA" of FIG. 10A) in a state in which the vehicle enters the autonomous driving mode such that the transmittance of the transparent display 171 is adjusted to be a predetermined value or less, the transmittance of the transparent display 171 may be readjusted to be the predetermined value or more.

The effects of the vehicle display apparatus and the method for controlling the same according to the present invention will be described.

According to at least one of the embodiments of the present invention, since the driving mode is selected based on the manipulation variable of the driving manipulation device and information corresponding to the selected driving mode is displayed, information suitable for the driving mode may be displayed without separate input for the driving mode of the driver.

According to at least one of the embodiments of the present invention, since the driving mode is selected based on the grade allocated to the section where the vehicle is located and information corresponding to the selected driving mode is displayed, it is possible to display information suitable for the driving mode without separate input for the driving mode of the driver.

According to at least one of the embodiments of the present invention, since information for urging the driver to keep the point of gaze of the driver forward in the driving mode for blocking the autonomous driving function, it is possible to improve safety when the driver directly drives the vehicle.

According to at least one of the embodiments of the present invention, when the point of gaze of the driver is not kept forward, the autonomous driving function is automatically executed so as to secure safety even when the driver cannot directly manipulate the vehicle due to unexpected accidents (e.g., heart attack).

The foregoing embodiments of the present invention are implemented not only through an apparatus and method but also through a program for performing functions corresponding to the components of the embodiments of the present invention or a recording medium having the program recorded thereon. This implementation may be easily achieved by one of ordinary skill in the art from the above-described embodiments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
   a display; and
   at least one processor configured to:
      monitor a value of a manipulation variable corresponding to a user input to a driving manipulation device provided in a vehicle, the value of the manipulation variable corresponding to an extent of the user input provided to the driving manipulation device;
      select, from among a plurality of driving modes and based on the value of the manipulation variable of the driving manipulation device, a driving mode for the vehicle;
      determine a display ratio of driving information to convenience information based on the value of the manipulation variable of the driving manipulation device; and
      control, according to the selected driving mode, the display to display driving information and convenience information for the selected driving mode according to the determined display ratio,
   wherein the at least one processor is further configured to:
      determine that the value of the manipulation variable of the driving manipulation device is greater than or equal to a reference value;
      select a first driving mode from among the plurality of driving modes based on the determination that the value of the manipulation variable is greater than or equal to the reference value, wherein the first driving mode corresponds to blocking an autonomous driving function of the vehicle; and
      based on selecting the first driving mode, display enhanced driving information on the display as compared to driving modes in which the autonomous driving function of the vehicle is executed.

2. The display apparatus according to claim 1, wherein the at least one processor is configured to determine a display ratio of driving information to convenience information based on the value of the manipulation variable of the driving manipulation device by:
  selecting, based on the driving mode, a display format that has the determined ratio.

3. The display apparatus according to claim 1, wherein:
the driving manipulation device comprises a direction manipulation device and a speed manipulation device of the vehicle; and
the at least one processor is configured to monitor a direction manipulation variable of the direction manipulation device and a speed manipulation variable of the speed manipulation device.

4. The display apparatus according to claim 3, wherein:
the direction manipulation device comprises a steering wheel and a direction indication lever of the vehicle; and
the speed manipulation device comprises an accelerator pedal and a brake pedal of the vehicle.

5. The display apparatus according to claim 1, wherein the at least one processor is configured to:
  control the display to display driving information and convenience information regarding the driving mode selected from among the plurality of driving modes; and
  set the vehicle to the selected driving mode.

6. The display apparatus according to claim 1, wherein the driving information comprises at least one of speed information, route guidance information, a driving image, a blind spot image, obstacle information, traffic sign information, gas mileage information, vehicle failure information, accident information, or traffic information.

7. The display apparatus according to claim 1, wherein the at least one processor is configured to:
  determine that the value of the manipulation variable of the driving manipulation device is less than the reference value;
  select a second driving mode from among the plurality of driving modes based on the determination that the value of the manipulation variable is less than the reference value, wherein the second driving mode corresponds to executing the autonomous driving function of the vehicle; and
  based on selecting the second driving mode, display enhanced convenience information on the display as compared to driving modes in which the autonomous driving function of the vehicle is blocked.

8. The display apparatus according to claim 7, wherein the convenience information comprises at least one of information about multimedia, email, games, weather, shopping, Internet, pictures, documents, or surrounding facilities outside the vehicle.

9. The display apparatus according to claim 7, wherein the at least one processor is configured to, based on the vehicle being set to the second driving mode:
  determine a first time at which a point of gaze of the driver of the vehicle deviates from a screen of the display, and a second time, after the first time, at which the point of gaze of the driver first returns to the screen of the display; and
  diminish at least some of the information displayed on the display during a period of time between the first time and the second time.

10. The display apparatus according to claim 7, wherein the at least one processor is configured to, based on the determination that the value of the manipulation variable of the driving manipulation device is less than the reference value:
  determine whether a position of the vehicle is within a section of a road in which the second driving mode is permitted;
  restrict the autonomous driving function of the vehicle based on the determination that the position of the vehicle is within a section of the road in which the second driving mode is prohibited; and
  control the display to display information indicating that the position of the vehicle is within the section of the road in which the second driving mode is prohibited.

11. The display apparatus according to claim 7, wherein the at least one processor is configured to, based on selecting the second driving mode:
  display, on a surface of the display that projects towards an exterior of the vehicle, information indicating that the autonomous driving function of the vehicle is being executed.

12. The display apparatus according to claim 1, wherein the at least one processor is configured to:
  determine, in a state in which the vehicle is set to the first driving mode, that a point of gaze of the driver of the vehicle deviates from a predetermined viewing area;
  release the first driving mode and select a second driving mode, wherein the second driving mode corresponds to executing the autonomous driving function for driving the vehicle; and
  based on selecting the second driving mode, display enhanced convenience information on the display as compared to driving modes in which the autonomous driving function of the vehicle is blocked.

13. The display apparatus according to claim 1, wherein:
the display comprises a transparent display mounted in at least one region in an interior of the vehicle; and
the at least one processor is configured to change a transmittance of the transparent display based on the selected driving mode among the plurality of driving modes.

14. A method comprising:
monitoring a value of a manipulation variable corresponding to a user input to a driving manipulation device provided in a vehicle, the value of the manipulation variable corresponding to an extent of the user input provided to the driving manipulation device;
selecting, from among a plurality of driving modes and based on the value of the manipulation variable of the driving manipulation device, a driving mode for the vehicle;
determining a display ratio of driving information to convenience information based on the value of the manipulation variable of the driving manipulation device; and
controlling, according to the selected driving mode, a display of a display apparatus of the vehicle to display driving information and convenience information for the selected driving mode according to the determined display ratio,
wherein the method further comprises:
  determining that the value of the manipulation variable of the driving manipulation device is greater than or equal to a reference value;
  selecting a first driving mode from among the plurality of driving modes based on the determination that the value of the manipulation variable is greater than or equal to the reference value, wherein the first driving mode corresponds to blocking an autonomous driving function of the vehicle; and based on selecting the first driving mode, displaying enhanced driving information on the display as compared to driving modes in which the autonomous driving function of the vehicle is executed.

15. At least one computer memory that is operably connectable to at least one processor and that has stored thereon instructions which, when executed, perform operations comprising:
　monitoring a value of a manipulation variable corresponding to a user input to a driving manipulation device provided in a vehicle, the value of the manipulation variable corresponding to an extent of the user input provided to the driving manipulation device;
　selecting, from among a plurality of driving modes and based on the value of the manipulation variable of the driving manipulation device, a driving mode for the vehicle;
　determining a display ratio of driving information to convenience information based on the value of the manipulation variable of the driving manipulation device; and
　controlling, according to the selected driving mode, a display of a display apparatus of the vehicle to display driving information and convenience information for the selected driving mode according to the determined display ratio,
wherein the operations further comprise:
　determining that the value of the manipulation variable of the driving manipulation device is greater than or equal to a reference value;
　selecting a first driving mode from among the plurality of driving modes based on the determination that the value of the manipulation variable is greater than or equal to the reference value, wherein the first driving mode corresponds to blocking an autonomous driving function of the vehicle; and
　based on selecting the first driving mode, displaying enhanced driving information on the display as compared to driving modes in which the autonomous driving function of the vehicle is executed.

* * * * *